(12) United States Patent
Agarwal et al.

(10) Patent No.: US 11,752,693 B1
(45) Date of Patent: Sep. 12, 2023

(54) IN-SITU 3D GREENLAND ANORTHOSITE MANUFACTURING USING DIGITAL LIGHT PROCESSING (DLP)

(71) Applicants: Arvind Agarwal, Miami, FL (US); Ambreen Nisar, Miami, FL (US); Tony Thomas, Miami, FL (US); Brandon A. Aguiar, Miami, FL (US)

(72) Inventors: Arvind Agarwal, Miami, FL (US); Ambreen Nisar, Miami, FL (US); Tony Thomas, Miami, FL (US); Brandon A. Aguiar, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 18/295,928

(22) Filed: Apr. 5, 2023

(51) Int. Cl.
| | |
|---|---|
| *B29C 64/165* | (2017.01) |
| *B29C 64/124* | (2017.01) |
| *B33Y 70/10* | (2020.01) |
| *B33Y 10/00* | (2015.01) |
| *B29K 509/00* | (2006.01) |
| *B29K 101/10* | (2006.01) |

(52) U.S. Cl.
CPC .......... *B29C 64/165* (2017.08); *B29C 64/124* (2017.08); *B33Y 10/00* (2014.12); *B33Y 70/10* (2020.01); *B29K 2101/10* (2013.01); *B29K 2509/00* (2013.01)

(58) Field of Classification Search
CPC ..... B29C 64/124; B29C 64/165; B33Y 10/00; B33Y 70/00; B29K 2101/10; B29K 2509/00
See application file for complete search history.

(56) References Cited

U.S. PATENT DOCUMENTS

2018/0141161 A1* 5/2018 Elmer .................... B33Y 40/10

* cited by examiner

*Primary Examiner* — Edward J Cain
(74) *Attorney, Agent, or Firm* — Saliwanchik, Lloyd & Eisenschenk

(57) ABSTRACT

The subject invention provides compositions, systems, and methods for additive manufacturing (AM), including three dimensional printing (3DP) using Digital Light Processing (DLP), of Lunar regolith and Lunar regolith simulants including Greenland Anorthosite Lunar Regolith (GALR) with a photocurable thermosetting polymer. Certain embodiments provide a high solid content of regolith, for example, about 60 wt. % GALR; together with a lower content of additives, for example, about 40 wt. % of a photocurable thermosetting polymer. Embodiments of the provided recipe and processing method can produce parts with low shrinkage, high strength, and favorable thermal properties. Parts have been produced with less than about 6% shrinkage in multiple directions of measurement.

20 Claims, 46 Drawing Sheets

IN-SITU 3D GREENLAND ANORTHOSITE MANUFACTURING USING DIGITAL LIGHT PROCESSING (DLP)

BACKGROUND

A new Moon race is being pursued by space agencies to set foot on the Moon and build a sustainable and permanent human presence. This entails delivering enormous cargo from Earth to build an infrastructure required for habitations, transportation, energy supplies, and life support.

The logistics and expense of getting resources from Earth to the Moon increase the need for predominantly in-situ part and structural manufacturing using locally available materials. Embodiments of the subject invention address, for example, certain challenges faced by the National Aeronautics and Space Administration (NASA)'s Artemis program on in-situ resource utilization (ISRU). One of the possible approaches for on-site construction using local resources is additive manufacturing (AM) using Lunar dust as a base material.

BRIEF SUMMARY

Embodiments of the subject invention provide additive manufacturing (AM) systems and methods using Greenland Anorthosite Lunar Regolith (GALR) with Digital Light Processing (DLP) for applications including but not limited to the fabrication of small-scale parts such as extravehicular activity (EVA) suits, armor plates, water filtration systems, high-temperature thermal insulation, solar absorbents, large-scale habitats on the surface of the Earth's Moon, and other green technologies.

The term regolith, in general, means a mixture of Titanium Dioxide, Silica, and Alumina. The term Lunar regolith means the first 4-15 m of Lunar soil, which consists of oxides, mixed complex oxides, glasses, and silicates. The Lunar regolith is classified as either Highlands or Mare regolith. The Mare regolith comprises basaltic lava flows in large impact basins. The Highlands regolith results from space debris impacting the Lunar surface.

The term Greenland Anorthosite Lunar Regolith (GALR) means a commonly used mineral based simulant approximate for an average Highlands location on the Moon such as the poles. The simulant accurately captures the texture of Lunar regolith by combining both minerals and rock fragments in accurate proportions. The main components of this regolith are alumina, silica and the mixture of the two.

The term JSC-1A/2A means a Basaltic Mare regolith simulant with high glass content, up to 50% of silicon oxide and low titanium content, of less than 4.5%.

The term Zircon means a type of Lunar regolith simulant found in regolith breccia that contains mainly Zirconium Dioxide. It also contains Silica and ferric oxide.

The terms CLRS-1 and CLRS-2, each respectively, mean a simulant produced by the Chinese Academy of Sciences. CLRS-1 is described as a low TI mare simulant while CLRS-2 is described as a high mare simulant.

The term photocurable thermosetting polymer means a liquid resin with molecules called monomers. These resins also contain oligomers, photopolymerization initiators, and other additives. The photoinitiators in the resin absorb light in the ultraviolet spectrum that has a wavelength from 250 nm to 450 nm. These photoinitiators then convert the UV light energy into chemical energy by way of the formation of intermediates including free radicals and cations. These intermediates are what initiate the polymerization process. When the polymerization process begins, the monomers and oligomers in the photocurable resin start to form into a polymer chain. During this photopolymerization reaction, the resin begins the process of solidification. Examples of a photocurable thermosetting polymer include base resins that contain methacrylate monomers, methacrylate oligomers, and photoinitiators.

The term additive manufacturing (AM) means a modern manufacturing technique that creates parts by depositing material one layer at a time. The various AM technologies for ceramics are vat photopolymerization, extrusion, jetting, powder bed fusion, direct energy deposition, and sheet lamination.

The term Digital Light Processing (DLP) means a form of three-dimensional printing (3DP) AM technique based on vat photopolymerization. This technique uses a UV source to cure photosensitive resins. Among existing AM techniques, DLP has the advantage of low manufacturing costs while maintaining a high-quality print and complicated shape fabrication capabilities. In recent years, DLP has developed into one of the superior methods for AM of ceramics.

Embodiments of the subject invention provide novel AM systems and methods using certain novel compositions of Lunar regolith which are similar to Lunar soils expected to be available at or near the polar region of the Moon. Future missions from NASA or other organizations can be expected to advantageously land or undertake operations in, on, or near the polar regions of the Moon as there is a possibility of finding water and other resources beneficial for human habitation. Embodiments provide novel compositions, systems, and methods for AM using GALR and/or native resources from the Lunar polar regions.

Embodiments provide a novel recipe for Lunar regolith manufacturing by DLP techniques. While DLP is known, the provided recipes are very unique and advantageously well aligned for a polar regolith composition, or simulant thereof.

Embodiments provide a 60 wt. % of regolith for improved in situ resource utilization and low shrinkage which advantageously enhances strength and other material properties. Several shapes have been printed by the inventors, including bricks and an igloo with potential utility for Lunar habitat. Embodiments advantageously address challenges faced, for example, by NASA's Artemis program on in-situ resource utilization (ISRU).

A composition comprising 60 wt. % regolith is advantageous because it will help in densification of the printed part during sintering. If there is not enough regolith in the printed part and not enough resin, then this could lead to porosity, voids, defects and cracks in the part during sintering, Whatever percentage of regolith is loaded into the slurry, will reduce the cost of sending building materials to the moon by the same percentage. It is more economical to load the slurry as high as possible.

A composition comprising 60 wt. % regolith is made possible in certain embodiments of the subject invention because of the novel process including selection of the slurry composition, the printing parameters (basic exposure time, initial exposure time, initial exposed layers, initial layer waiting time, layer waiting time, printing temperature, and UV light intensity), and the sintering profile.

A composition comprising 60 wt. % regolith is not achievable with related art technologies that lack the novel methodology and protocol developed by the inventors for slurry preparation and because of the technical challenges associated with the 3DP of ceramics and retaining a dense structure post sintering.

BRIEF DESCRIPTION OF DRAWINGS

The patent or application file contains at least one drawing executed in color. Copies of this patent or patent application publication with color drawing(s) will be provided by the Office upon request and payment of the necessary fee.

In FIG. 3D, resin can be seen bonding two regolith particles together.

In FIGS. 4D and 4E, it can be seen that there is no resin bonding the regolith particles together. In FIG. 4E, two regolith particles can be seen fused together. As the printed part is sintered, the resin is vaporized and removed. During this process, the regolith particles fuse.

DETAILED DESCRIPTION

Figure 1A:
FIG. 1A shows a GALR slurry according to an embodiment of the subject invention. The slurry has a composition of 60 wt % Greenland Anorthosite Regolith and 40 wt % resin.

Embodiments provide AM methods for processing of GALR using DLP for applications such as the fabrication of parts (e.g., small-scale parts) including but not limited to EVA suits, armor plates, water filtration systems, high-temperature thermal insulation, as well as large-scale habitats on the surface of the Earth's Moon.

Related art methods are insufficient for the 3D printing of Greenland Anorthosite regolith (i.e., a mixture of $Al_2O_3$, $SiO_2$, $CaO$, $Na_2O$, $Fe_2O_3$, and $MgO$) via DLP. There are many reasons for this insufficiency, starting with the fact that different materials have different morphology and color. The size and shade of the particles will affect the parameters that need to be used when trying to print a part with a certain powder. The color will affect how much UV light exposure is needed to polymerize the liquid resin. The sintering parameters are also important, and change based on the material. Certain powders have a higher or lower sintering temperature. Also, based on the resin that is used in the process, the kinetics for resin removal can be completely different.

Some research has been done on a CLRS-2 regolith (i.e., a mixture of $SiO_2$, $TiO_2$, $Al_2O_3$, $FeO$, $Fe_2O_3$, $MnO$, $MgO$, $CaO$, $Na_2O$, $K_2O$, $P_2O_5$, and $SO_3$) which has a different elemental composition than GALR (see, for example, CN112895434A; Ceramics International, 2019, 45, 5, 5829-5836; both of which are hereby incorporated by reference herein in their entireties).

GALR is the regolith simulant used to mimic Lunar highlands regions, such as the Lunar south pole where NASA plans to go. CLRS-2 is Chinese Lunar regolith simulant that is used to mimic Lunar mare regions. CLRS-2 contains a relatively high concentration of titanium. GALR does not contain any titanium. The difference in composition requires different material preparation parameters, printing parameters, and sintering parameters.

Compared to related art methods, embodiments of the subject invention provide substantially less shrinkage. For example, comparing embodiments of the provided 3D prints to related art literature on every axis, embodiments of the subject invention provide a decrease in shrinkage of 11.5% on the x-axis, 10.3% on the y-axis, and 7.9% on the z-axis. Related art literature disclosed parts that had 16.5% x-axis shrinkage, 16.3% y-axis shrinkage, and 21.9% z-axis shrinkage (Ceramics International, 2019, supra). When creating parts and habitats, these dimensional shrinkage differences can make a considerable difference in usability and performance. When creating parts or habitats on the Moon, every extra step in the manufacturing process means more time, money, and resources must be expended getting the necessary equipment and personnel to the Lunar surface. For example, one recipe in the related art literature teaches mixing 150 wt. % of isopropyl alcohol (IPA) in comparison to the regolith weight for ball milling over 2 hours followed by ultrasonication and drying for 12 hours. Further, the related art literature slurry was synthesized by mixing 45 vol % of regolith ball-milled for 12 hours and 55 vol % of resin. When creating the slurry in certain embodiments of the subject invention, the provided recipe requires only simple mixing of 60 wt. % of Greenland regolith with resin at 40 wt. %.

Currently, the least expensive option for getting mass to low earth orbit is the SpaceX Falcon 9 rocket. The cost of getting mass into low earth orbit on the Falcon 9 is approximately $2,720/kg. Every small amount of weight adds significant cost. By solely considering the cost of processing the regolith for printing, embodiments of the subject invention can be 650% less expensive than related art technology. A brief comparison of related art technology (e.g., 1a and 1b) with an embodiment of the subject invention (e.g., 1c) is presented in Table 1.

TABLE 1(a)

(a)
Related Art Method (a) DLP Printing of Unspecified Lunar Regolith
Reference (a) CN112895434A Simulated Lunar Soil Material Printing
Method Based on Photocuring Additive Manufacturing Technology.

| Process (a) | Details (a) |
|---|---|
| Adding unspecified Lunar Regolith with resin | 100-500 g of Unspecified Lunar Regolith added |
| Adding ethanol | 100-500 ml of ethanol added |
| Ball milling particles | 0.1-3 g of photo-initiator added |
| Drying in the oven | 10-100 ml of resin added |
| Premixing photo-initiator into resin | 1-10% of leveling agent introduced in the preparation process |
| Sieving to achieve a uniform particle size | Ball milled at 100 to 500 rpm |
| Printing slurry in DLP 3D printer | Dried in an oven at 40-80° C. for 2-20 hours |
| No sintering of printed part | Layer thickness 25-100 microns |
| | Exposure time 30-100 s |

TABLE 1(b)

(b)
Related Art Method (b) DLP Printing of CLRS-2 Lunar Regolith
Reference (b) Ceramics International, 2019,
Volume 45, Issue 5, Pages 5829-5836

| Process (b) | Details (b) |
|---|---|
| Adding CLRS-2 Lunar Regolith with resin | 100 g of CLRS-2 Lunar Regolith added |
| Adding IPA | 150 g of IPA added |
| Ball milling particles | 500 g of Zirconium Oxide grinding balls added |
| Adding Zirconium Oxide grinding balls | Mixture was put in a ball mill for 2 hours at 450 rpm |
| Drying in the oven | Ground simulants were cleaned in an ultrasonic cleaner |
| Sintering of printed part in an ambient air box furnace | Powders dried in an oven at 80° C. for 12 hours |
| Printing slurry in DLP 3D printer | Resin mixed with powders mixed at 55-45 vol% |
| | Placed in ambient air box furnace for 2 hours at 450° C. and f hours at 1150° C. |
| | Layer thickness 25, 50, and 100 microns |
| | Exposure time 100 seconds |
| | Sintering shrinkage: 16.5% in x-axis, 16.3% in y-axis, 21.9% in z-axis |

TABLE 1(c)

(c)
Subject Invention Method (c) DLP Printing of GALR
Lunar Regolith
Reference (c) This disclosure.

| Process (c) | Details (c) |
|---|---|
| Mixing GALR with resin | No ethanol is required in slurry production |
| Printing slurry in DLP 3D printer | No IPA required in slurry production |
| Sintering of printed part in an ambient air box furnace | No ball milling is required |
| | No oven required |
| | No sieving is required |
| | No leveling agent is required |
| | 100 g of GALR added (maximum regolith content known, in any publication) |
| | 66.67 g of resin added |
| | Placed in ambient air box furnace for 2 hours at 550° C. and f hours at 1280° C. |
| | Layer thickness 25, 50, and 100 microns |
| | Exposure time 6 seconds |
| | Minimal Sintering shrinkage: 5% in x-axis, 6% in y-axis, 14% in z-axis |

According to Release 22-089 (Aug. 19, 2022; *NASA Identifies Candidate Regions for Landing Next Americans on Moon*; retrieved from https://www.nasa.gov/press-release/nasa-identifies-candidate-regions-for-landing-next-americans-on-moon on Feb. 9, 2023), NASA is planning to land astronauts near the poles of the Moon to mine the ice for life support systems and fuel. Greenland Anorthosite regolith is a simulant for the soil that is found in the highlands and polar regions of the Moon. One regolith provided in certain embodiments of the subject invention is Greenland Anorthosite (an oxide mixture of Al, Si, Ca, and Fe) that has an average particle size of 8.32 microns. The particle size of the powder must be less than the layer thickness that is being printed. A layer thickness of 25, 50, or 100 µm can be produced. The range of powder that can be printed is just a few microns to 100 µm. The major phase of Greenland Anorthosite Regolith comprises mainly of $Al_2O_3$, $SiO_2$ and the mixture of two. The composition of this powder is important because it mimics the composition of the powder found in the polar regions on the moon. Every composition of powder will have different material preparation procedures, printing parameters, and sintering parameters. In certain embodiments the powder contains 6.80% Carbon, 65.96% Oxygen, 1.39% Sodium, 9.76% Aluminum, 12.13% Silicon, 3.75% Calcium, and 0.22% Copper. Compared to related art AM techniques, DLP has the advantages of low manufacturing cost, short cycle time, and capability to produce parts with superior surface finish and resolution (e.g., µm). The finished prints have a dimensional accuracy of 57 µm. The maximum printing volume is 110×60×138 mm on the x, y, and z-axis. The printer has a 405 nm UV LED light engine with a Full High Definition (FHD) resolution of 1920×1080 pixels. Layer thickness can be 25, 50, or 100 µm. The parts fabricated by this printer were observed to have consistently high precision and accuracy. Related art teaches only a few studies on the DLP of Lunar regolith CLRS-2 (a mixture of TiO2 SiO2 and $Al_2O_3$) with a composition fraction of 45 vol. %. Related art does not teach AM of Greenland Anorthosite regolith (nor representative soils found in the Lunar polar region) by DLP. The shrinkage varied from >16% in all three directions post sintering of related art CLRS-2 regolith in the existing literature. In contrast, the solid-loading of Greenland regolith provided by embodiments of the subject invention is 60 wt. % with shrinkage post sintering <6% in all three measured orthogonal directions.

Embodiments of the subject invention provide the highest solid-loading of any Lunar regolith (60% by weight) ever reported, to provide dense complex structures post sintering. The provided technique and recipe are applicable to >30 other existing Lunar regolith simulants including but not limited to JSC-1A, JSC-2A, Basalt regolith, and Zircon. Any Lunar regolith powder that is under 100 µm and has a similar color to GALR can be printed with this recipe. Any Lunar regolith that has alumina or silica as the major phase can be sintered with this recipe. The provided high loading of 60 wt. % Lunar Regolith can reduce the cost of sending building materials to the Moon proportionally.

Components and capabilities of certain exemplary and non-limiting embodiments of the subject invention include:

A liquid slurry was created of 60 wt. % Greenland Lunar Regolith and 40 wt. % of a photocurable thermosetting polymer. This composition of the slurry has been shown to provide consistent and repeatable prints to be fabricated.

The term basic exposure time means an exemplary and non-limiting workable range contemplated under certain embodiments of the subject invention that can be from 1-12 seconds, alternatively from 2-10 seconds, alternatively from 3-8 seconds, alternatively from 4-6.5 seconds. The basic exposure time can be tuned according to part size in certain embodiments (e.g., 4.5 seconds for smaller prints (e.g., under 10 mm in length) and 6 seconds for larger prints (e.g., over 10 mm in length)

The term initial exposure time means the duration in which the layer gets exposed to the UV light. There is an initial exposure time parameter and a basic exposure time parameter. The initial exposure time is the time the UV light shines on the part for the number of initial exposed layers that were programmed in the printer. The basic exposure time is the time the UV light shines on the part for the rest of the print after completing the number of initial exposed layers that were programmed. If the initial exposure time parameter is too low, the first layer can fail to stick to the bed. If the initial exposure time is too high, the part can become overcooked and brittle.

The term initial exposed layers setting means the number of first layers that print. These layers can be programed to a variety of different numbers of layers for different embodiments.

The term initial layer waiting time means a wait time programmed into the printer for the initial exposed layers.

The term layer waiting time means time for the resin to flow and evenly fill the vat after each layer. If this setting is too low, then it could not give the resin enough time to evenly fill the vat again. At that point, there could not be any material there to cure that layer and the print could fail. If this setting is too high, then it can needlessly elongate the print time which can lead to the particles settling in the slurry. Finally, the heater in the printer can be a useful tool to increase the flowability in viscous resins. If the resin is too viscous, it cannot flow back evenly after each layer. This could cause the print to fail.

The term brightness means the intensity of UV light that shines through the bottom glass is to cure the part being printed in $W/mm^2$. The intensity with which the light shines through the bottom glass can be adjusted to accommodate the desired layer height of the print. Too little intensity and the part can fail to cure. When the brightness is too low, the resin becomes "undercooked". The brightness must have enough intensity from the UV light source to cause the photoinitiators to convert the UV light energy into chemical energy. Undercooked parts are very glossy and if the brightness is too low, then the part can fail to print. When the brightness is too high, the resin becomes overcooked. This leads to the part becoming too grainy, excessively porous, and more brittle. This could compromise the material properties of the part.

The term preheat temperature means the temperature that the vat in the printer will reach before the print begins. When the slurry is shear mixed, heat is introduced. Once the slurry is poured into the vat, if the vat walls are cold, it will begin to lose heat. This will decrease the flowability of the slurry. The preheat temperature inhibits this from happening.

The term maximum temperature means the maximum temperature reached by the slurry in the printer. For slurries with a relatively higher viscosity (e.g., viscosity like honey or icing), the flowability could be in jeopardy. This can lead to air gaps between the slurry and the bed, leading to a poor surface finish. One way to reduce the viscosity and improve the flowability of the slurry is to introduce heat. This can allow the slurry to flow properly, allowing it to evenly fill the vat again and again after each layer is printed onto the bed.

The term preheat tray setting means the location where the preheat temperature parameter is programmed.

The term heated tray setting means the location where the maximum heat temperature parameter is programmed.

The term motor moving distance means the distance that the bed rises above the vat film between layer exposure during the layer waiting time.

The term tilting motor speed means the speed at which the bed rises above the vat film after curing a layer. In certain embodiments, it can be 1 mm/sec and below. If the tilting motor speed is too fast, the vat film can pull the print off the bed, especially in a viscous slurry.

Three dimensional (3D) printing: The provided DLP based 3D printer was used to print and cure the slurry simultaneously layer by layer until a part was fully printed according to one exemplary and non-limiting embodiment. Various settings can be advantageously selected to improve print quality and output. The novel recipe provided in an embodiment is summarized in Table 2 and described herein. The basic exposure time is 4.5 seconds for smaller prints (under 10 mm in length) and 6 seconds for larger prints (over 10 mm in length). The initial exposure time is 4.5 seconds for smaller prints and 6 seconds for larger prints. The initial exposed layers setting is 10 layers. The initial layer waiting time is 50 seconds. The layer waiting time is 25 seconds for smaller prints and 50 seconds for larger prints. The brightness (intensity of UV light) is 200 $W/mm^2$. The preheat temperature and maximum temperature are both 25° C. The preheat and heated tray settings are turned on. The motor moving distance is 18 mm. The tilting motor speed is 1 mm/sec.

After printing, the part can be placed in a container filled with isopropyl alcohol. That container can then be placed in an ultrasonication machine so that the part can be cleaned of any uncured resin. After cleaning, the part can be placed under a UV source for an effective time (e.g., for the same amount of time that it took to print) to cure any remaining slurry that is still on the part.

The cleaned and cured part can be placed in an ambient air box furnace for sintering. During the sintering process, the resin is removed from the print, and the regolith particles fuse. In one exemplary and non-limiting embodiment, the temperature in the box furnace goes from room temperature to 200° C. at a rate of 2° C./min. Then, it goes to a temperature of 550° C. at a rate of 1° C./min. It stays at 550° C. for 2 hours. From 550° C., the temperature goes to 1280° C. at a rate of 5° C./min. It stays at 1280° C. for 2 hours. The last step is to cool the part back down to 30° C. at a rate of 10° C./min.

Table 2: 3D Printing parameters: The basic exposure time of 4.5 s worked for prints under 1.5 g. For parts over 1.5 g, a 6 s exposure time was used to allow heavier parts to fuse to the bed adequately. The initial exposed layers were 10. The initial layer waiting time was 50 s. The regular layer waiting time was 25 s for prints under 1.5 g and 50 s for prints over 1.5 g. The brightness was set to 200 $W/mm^2$. The preheat and maximum heat temperature were both 25° C. The preheat tray was turned on to keep the vat at that temperature before printing commenced. The heated tray was also turned on to heat the slurry during printing. The motor moving distance was set to 18 mm. The tilting motor speed was set to 1 mm/sec.

| Parameter Label | Parameter Value |
| --- | --- |
| Basic Exposure Time | 4.5 secs for prints ≤1.5 g |
| | 6 secs for prints >1.5 g |
| Initial Exposure Time | 4.5 secs for prints ≤1.5 g |
| | 6 secs for prints >1.5 g |
| Initial Exposed Layers | 10 layers |
| Initial Layer Waiting Time | 50 secs |
| Layer Waiting Time | 25 secs for prints ≤1.5 |
| | 50 secs for prints >1.5 g |
| Brightness (Intensity of UV Light) | 200 $W/mm^2$ |
| Preheat Temperature | 25° C. |
| Max Temperature | 25° C. |
| Preheat Setting | On |
| Heated Tray Setting | On |
| Motor Moving Distance | 18 mm |
| Tilting Motor Speed | 1 mm/sec |

Embodiments of the subject invention provide AM systems and methods including compositions suitable for Lunar regolith that can have a multitude of applications. There are a multitude of items that future Lunar colonists can print using embodiments of the subject invention. These items can include parts that the astronauts need around the base, on their rover, or in their EVA suits. The technology can be used to create the habitats where the Lunar colonists can live and work.

It is contemplated within the scope of certain embodiments of the subject invention to increase the weight content of regolith beyond 60 wt. % and to produce printed parts with minimal porosity after sintering for better thermo-mechanical performance. Some of the major critical factors to reach a weight content of regolith beyond 60 wt. % are the uniform shear mixing, brightness and UV intensity, exposure time, layer waiting time, post print part cleaning, and sintering parameters. Embodiments can be used to create bricks, filters, habitats, and other parts needed to create a Lunar colony. One limitation is the build volume of the DLP 3D printer being used. DLP printing using other types of regolith is also contemplated, including but not limited to JSC-1a, Zircon, and Basalt regolith. The manufacturing of large-scale prints is also contemplated within the scope of certain embodiments of the subject invention. Embodiments have already been practically applied and demonstrated as advantageously functional for printing small-scale parts and bricks useful for construction of larger-scale structures such as habitats. It is contemplated within the scope of certain embodiments of the subject invention to increase the size of the bed that the part is being printed on and to incorporate new and developing designs suited to 3D printing or other AM methods.

Test Data: Multiple experiments were conducted using the experimental conditions and parameters as reported in Aguiar et al. (In-situ resource utilization of lunar highlands regolith via additive manufacturing using digital light processing, Ceramics International, 2023, ISSN 0272-8842, https://doi.org/10.1016/j.ceramint.2023.02.095; which is hereby incorporated herein by reference in its entirety. Reference Example 1, below.). For example, the printing parameters (e.g., according to the embodiment detailed in Table 2) are critical to creation of a successful print with high dimensional accuracy. In order to properly remove the resin and densify the printed part, the sintering parameters are critical.

Example 1: Printing Test Samples from Greenland Anorthosite Lunar Regolith

Raw materials included Greenland Anorthosite powder, a mixture of Al2O3 and SiO2 as a major phase, obtained from NASA's Marshall Space Flight Center in Huntsville, Ala. The photocurable thermosetting polymer resin was procured from Tethon 3D (Omaha, Nebr.) The resin contains methacrylate ($C_4H_5O_2$) monomers, methacrylate oligomers ($C_5H_8O_2$), and photoinitiators. ACS reagent IPA procured from Fisher Scientific (Pittsburgh, Pa.) was used as the cleaning agent to remove the uncured resin on the printed part.

The slurry was prepared by weighing out different weight contents of Greenland Anorthosite Lunar Regolith (i.e., 50 wt %, 60 wt %, and 70 wt %) and the rest as resin. The lunar regolith powder and resin were poured and mixed in a blender bottle. After shear mixing for a few minutes, the blender bottle was turned upside down to allow the slurry to fall to the bottom of the bottle. The bottle was then placed upright, allowing the slurry to return to its original position. This process of shear mixing with a machine and flipping the bottle by hand was repeated five times. The slurry experienced mild shear thickening. After this process, the flowability of the slurry improved due to the heat introduced to the material during blending.

The lunar regolith slurry was printed in a Digital Light Processing 3D Printer (DLP, Bison 1000, Tethon 3D). The slurry mixture was poured into the center of the vat film. The vat was then tilted, so the slurry evenly covered the entire vat film. A few drops (e.g., 1 ml-2 ml) of Tethon Grip DLP printing glue were placed onto the print bed. A squeegee was used to spread the drops of glue and evenly coat the surface. Once the vat was clamped into the DLP printer on both sides, the print bed was screwed into the printer in the designated location. With the proper parameters selected (see Table 2), the printing commenced. The finished prints have a dimensional accuracy of 57 μm confirmed using vernier scale. The maximum printing volume for this printer is 110×60×138 mm, respectively, on the x, y, and z-axis. The printer has a 405 nm UV LED light engine with a Full High Definition (FHD) resolution of 1920×1080 pixels. The parts fabricated by this printer according to embodiments of the subject invention were observed to have consistently high precision and accuracy. A complex cube, solid rectangle, block lettering, lattice structure, and scale model lunar habitats were all fabricated. The prints included archways, filets, curved surfaces, slanted beams, thin feature tubing, and domes.

The sintering protocol of 3D-Printed lunar regolith according to embodiments of the subject invention included the following. Post-printing, the 3DP part was scraped and washed using an ultrasonic bath in isopropyl alcohol. After drying the part, a UV light source was used for the same time (e.g., about 2 hours) it took to print. This step helped cure any remaining resin on the part after the ultrasonic cleaning process. Further, the printed sample was sintered using a box furnace (Across International, High-Temperature Muffle Furnace, CF1700, Livingston, N.J.) in an ambient air environment. The sintering profile shown in FIG. 7 has the following steps involved: heat from ambient to 200° C. at 2° C./min, heat to 550° C. at 1° C./min, hold at 550° C. for 2 h, heat to 1280° C. at 5° C./min, hold at 1280° C. for 2 h, and cool back to 30° C. at a rate of 10° C./min. Sintering at 1280° C. was selected as temperature for 3DP aluminum oxide, a major component of Greenland regolith.

Characterization of resulting prints according to embodiments of the subject invention included the following. The apparent bulk density of the photocurable polymeric resin, as received Greenland Anorthosite lunar regolith powder, 3DP Lunar Regolith, and the sintered 3DP Lunar Regolith were each, respectively, measured using a Helium gas pycnometer (Accupyc 1340, Micromeretics Instrument Corporation, Norcross, Ga.). Phases in as-received lunar regolith powder, 3DP printed lunar regolith, and sintered lunar regolith have been compared using X-ray diffraction (XRD, Siemens, D5000) using Cu Kα (λ=1.54 Å) at a scan rate of 2°/min. The operating voltage of 40 kV and current of 40 mA was set in the 2θ range of 10°-90°.

The microstructural analysis of the initial powder, 3DP lunar regolith, and the sintered part was done using a Schottky field-emission scanning electron microscope (JEOL-F100 FESEM JEOL Ltd., Akishima, Tokyo, Japan). The FESEM is endowed with an energy dispersive spectroscopy (EDS) detector, which can precisely map and collect the spectrum of the elemental composition in the samples. The heat flow of the non-sintered and sintered samples was measured using a thermal camera during heating and cooling cycles. The heating rate was determined using a hot plate raised to 200° C. A thermal camera (Teledyne FLIR, T4xx, Wilsonville, Oreg.) and thermal analysis software (Teledyne FLIR, FLIR Thermal Studio Suite, Wilsonville, Oreg.) were used to obtain the temperature variation of the samples over time. The samples were simultaneously placed on ice to determine the cooling rate. The change in temperature of the samples with respect to time was recorded using the same thermal camera and thermal analysis software.

The thermal conductivity of the sintered 3DP lunar regolith was measured using the laser flash diffusivity technique (NETZSH, LFA 467 HT, HyperFlash, Germany). The test was conducted at temperatures from RT to 500° C. with an interval of 50° C. using Xenon flash with a pulse width of 0.6 ms in Ar atmosphere. Samples with a dimension of 10 mm×10 mm×3 mm were used for the measurement. The thermal diffusivity, D and thermal conductivity κ are calculated using the following relations: $D=(0.13879*L^2)/(t_{1/2})$ and $\kappa=D*\rho*C_p$, where L is the specimen thickness, $t_{1/2}$ is the half-time required for the pulse initiation for the back face temperature to reach half of the maximum rise in temperature, ρ is the measured density, and Cp is the specific heat capacity determined from the flash diffusivity.

The Thermogravimetric analysis (TGA, SDT-Q600, TA Instruments, New Castle, Del., USA) was done on resin, 3DP lunar regolith, and sintered lunar regolith to see the weight loss with temperature. Samples were tested in air at a heating and cooling rate of 5° C./min up. The maximum temperature was 1000° C. for all the samples. Initial weight was kept <15 mg for all the samples. The coefficient of thermal expansion (CTE) of the sintered 3DP lunar regolith was measured using a dilatometry instrument (DIL 402 Netzsch Instruments, North America) RT to 1000° C.

The hardness of the 3DP lunar regolith and the sintered part was measured using LM series Vickers' hardness tester (LM810AT, LECO, MI), using ConfiDent hardness analysis software, at a load of 10 gf and holding at maximum load for 15 s. The reported values average at least five measurements at the same loading conditions. Before hardness measurements, samples were mounted in the resin and polished up to a 0.1 mm surface finish using polycrystalline diamond slurry. Further, to understand the failure of the sintered 3DP lunar regolith, samples were tested under compression loading using an electromechanical universal testing machine (UTM, MTS Criterion model 45, MN). At a strain rate of 0.1 mm/min. The applied load and displacement of the platens are recorded simultaneously during the deformation process.

To complement the failure analysis during the compression testing of the sintered 3DP lunar regolith, finite element modeling has been carried out using ANSYS Mechanical 15 software (ANSYS, PA). The 100 μm thick, complex cube 3D model was first sliced into 100 layers on Solidworks CAD software. It was then rebuilt into an assembly, layer by layer, just like an AM machine would produce the part. The complex cube simulation had a 1.9986 g mass and a 7.1894× $10^{-7}$ m$^3$ volume. An Ansys Workbench Static Structural FEM simulation was created with a mesh consisting of 480 bodies and active bodies, 238653 nodes, and 32144 elements. A Custom material was created and used for the simulation. The density and maximum load-bearing capability obtained in the present study were used for analysis. The isotropic elasticity parameters for lunar regolith (considering $Al_2O_3$ as a major phase), such as Young's modulus of 275 GPa and Poisson's ratio of 0.22, were taken from the literature. A bulk modulus of 164 GPa and a Shear Modulus of 113 GPa were computed by Ansys Workbench based on Young's modulus and Poisson's ratio.

Figure 14A:
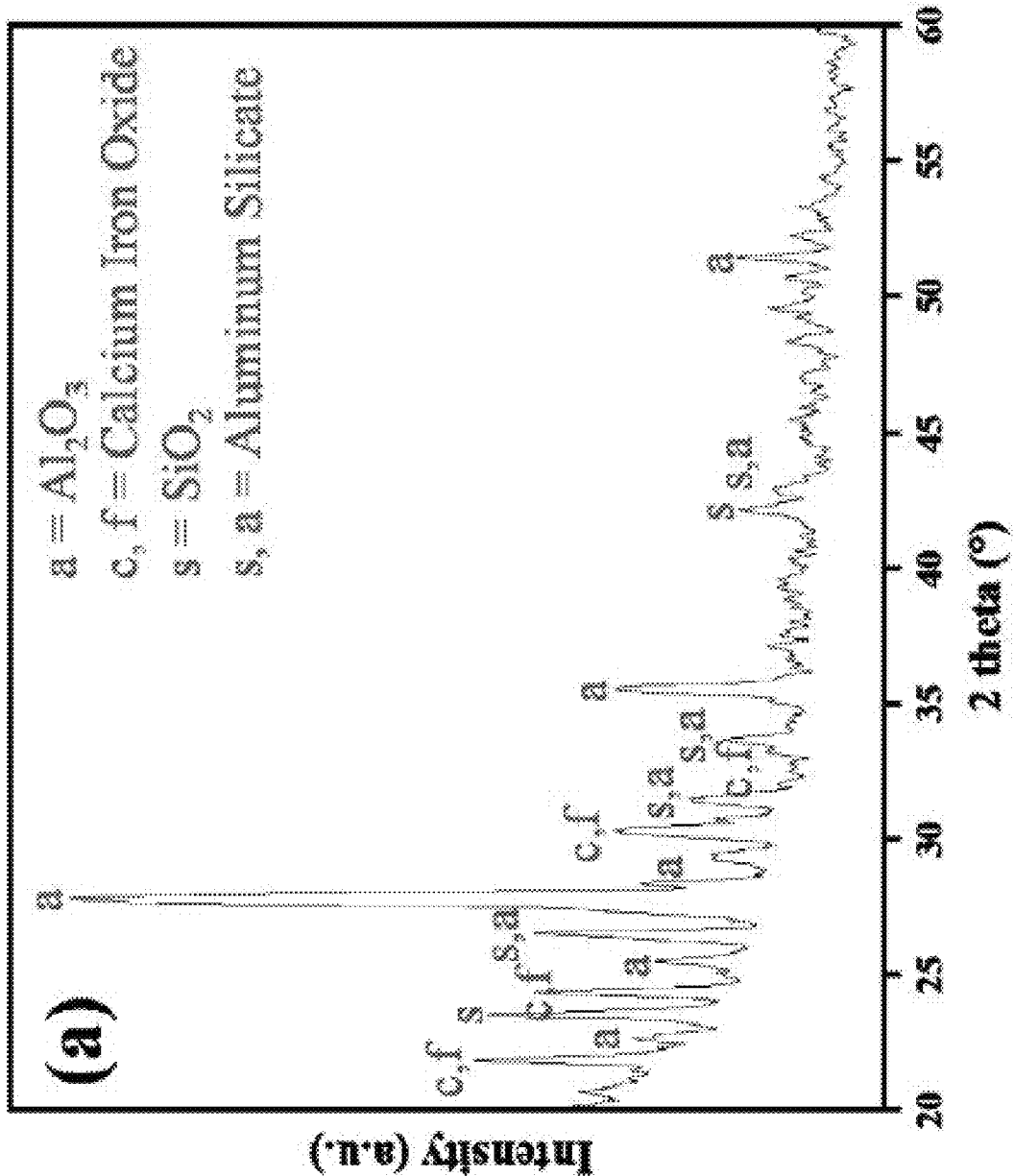
FIGS. 14A-14D show the phase, microstructure, atomic composition, and particle size distribution, respectively, of the as-received Greenland Anorthosite regolith powder (e.g., as used in Example 1) according to an embodiment of the subject invention.
Figure 14B:
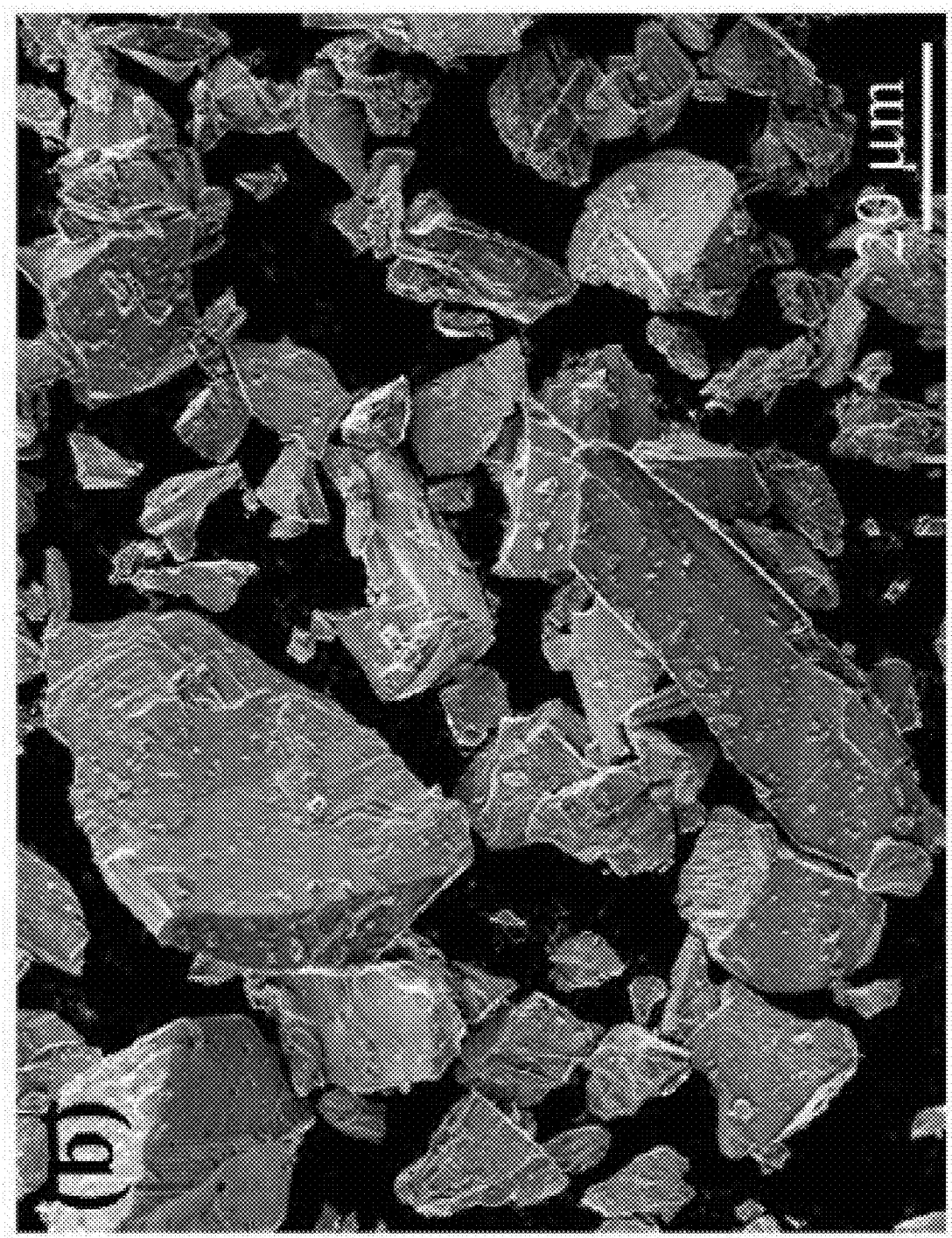
Figure 14C:
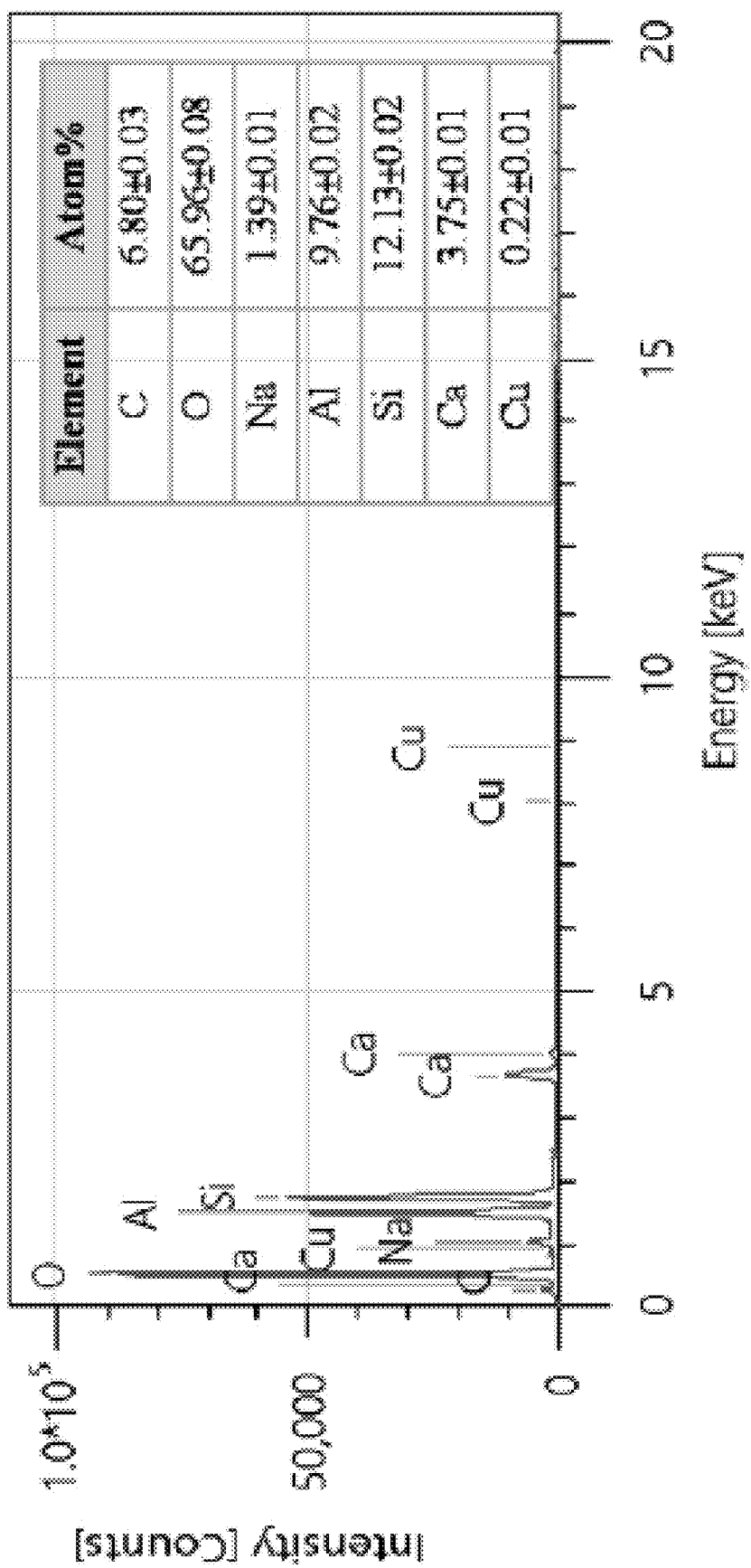
Figure 14D:
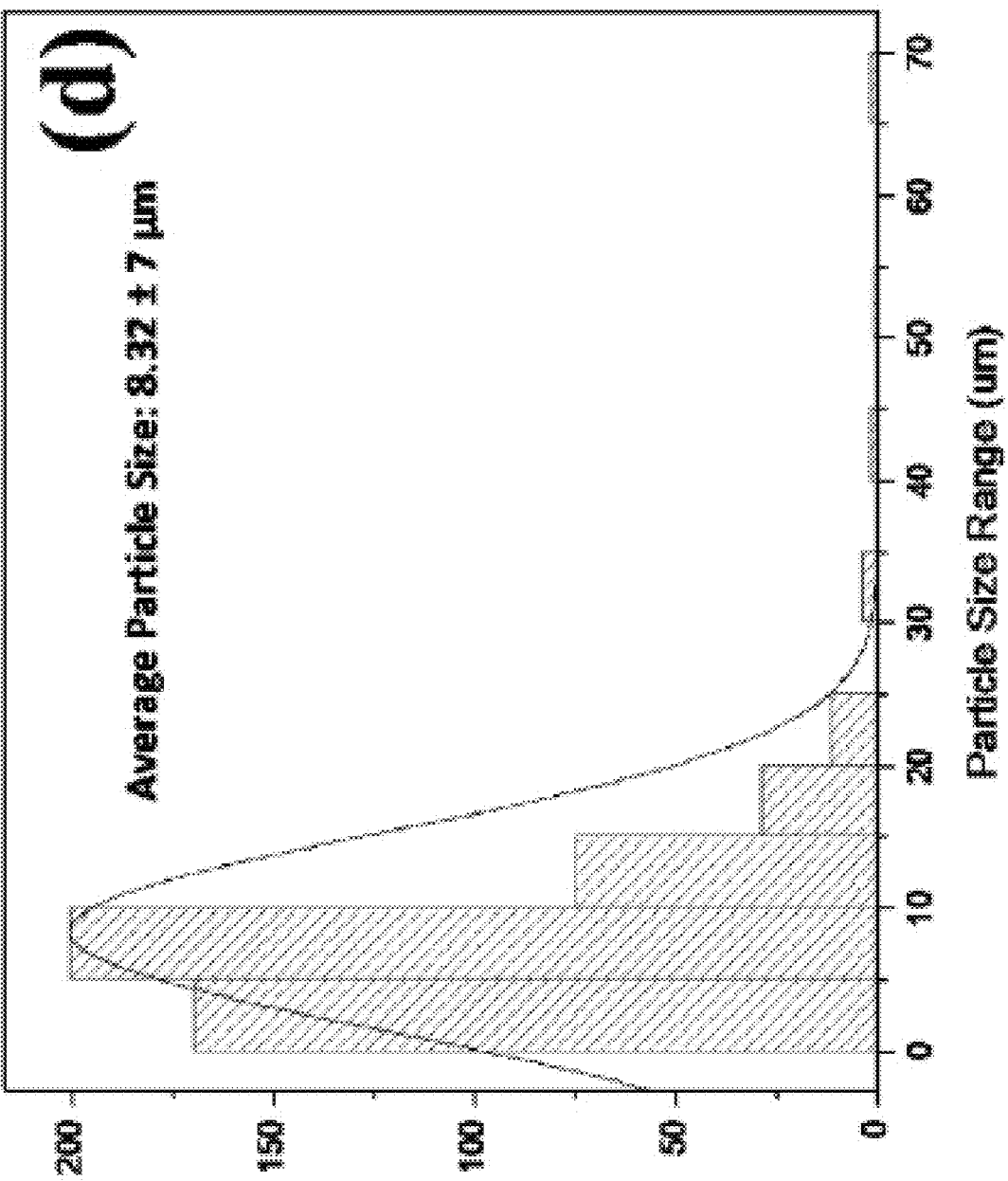

Results and discussion include the following. The phase, microstructure, and particle size distribution of the as-received Greenland Anorthosite regolith powder is shown in FIGS. 14A-14D. The XRD pattern of the Greenland Anorthosite regolith powder confirms the phases to be a mixture of Alumina ($Al_2O_3$), Silicon Dioxide ($SiO_2$), Calcium Iron Oxide, and Aluminum Silicate ($Al_2SiO_5$), see FIG. 14A. Similar phases were confirmed from the literature. The morphology and particle size of the as-received regolith can be seen in the SEM image shown in FIG. 14B. The particles are irregularly shaped, jagged, and have a rough surface. To further complement the XRD analysis, EDS shown in FIG. 14C depicts the regolith powder's elemental analysis with Al, Si, and O to be a high-intensity peak. The average regolith particle size is 8.32 m±7 μm, see FIG. 14D. It is to be noted that the finer particles can be advantageous for printing, leading to a better surface finish and improved dimensional accuracy than larger particles.

When determining the ratio of resin to lunar regolith in the slurry preparation, one objective can be to have as high a loading of regolith as possible to obtain a sintered sample with less porosity. However, the flowability will be compromised if excessive regolith powder is placed in the slurry. To 3D print using a DLP printer, the slurry must be able to flow back into place and evenly cover the vat film after being compressed in the middle and pushed to the side by the print bed. After creating and mixing slurries with concentrations of 50 wt % regolith with 50 wt % resin; 60 wt % regolith with 40 wt % resin (FIG. 1A, alternatively labeled or referred to as 60/40), and 70 wt % regolith with 30 wt % resin (FIG. 1B, alternatively labeled or referred to as 70/30); the 60/40 slurry showed the desirable flowability for DLP printing. The printing and characterization in the present study were done on 60 wt % regolith with 40 wt % of resin.

Selection of the DLP parameters for lunar regolith 3DP via DLP can depend on key parameters such as initial exposure time, basic exposure time, initial exposed layers, initial layer waiting time, basic layer waiting time, brightness (intensity of UV light), and heater temperature. Based on an iterative trial and error optimization process, the final printing parameters for Greenland Anorthosite lunar regolith are presented in Table 2. In order to gauge how quickly the slurry would polymerize, a 10×10 mm square calibration piece was printed. Since the bed is removed before printing, the thickness of the piece varies with exposure time. The polymerized calibration piece was gently scraped off the vat film, and the thickness was measured with a digital micrometer. The rate of polymerization is unique to every slurry.

The exposure time of 4.5 s worked for prints under 1.5 g. For parts over 1.5 g, a 6 s exposure time was used to allow heavier parts to fuse to the bed adequately. This avoided having the vat film pull the part off the bed. Hence, an exposure time of 6 s can also be used for prints equal to or less than 1.5 g (for consistency). The lunar regolith slurry had a honey-like viscosity. The initial and basic layer waiting time had to be long enough for the slurry to uniformly fill the center of the vat after the print bed compressed the slurry. As the process moves past the initial layers, the cured print is the only object making an impression on the slurry. Since the cured print displaces a much smaller volume of a slurry than the entire bed, the initial layer waiting time can in certain embodiments be higher than the basic layer waiting time. The initial layer waiting time for the lunar regolith slurry was 50 s. The time for the regular layer waiting time was 25 s for prints under 1.5 g and 50 s for prints over 1.5 g.

Another parameter, the brightness (UV light intensity), was set to 200 W/mm$^2$. When the brightness was under 200 W/mm$^2$, the UV light source did not provide enough energy to the photoinitiators in the resin to begin polymerization. If the brightness were set too high, the excessive energy from the UV light would burn the resin in the slurry. This causes the cured part to become brittle and potentially break off the bed.

The built-in heater of the DLP 3D printer was set to a temperature of 25° C. The increase in heat caused a drop in the viscosity of the lunar regolith slurry. This increase in flowability allowed the slurry to fill in the impression left by the print bed more uniformly. Fewer air gaps were generated on the printing bed surface, with a more uniform distribution of printing material spread across the vat. This led to a higher-resolution surface finish of the final printed piece. The effect of printing temperature on the finish of the printed part is discussed in detail below.

The effect of layer thickness with respect to exposure time on DLP lunar regolith was observed as follows. The amount of powder, particle size, and slurry color can all influence the rate of polymerization, and in turn, it will change the thickness of the 10×10 mm calibration print for a given exposure time. The first trial set the initial exposure time to 50 s. The calibration piece had a thickness of 858 µm. This measurement was far over the 100 µm layer thickness that was programmed. The printing bed rises 100 µm over the vat film during a regular print. This forces the layers to be 100 µm since there is only a thickness of 100 µm ceramic slurry that would fit between the bed and the vat. Even though the thickness of the calibration print was 858 µm at an exposure time of 50 s, it can still print a part with a layer thickness of 100 µm. However, then time would be wasted. DLP prints can take hours, if not days, to print. The exposure time can be optimized to make the process as efficient as possible within certain other constraints.

The rest of the calibration prints went as follows: 30 s exposure time—787 µm, 10 s exposure time—425 µm, 7 s exposure time—342 µm, 5 s exposure time—243 µm, 4.5 s exposure time—191 µm, and 4 s exposure time—did not polymerize. From these values, the rate of polymerization can be estimated from a mathematical relationship between exposure time (x) and thickness of the printed layer (y) (see FIG. 4). The equation describing the polymerization rate in print thickness is $y=310.38 \times \ln(x)-305.61$. The logarithmic function levels off after a certain amount of exposure time. This happens because there are only a certain number of monomers in the ceramic slurry to turn into polymers. The photoinitiators in the resin absorb light in the ultraviolet spectrum with a wavelength from 200 nm to 400 nm. These photoinitiators then convert the UV light into chemical energy by forming free radicals and cation intermediates. Intermediates are what initiate the polymerization process. When the polymerization process begins, the monomers and oligomers in the photocurable resin form a polymer chain and begin solidification. When plotting molecular weight vs. conversion of monomers to polymers, the chain growth polymerization process logarithmic graph resembles the thickness vs. initial exposure time plot. On the y-axis, the thickness of the cured print is proportional to the molecular weight. On the x-axis, the amount of time the resin is exposed to UV light is proportional to the conversion rate of monomers to polymers.

Figure 5A:
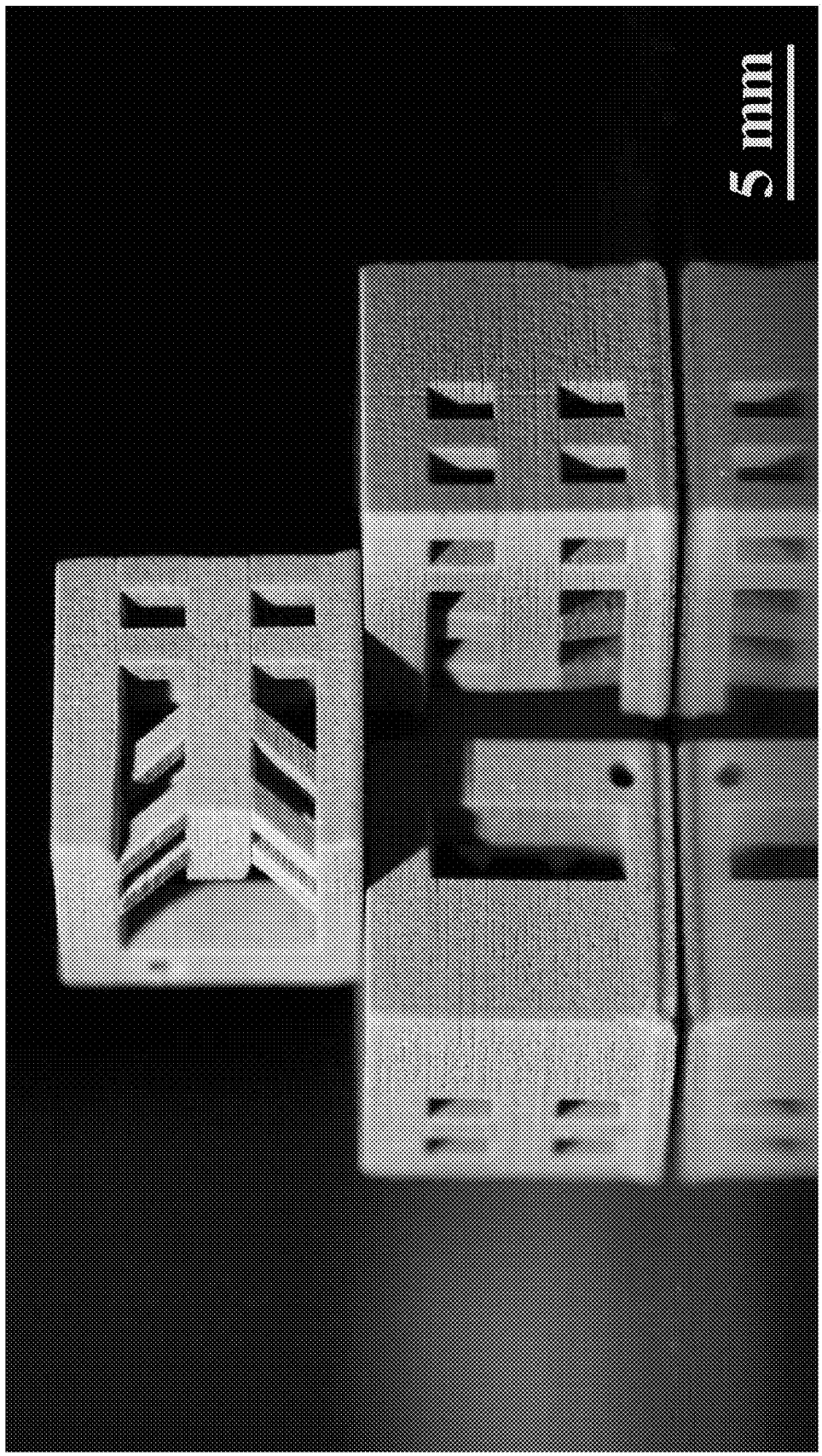
FIG. 5A shows three different non-sintered Greenland Anorthosite Regolith DLP 3D printed complex cube parts, each respectively according to an embodiment of the subject invention. Each respective part has a complex geometry that is approximately 10 mm×10 mm×10 mm.

Printed geometries of the 3DP lunar regolith included the following. The preliminary part created to test the quality of the slurry mixture and printing parameters was a 10×10×10 mm³ complex cube (FIG. 5A). The complex cubes were purposely designed with geometries intended to push the limit of the DLP technology's capabilities. The columns are angled, the cube's interior is hollow, and there is a thin feature tube running through the interior of the largest column with circular outlets. The printed FIU logo (FIG. 5D) contains thick block lettering with sharp 90° angles. The bold text contrasts the scale model lunar habitat (FIG. 5B), which contains arched doorways, curved walls, and a flat roof. Solid square pieces (FIG. 5C) were also fabricated for thermal tests. These prints show how DLP 3DP can fabricate ceramic parts with complicated geometry, intricate detailing, superior surface finish, excellent resolution, stunning dimensional accuracy, and quality mechanical properties.

Sintered geometries of 3DP lunar regolith included the following. The photographs of the sintered geometries of 3DP lunar regolith, such as the igloo, intricate cube, and fine lattice structure are shown in FIGS. 6A-6D. The printed parts retained their dimensional accuracy post-sintering process with virtually no cracking and delamination. The printed parts lost their gray color, revealing the original white shade of the Greenland lunar regolith powder. This suggests the complete removal of the resin. The apparent bulk density of the lunar regolith powder, photo-polymeric resin, printed, and sintered part obtained from the He pycnometer are ~2.78 g/cm$_3$, ~1.24 g/cm$_3$, ~1.82 g/cm$_3$ and 2.51 g/cm$_3$, respectively. The % relative densification in the sintered sample is 89.9%. The increased density value from the printed and sintered part also supports the removal of the resin post sintering. This is further supported by ~10% porosity in the sintered lunar regolith part, considering the solid loading was only 60 wt %.

Figure 2A:
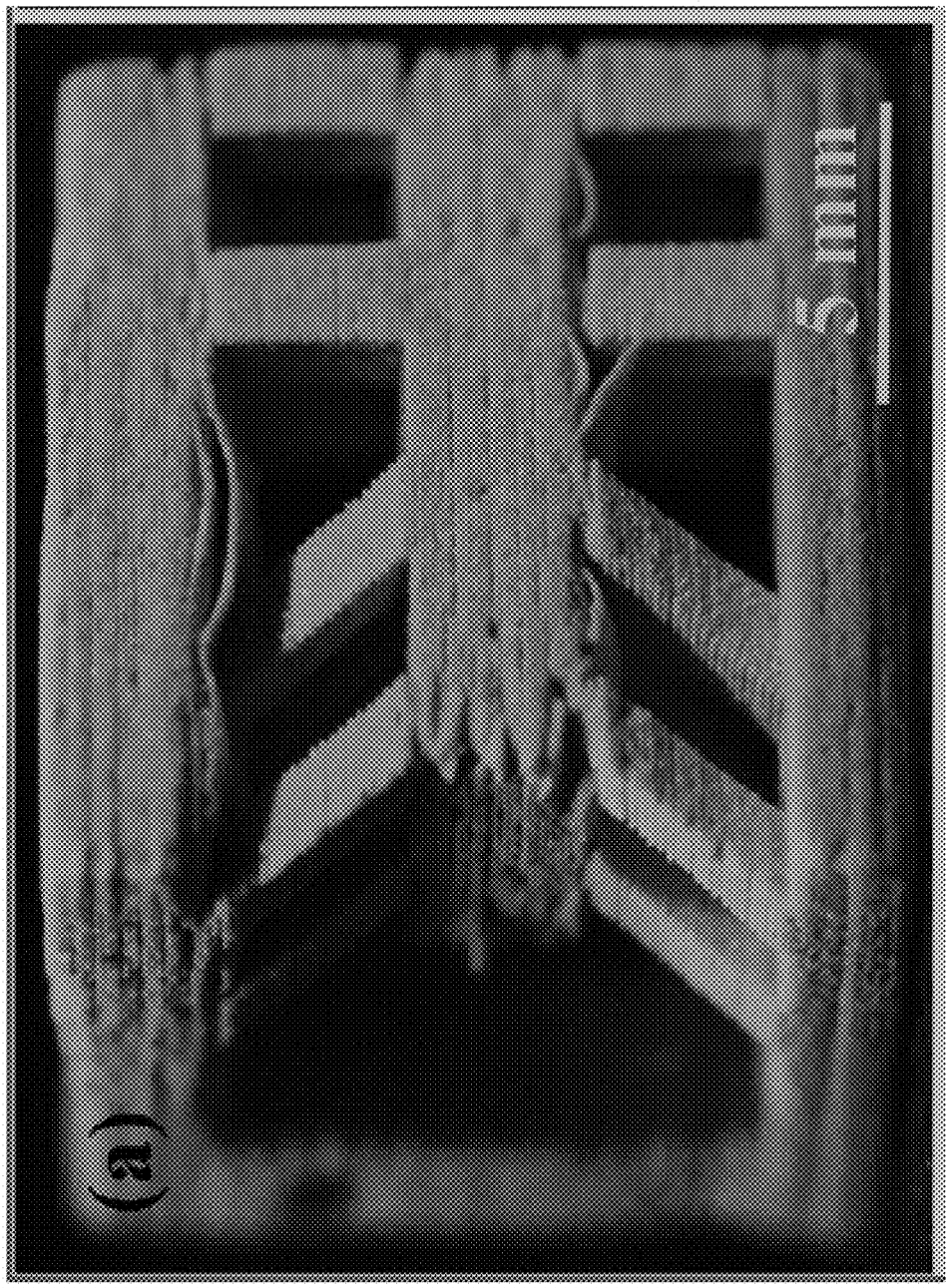
FIG. 2A shows a pre-sintered Greenland Anorthosite Regolith DLP 3D printed part created at 20° C. ambient temperature according to an embodiment of the subject invention. The yellowish cast on the left face of the part is due to uneven lighting while capturing the picture.

The effect of ambient temperature on the quality of 3DP lunar regolith was studied as follows. A high-quality surface finish and dimensional accuracy of the 3DP part are important to avoid mechanical failure due to insufficient structural integrity caused by misaligned layers. The quality of the finished print is dependent on the environmental temperature, as seen in the 3D DLP lunar regolith; see FIGS. 2A-2D. Complex cubes printed at 20° C. showed subpar surface finish and dimensional accuracy (FIG. 2A). The layer lines at the bottom of unsupported sections of the complex cube slump down due to the lack of proper layer bonding. When the DLP prints were conducted at a temperature of 25° C. (FIG. 2B), the surface finish and dimensional accuracy were superior to the lower temperature prints. The layer lines in this complex cube are adequately bonded together with no layer slumping. The quality of the surface resolution becomes most apparent after sintering. The complex cube printed at 20° C. (FIG. 2C) displays noticeable signs of a breakdown in structural integrity. The top corner of this complex cube slumped slightly under its weight during sintering. The dimensional accuracy of the print varied considerably from the original Computer-Aided Design (CAD) model. On the other hand, the sintered complex cube printed at 25° C. (FIG. 2D) stayed true to the original CAD model. This occurred due to the slurry's sufficient flowability at higher temperatures (>25° C.). Further, the apparent shrinkage in the 3DP complex cube can be seen in FIGS. 2B and 2D. The dimensional shrinkage was minimal <6% along the x and y-direction, while significant ~14% along the z-direction. The larger shrinkage in the z-direction is attributed to gravity. The shrinkage data shows that samples sintered at the chosen processing conditions (see FIG. 7) efficiently removed the resin while fusing the lunar regolith particles.

The phase and microstructural analysis of the as-printed and post sintered lunar regolith was studied as follows. Phase analysis of the as-printed and sintered lunar regolith shown in FIG. 16 elicits that the composition is similar to that of the as-received lunar regolith powder (shown in FIG. 14A). No new phases or phase transformation occurred while 3DP as well post sintering of the lunar regolith as per the resolution capability of X-ray diffractometer. A comparison of the microstructural analysis of the 3DP, as well as sintered lunar regolith at different length scales, is presented in FIGS. 3A-3D and 4A-4D. The distinct 100 µm layer lines of the printed complex cube are visible from both optical (FIG. 3A) and SEM micrographs (FIG. 3B). There is a noticeable gap between printed layers before sintering. These gaps are created when the Greenland regolith particles agglomerate around the layer of resin in the printed sample, as seen in FIG. 3C. The ceramic particles are held together by the hardened binding resin, also clear from the SEM image shown in FIG. 3D. Post sintering, the gaps between each layer disappears, seen both in optical (see FIG. 4A) and SEM micrographs (see FIG. 4B). The higher magnification images of the sintered cube show the numerous particles fused along with porosity created by removal of resin remaining, seen from FIGS. 4C-4E. This shows that the entire sintered part is structurally supported by the densification attributed to the necking of individual regolith fragments (FIG. 4E).

Figure 17A:
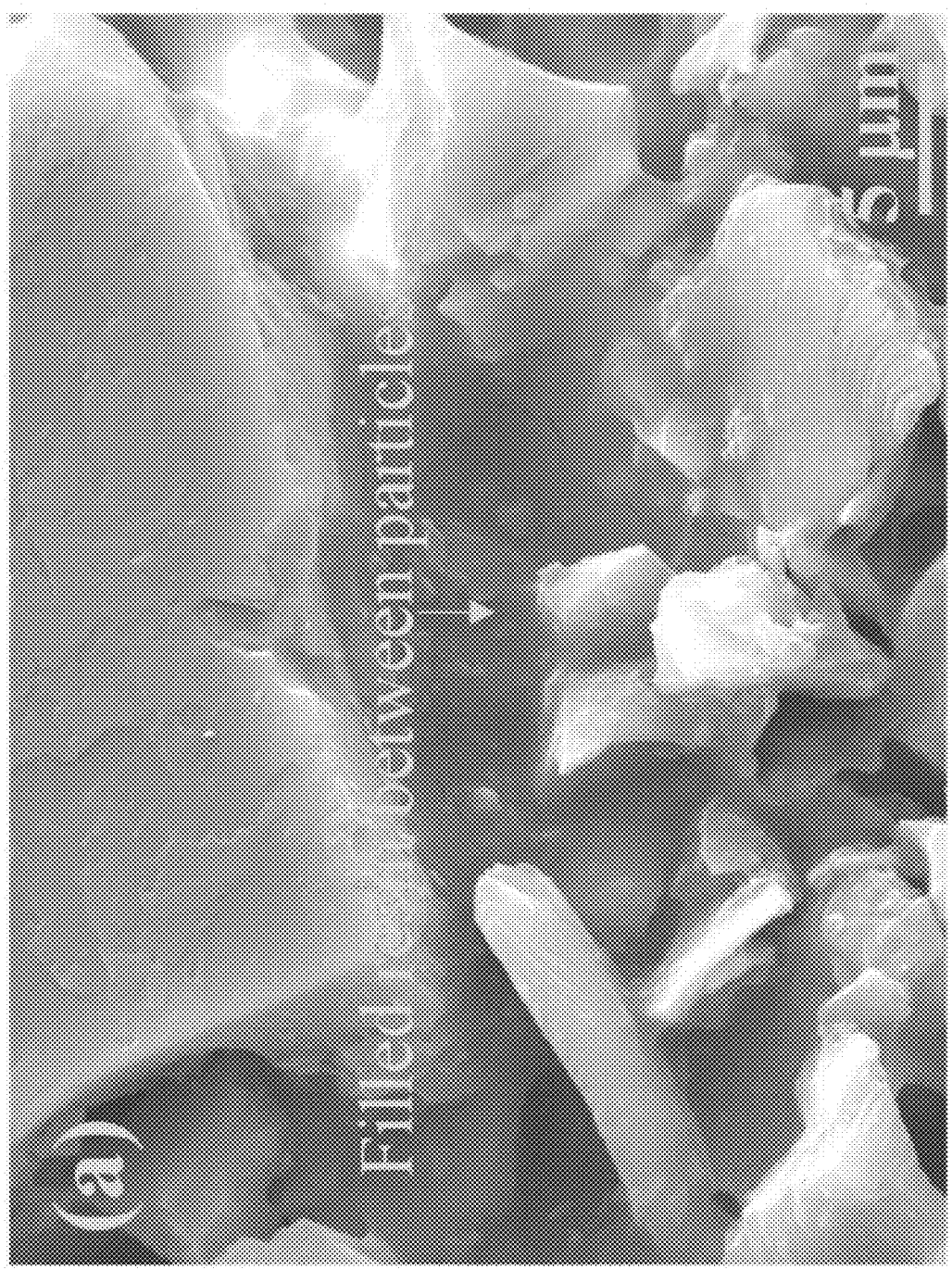
FIGS. 17A-17B shows a comparison of SEM images eliciting complete removal of the resin post-sintering of lunar regolith according to an embodiment of the subject invention.
Figure 17B:
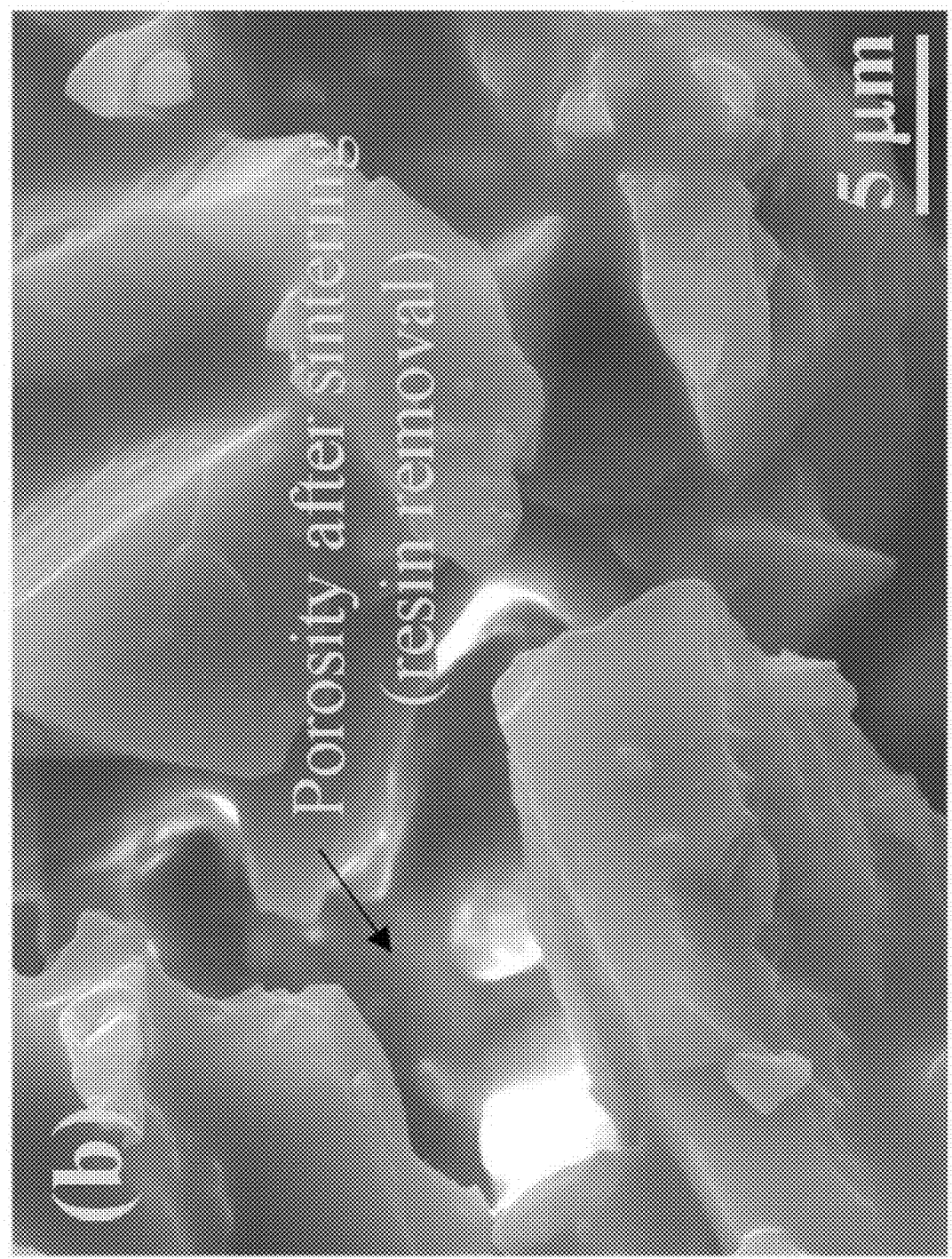

SEM images shown in FIGS. 17A-17B further support the removal of photocurable resin post-sintering. The as-printed sample showed the regolith particles embedded in the photocurable resin (see FIG. 17A). After sintering at 1280° C. for 2 h, the complete pyrolysis depicts porosity (see FIG. 17B). The image also revealed the fusion of regolith particles, retaining the structure of the printed part.

Mechanical integrity of 3D-Printed lunar regolith was studied as follows. The microhardness of the samples was obtained to compare the mechanical integrity of the as-printed and sintered lunar regolith. The hardness was 0.44±0.03 GPa and 9.36±0.80 GPa for the as-printed and sintered lunar regolith measured at a load of 10 gf. The lower load force was selected for measuring the hardness due to a solid loading of 40 wt % of resin in the printed part. The result shows that the sintered sample is over 21 times harder than its non-sintered counterpart. The non-sintered sample is a polymeric piece with regolith powder loosely scattered throughout. On the other hand, the sintered sample with $Al_2O_3$ and $SiO_2$ as a major phase fused further improves its hardness. The reported hardness values of conventionally sintered $Al_2O_3$ and $SiO_2$ are 12.8 GPa at a load of 10 N at room temperature and 7.3±0.3 GPa at a load of 1 N at room temperature. It is important to understand the failure mechanism in the 3DP sintered samples. We chose an intricate complex cube over a solid cube sample for the compression test to showcase how intricate components will fail catastrophically. This will also highlight various nodes at which the fracture starts depending on the design of the structural parts. The load-displacement curve during the compression test on the sintered complex cube sample is shown (see FIG. 8). The first column starts to break at a load of 235 N (marked as a red square in FIG. 87). Further, the maximum load the sintered complex cube sample could take before falling apart was ~298±5.5 N (marked as a blue square in FIG. 8). This indicates that 60 wt % Greenland regolith is a useable material for loadbearing structures on the lunar surface.

Figure 18A:
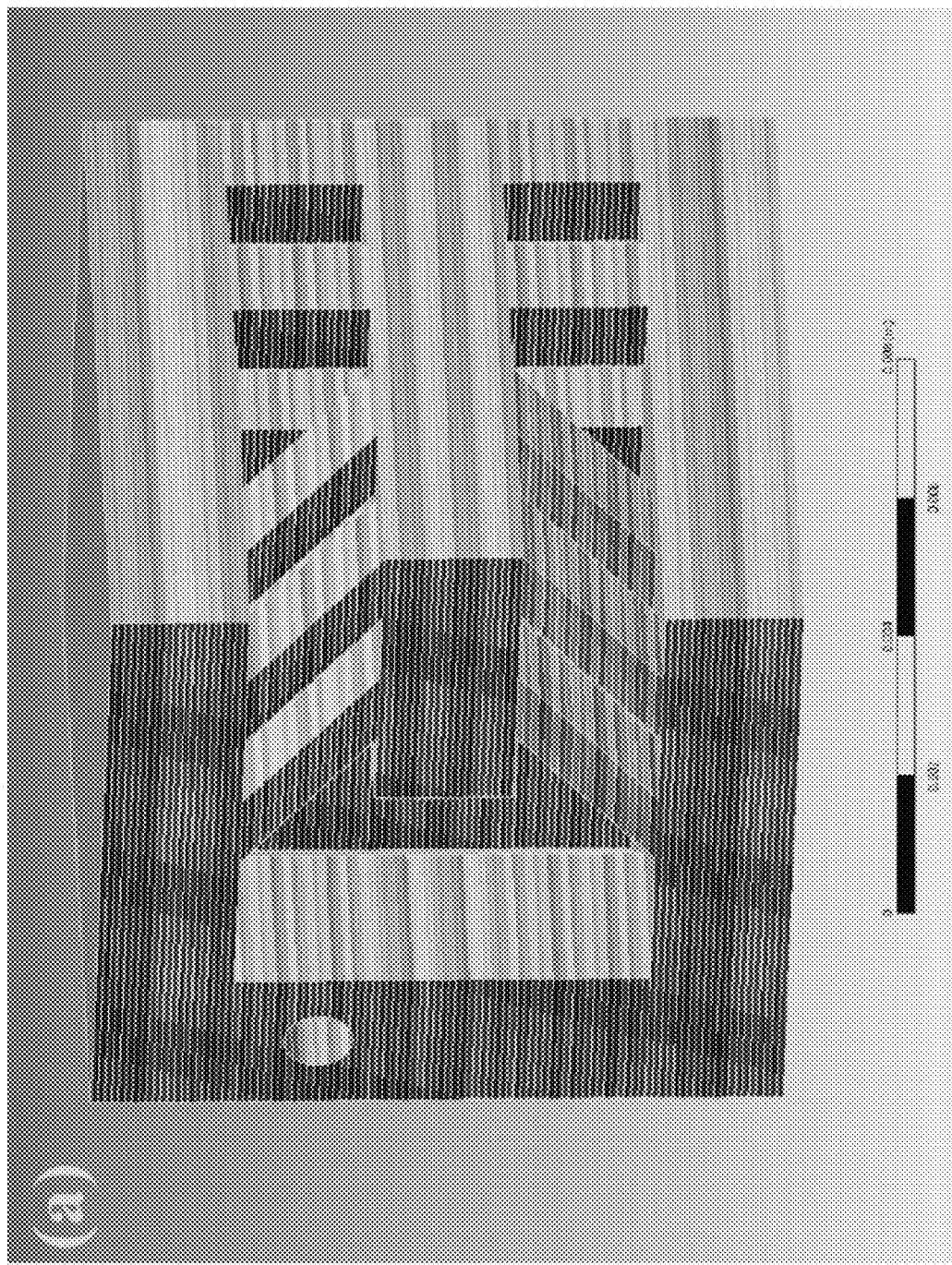
FIG. 18A-18E show a (a) CAD model of complex cube constructed layer by layer to achieve a more accurate model and simulation according to an embodiment of the subject invention. Crack-propagation observed along the columns recorded during the (b) experimental compression test and (c) Simulated compression test of a complex cube by ANSYS showing stresses in Pa. (d) Static structural simulation of a single layer from a complex cube, showing stresses in Pa. (e) Static structural simulation of layer-to-layer interaction from a complex cube, showing stresses in Pa. The simulations (c, d, e) are showcased at a true deformation scale.
Figure 18B:
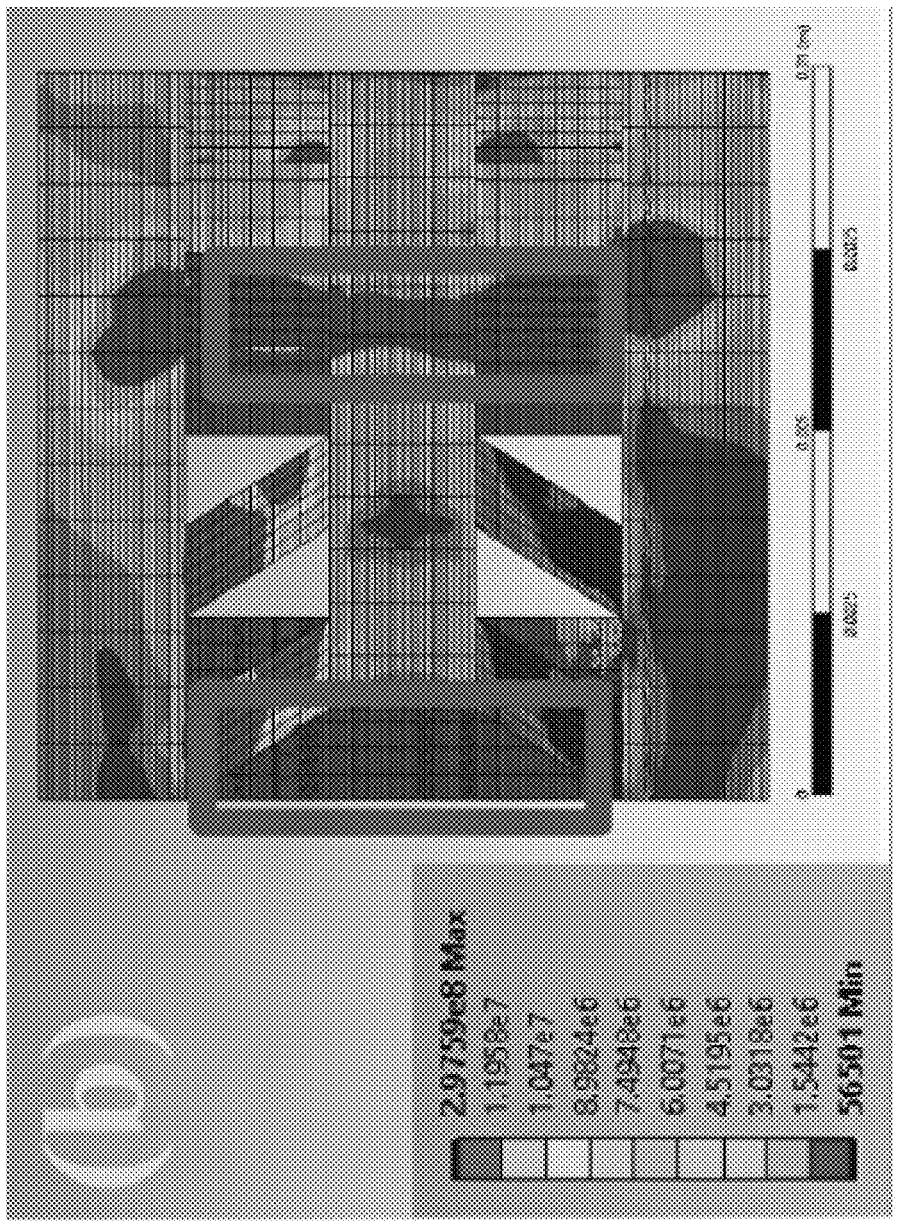
Figure 18C:
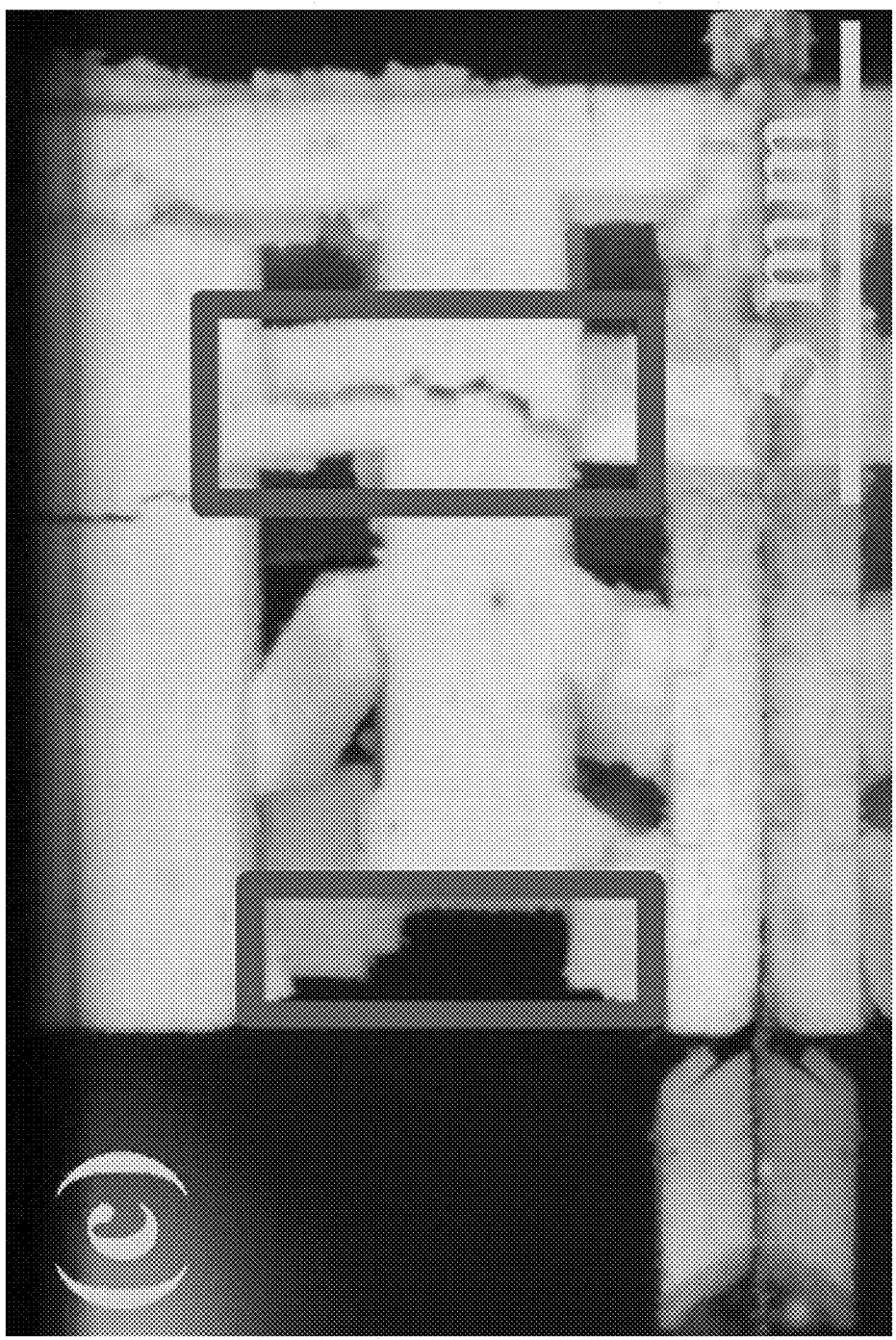
Figure 18D:
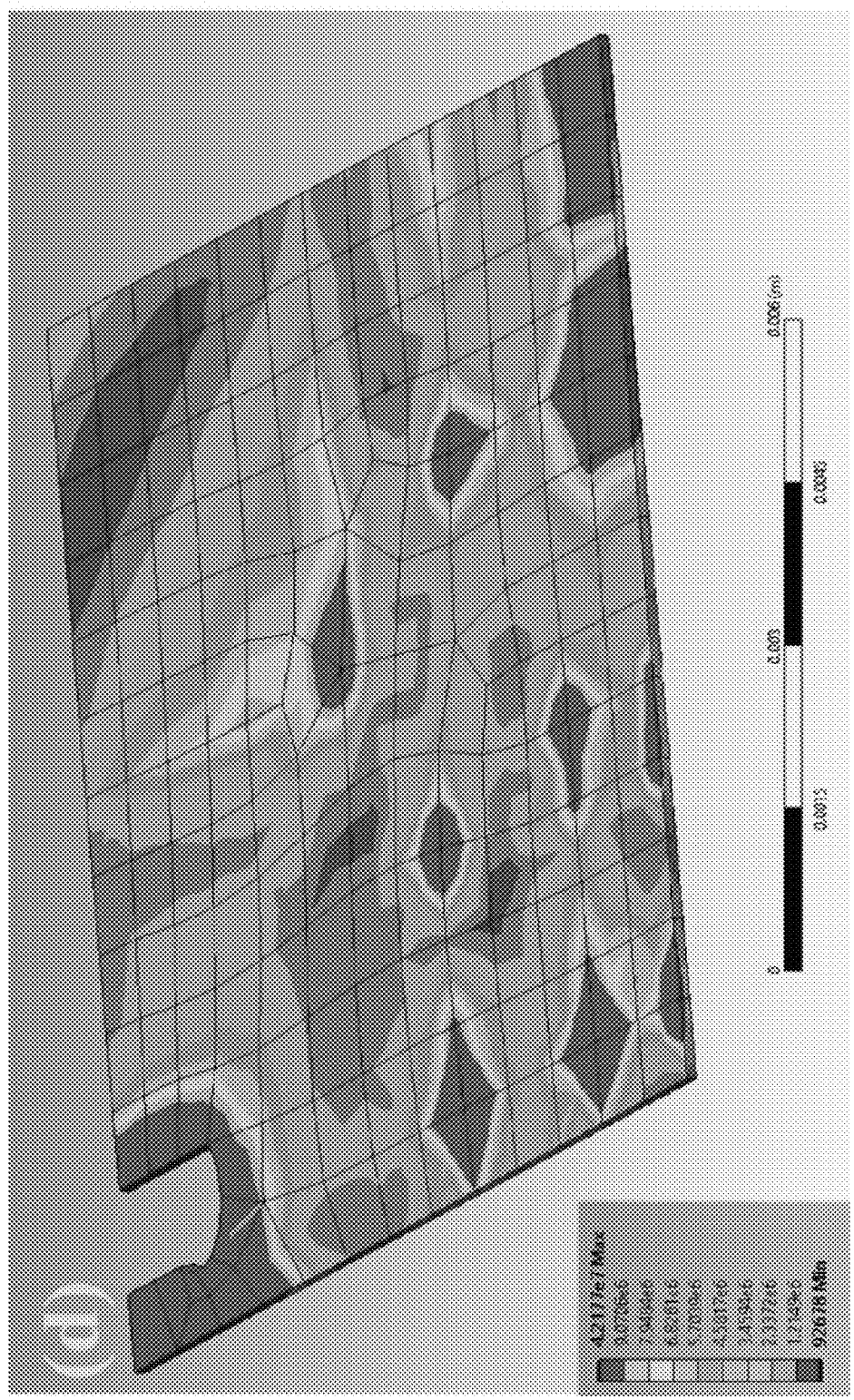
Figure 18E:
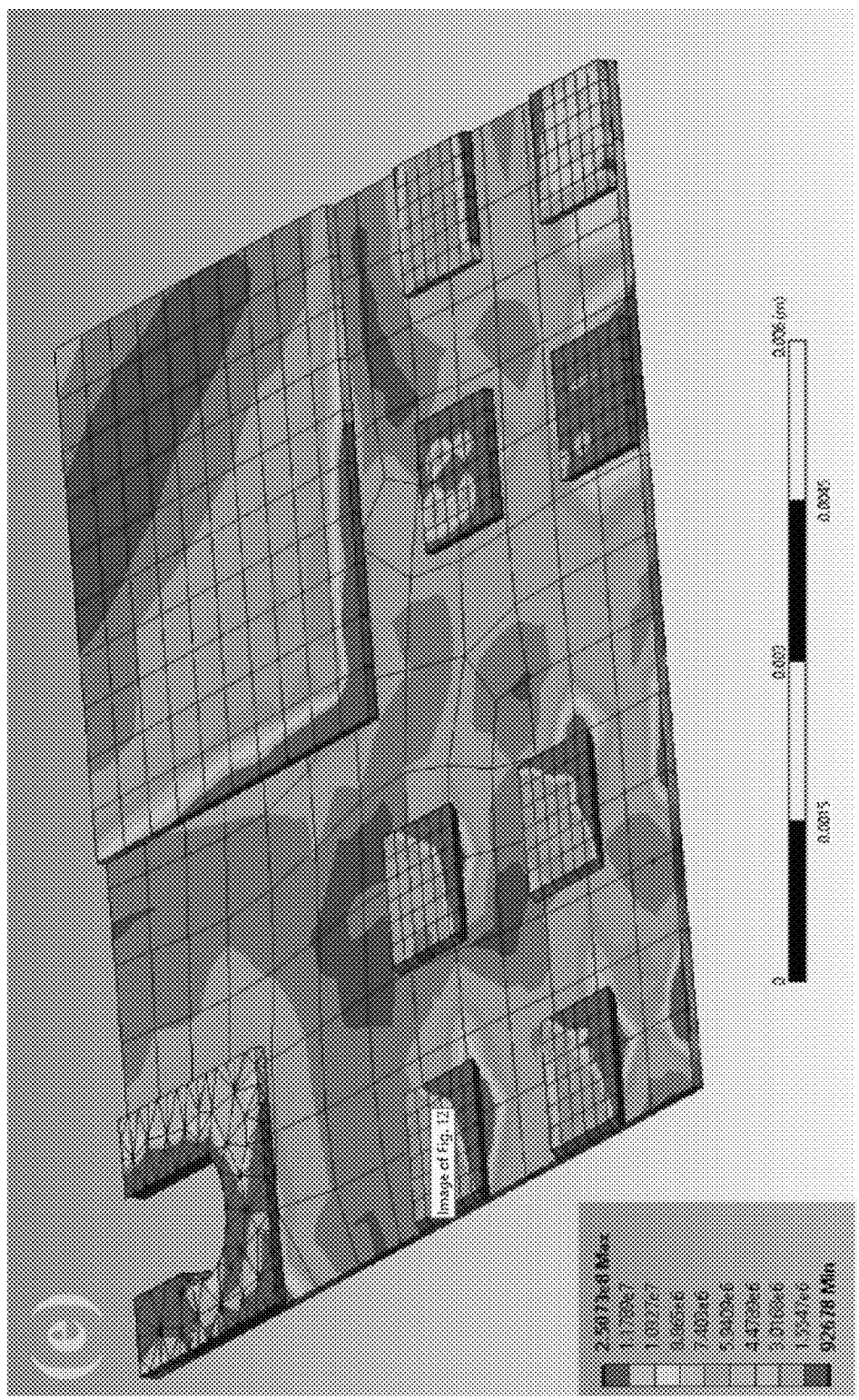

FEM analysis using ANSYS was done on the sintered lunar regolith with intricate cube geometry to complement the failure analysis. For this, the intricate cube of the same dimension was built layer by layer, each with a thickness of 100 µm, to achieve a 10×10 mm cube by developing a solid CAD model, shown in FIG. 18A. This is analogous to the 3DP of the intricate cube by DLP. This process allowed for excellent static structural simulation accuracy. The areas marked with a red rectangle in FEM analysis (see FIG. 18B) have the highest stress values, which matches with the areas of fracture (marked as a red rectangle) during the experimental compression test (see FIG. 18C). This means an actual compression experiment of the sintered intricate cube (FIG. 18C) validated the computer model compression test simulation (FIG. 18B). The stress and failure that the FEM simulation predicted were exceptionally accurate when compared to the experiment. Further, the stress distribution in each layer is shown in FIG. 18D. This provides insight into how each layer handles the load. Interlayer interactions and forces between two connecting layers are also seen in the stress distribution shown in FIG. 18E. Such analysis allows a capability to correlate stress distribution in each ceramic layer with the printing conditions and design.

The thermal stability of 3D-Printed lunar regolith was studied as follows. To confirm the complete removal of resin in the sintered sample, TGA was conducted for polymeric resin, as-printed, and sintered (see FIG. 9). The sintered sample had no weight loss. The results indicate that the chosen sintering profile (see FIG. 7) effectively removed the resin. The resin started breaking down at around 282° C., seen in both the 3DP sample and the as-received resin. By 471° C., the resin was around 85-90% removed. When the temperature reached 589° C., the sample had lost ~41% of its original weight showing that the resin was completely removed from the 3DP part (mixture of 60 wt % regoliths and 40 wt % resin). These results were consistent with the TGA data for as received resin showing 100% weight loss at this temperature. In the literature, CLRS-2 regolith showed a less than 1% mass change post-sintering. This is analogous to the resin removal in Greenland regolith after sintering.

Figure 10:
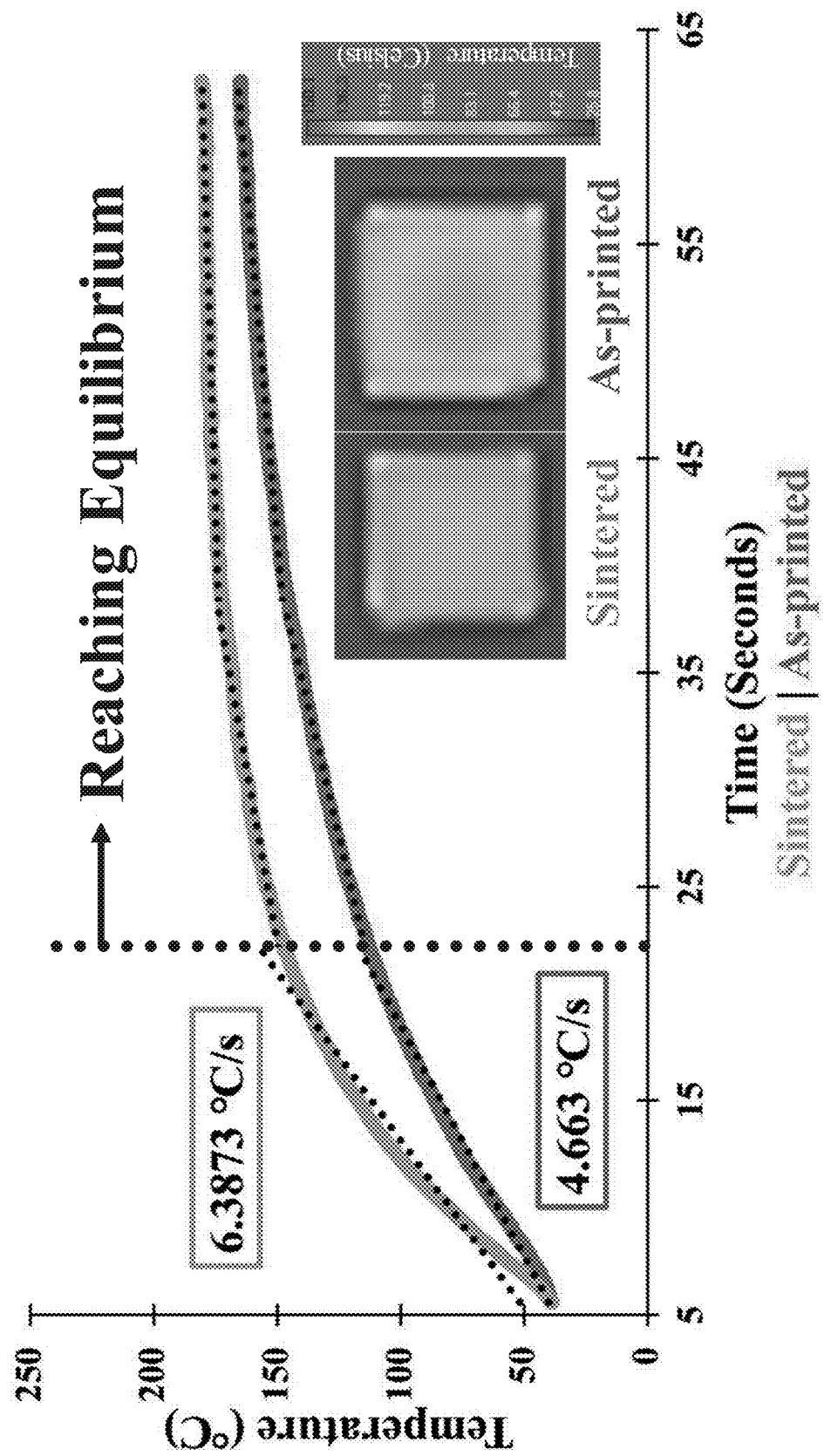
FIG. 10 shows the respective heating rates of certain sintered and non-sintered samples according to embodiments of the subject invention. The sintered sample conducts heat at a faster rate of 6.4° C./s, while the non-sintered sample conducts heat at a slower rate of 4.7° C./s until both samples start to trend towards equilibrium.
Figure 11:
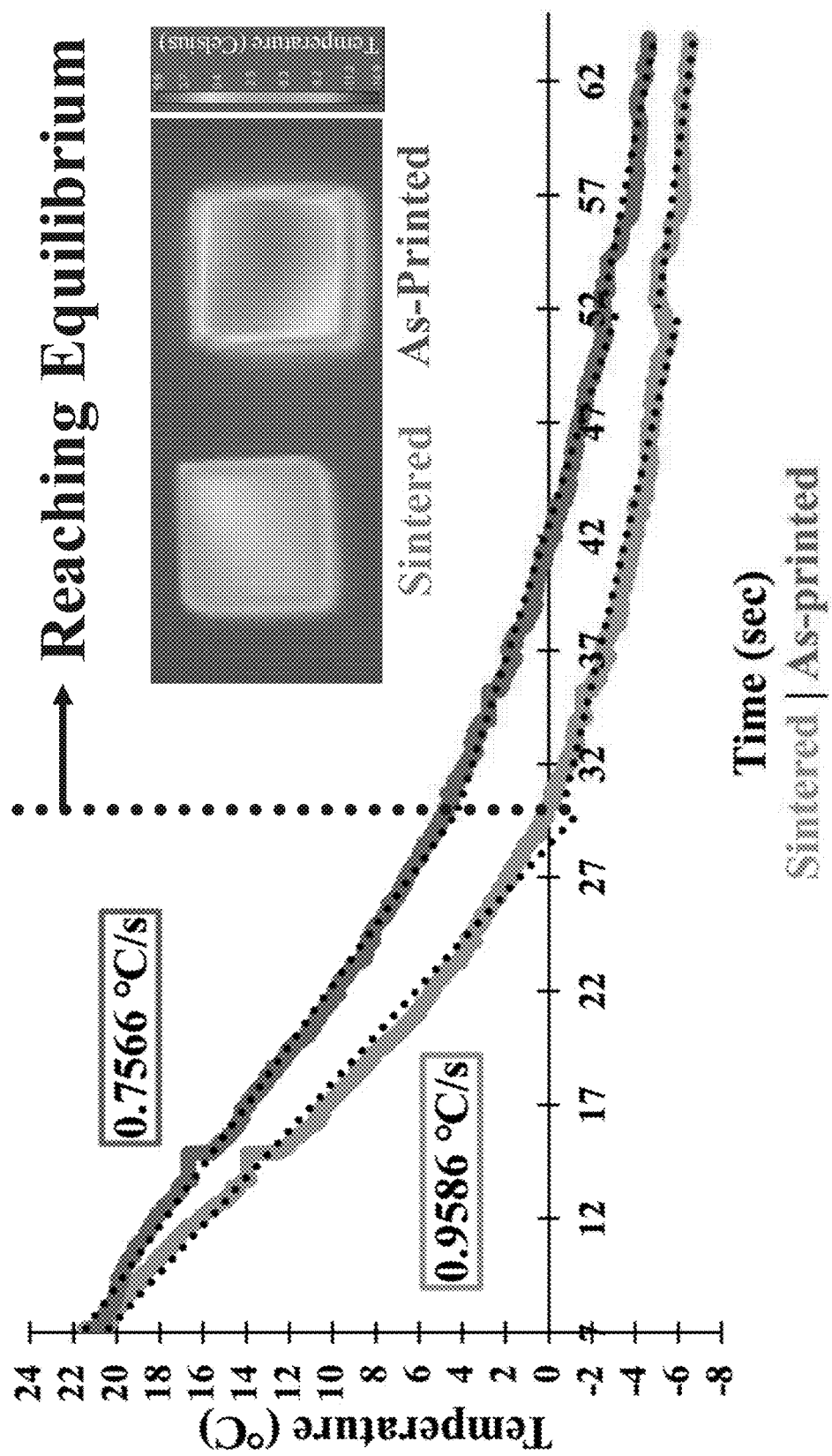
FIG. 11 shows the respective cooling rates of sintered and non-sintered samples according to embodiments of the subject invention. The sintered sample cools down at a faster rate of −0.96° C./s, while the non-sintered sample cools down at a slower rate of −0.76° C./s until both samples start to trend towards equilibrium.

The thermal conduction of the as-printed and sintered samples during the heating and cooling cycle was assessed using an infrared camera, see FIGS. 10-11. The heating experiments were conducted by keeping samples of similar dimensions on the hot plate maintained at 200° C. The sintered sample conducts heat at a faster rate of 6.39° C./s when compared to the as-printed sample, 4.66° C./s. Similarly, the cooling experiment was done by keeping the samples of similar dimensions on an ice cube. The sintered sample showed a faster cooling rate of 0.96° C./s, while the non-sintered sample cooled down at a slower rate of 0.76° C./s until both samples started to trend toward equilibrium. The absence of any photocurable polymer in the sintered sample allows heat to travel through the part at a relatively quicker rate than in the non-sintered sample.

Figure 12:
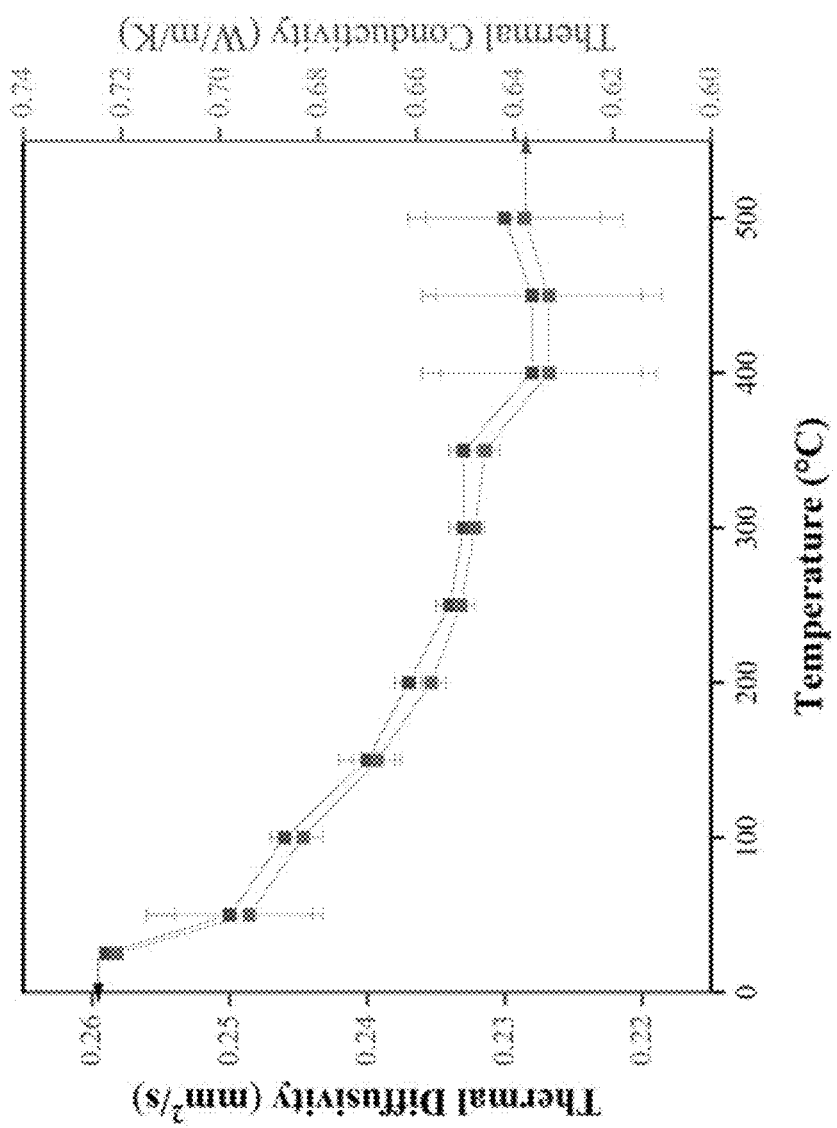
FIG. 12 shows the thermal diffusivity and thermal conductivity of a sintered sample according to an embodiment of the subject invention. The test is conducted from room temperature to 600° C. Thermal diffusivity is 0.3 $mm^2/s$ at room temperature. The thermal diffusivity peaked at approximately 125° C. with a value of around 0.31 $mm^2/s$. The thermal diffusivity reached a minimum at approximately 400° C. with a value of around 0.26 $mm^2/s$. At room temperature, the thermal conductivity is 0.83 W/m/k. The thermal conductivity peaked at approximately 125° C. with a value of around 0.86 W/m/k. The thermal conductivity reached a minimum at approximately 400° C. with a value of around 0.72 W/m/k.
Figure 13:
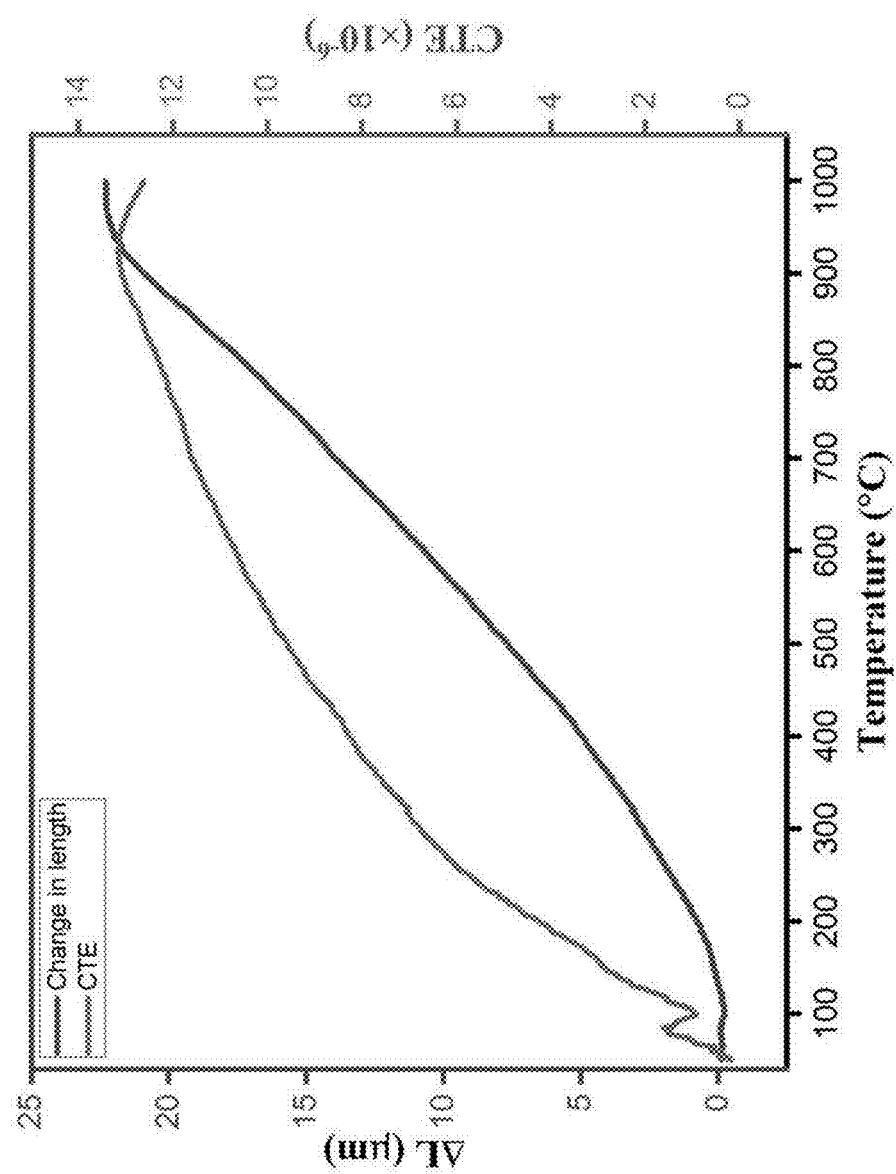
FIG. 13 shows the coefficient of thermal expansion (CTE) test results for a sintered sample according to an embodiment of the subject invention. The experiment was conducted from room temperature to 1000° C. The final CTE value was approximately 12.5×10⁻⁶.

Further, to assess the thermal stability of these sintered samples, thermal diffusivity and conductivity were measured in the temperature range of room temperature to 500° C. (FIG. 12). At room temperature, the thermal diffusivity was 0.30 $mm^2$/s which reduces to ~0.23 $mm^2$/s at 500° C. Similarly, the thermal conductivity varies from ~0.73 W/m/K to ~0.64 W/m/K. The decrease in thermal conductivity has been attributed to the photon scattering in oxide ceramics. To complement the high-temperature stability of the sintered 3DP lunar regolith, the coefficient of thermal expansion (CTE) was measured in the temperature range of room temperature to 500° C. (FIG. 13). The CTE value was ~9.5×$10^{-6}$ $K^{-1}$ at 500° C. This is similar to the alumina CTE, a major component of Greenland regolith simulant, 8.8× $10^{-6}$ $K^{-1}$. It is to be noted here that the kink in the plot (at temperature <100° C., see FIG. 16) is due to stabilization in the temperature in the lower regime. The moon's surface has a temperature variation of ~255.15° C.-165.85° C. Hence, buildings on the moon's south pole crafted out of regolith will thermally expand and contract similarly to concrete buildings on Earth. The results on sintered 3DP lunar regolith confirm that the lunar structure built out of the Greenland regolith can sustain the fluctuating temperatures on the south pole while maintaining mechanical integrity.

The feasibility of Greenland Anorthosite lunar regolith ($Al_2O_3$, $SiO_2$, and $Al_2SiO_5$ as major ceramic phases) being printed and sintered with exquisite dimensional intricacy via DLP has been demonstrated. The effect that printing temperature had on print quality has also been elucidated. Samples printed below 25° C. showed larger inter-layer gaps, an abysmal surface finish, and poor dimensional accuracy. In high quality pieces printed at 25° C., the shrinkage was ~6% in the x and y directions, respectively, while ~14% in the z-direction due to gravity. Microstructural and TGA results verified complete pyrolysis (removal of resin) and sintering of the regolith. The hardness of ~9.3 GPa and failure of the intricate cube at the maximum load of 298 N under compression illustrate the nodes at which fracture begins before the sample catastrophically fails. FEM analysis examined the entire geometry's stress, strain, and deformation of each layer in a static structural simulation. The model was validated by the experimental compression test. In-situ infrared thermal imaging at elevated and sub-zero temperatures shows a higher dissipation rate of sintered lunar regolith. This is further supported by the sight change in the thermal conductivity from 0.73 W/m/K at RT to 0.64 W/m/K at 500° C. The decrease in thermal conductivity with an increase in temperature is attributed to the phonon scattering phenomenon in ceramics. The lower CTE of the sintered sample ~$9.5 \times 10^{-6}$ $K^{-1}$ insinuates that a structure built out of Greenland regolith would be able to sustain when exposed to the lunar temperature range, from coldest to hottest.

Turning now to the figures, FIG. 1A shows a GALR slurry according to an embodiment of the subject invention. The slurry has a composition of 60 wt % Greenland Anorthosite and 40 wt % resin.

Figure 1B:
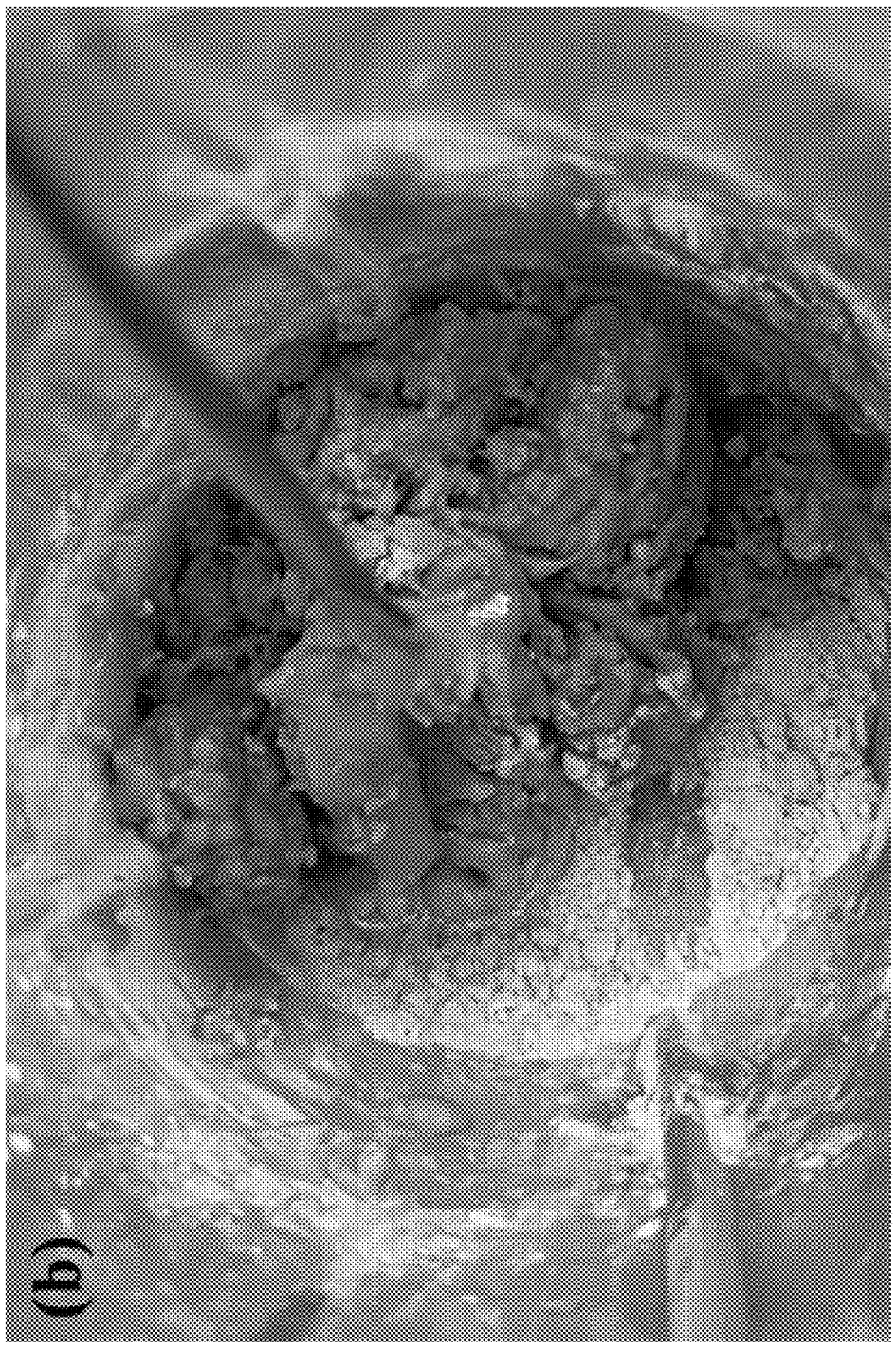
FIG. 1B shows a GALR slurry according to an embodiment of the subject invention. The slurry has a composition of 70 wt % Greenland Anorthosite Regolith and 30 wt % resin. A change in flowability can be seen, with respect to FIG. 1A.

FIG. 1B shows a GALR slurry according to an embodiment of the subject invention. The slurry has a composition of 70 wt % Greenland Anorthosite Regolith and 30 wt % resin. A change in flowability can be seen, with respect to FIG. 1A.

FIG. 2A shows a pre-sintered Greenland Anorthosite Regolith DLP 3D printed part created at 20° C. ambient temperature according to an embodiment of the subject invention. The yellowish cast on the left face of the part is due to uneven lighting while capturing the picture.

Figure 2B:
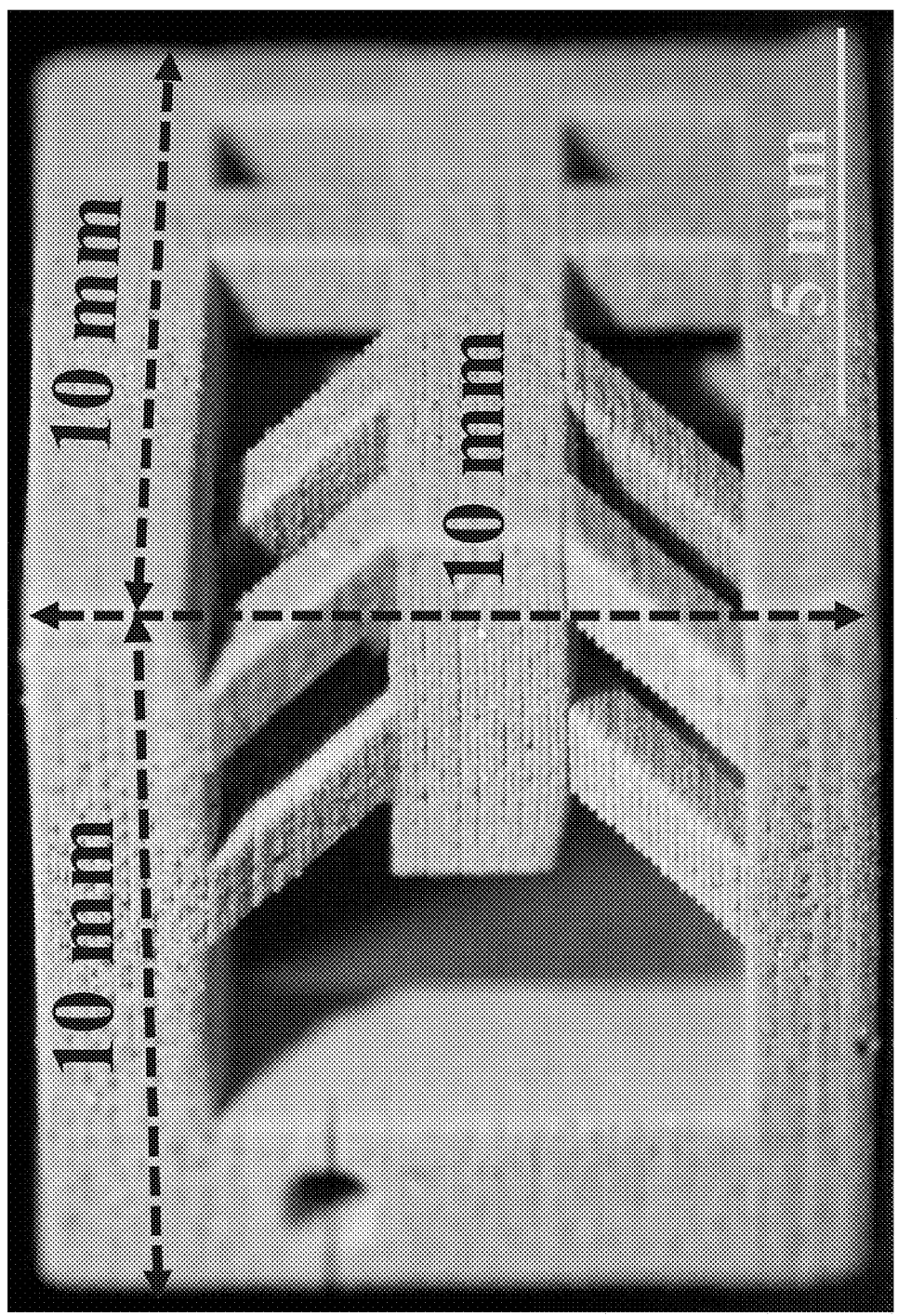
FIG. 2B shows a pre-sintered Greenland Anorthosite Regolith DLP 3D printed part created at 25° C. ambient temperature according to an embodiment of the subject invention.

FIG. 2B shows a pre-sintered Greenland Regolith DLP 3D printed part according to an embodiment of the subject invention.

Figure 2C:
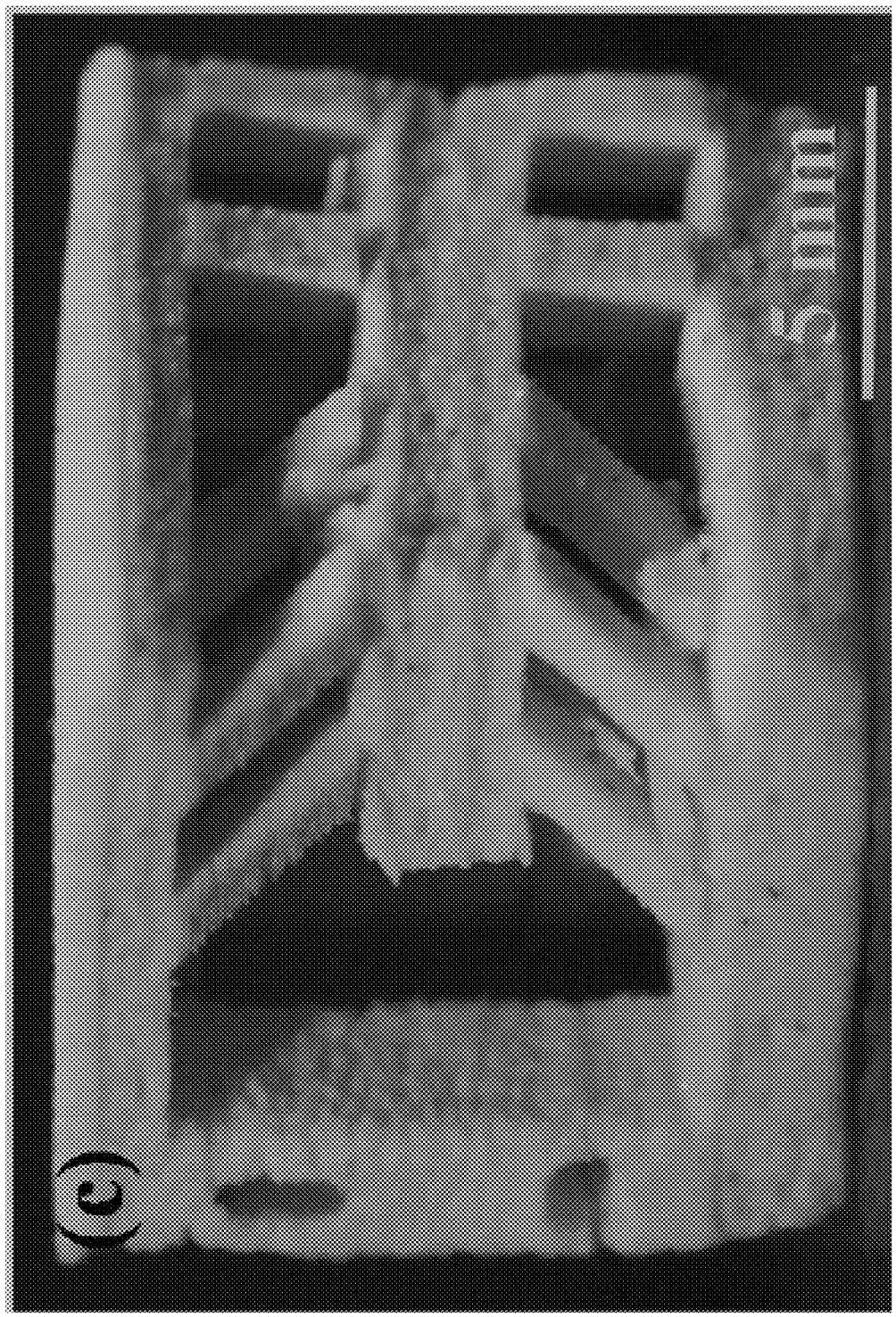
FIG. 2C shows a post-sintered Greenland Anorthosite Regolith DLP 3D printed part created at 20° C. ambient temperature according to an embodiment of the subject invention.

FIG. 2C shows a post-sintered Greenland Anorthosite Regolith DLP 3D printed part created at 20° C. ambient temperature according to an embodiment of the subject invention.

Figure 2D:
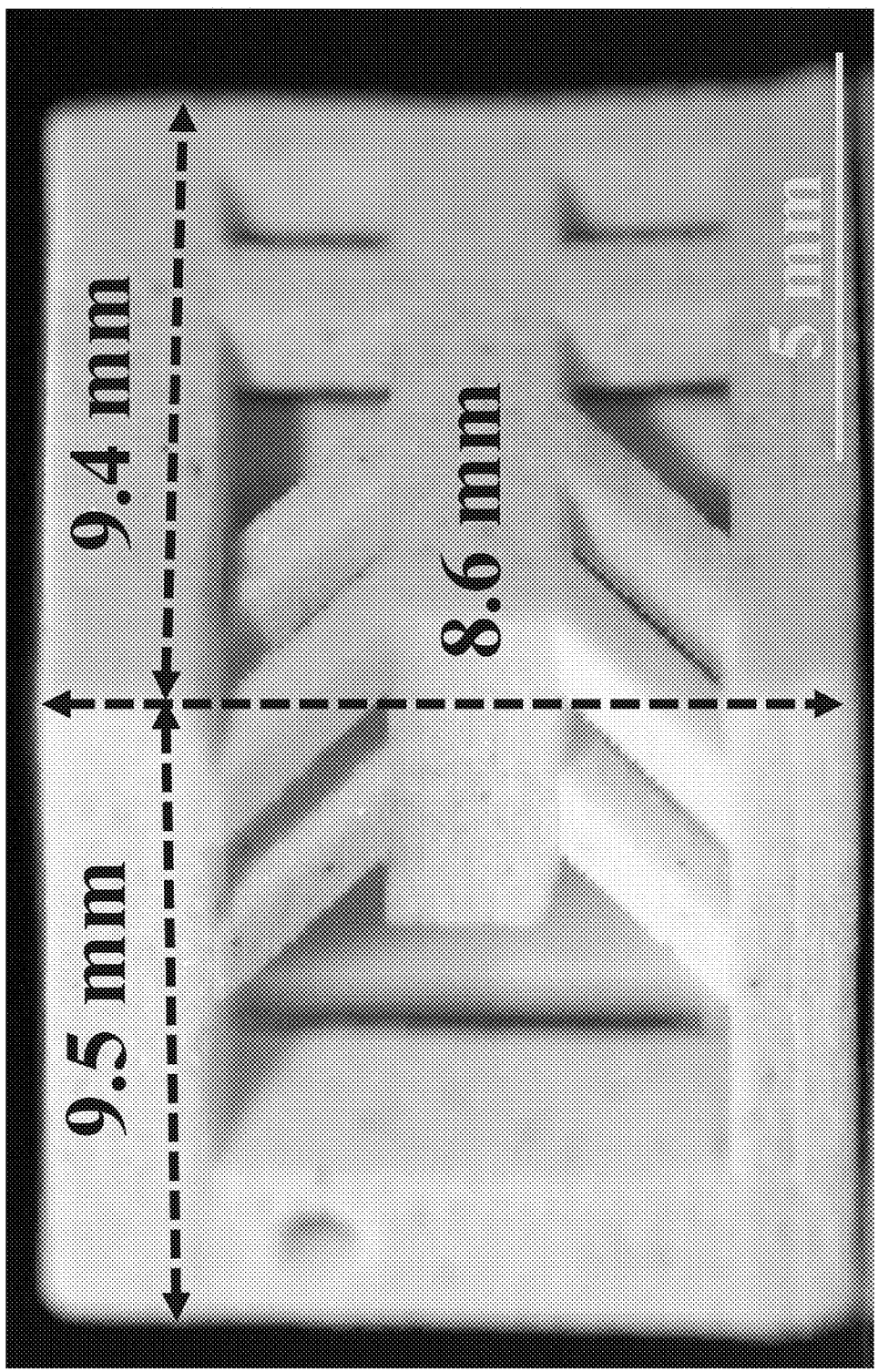
FIG. 2D shows a post-sintered Greenland Anorthosite Regolith DLP 3D printed part created at 25° C. ambient temperature according to an embodiment of the subject invention. The shrinkage along the x and y-axis is less than 6%.

FIG. 2D shows a post-sintered Greenland Anorthosite Regolith DLP 3D printed part according to an embodiment of the subject invention. The shrinkage along the x and y-axis is less than 6%.

Figure 3A:
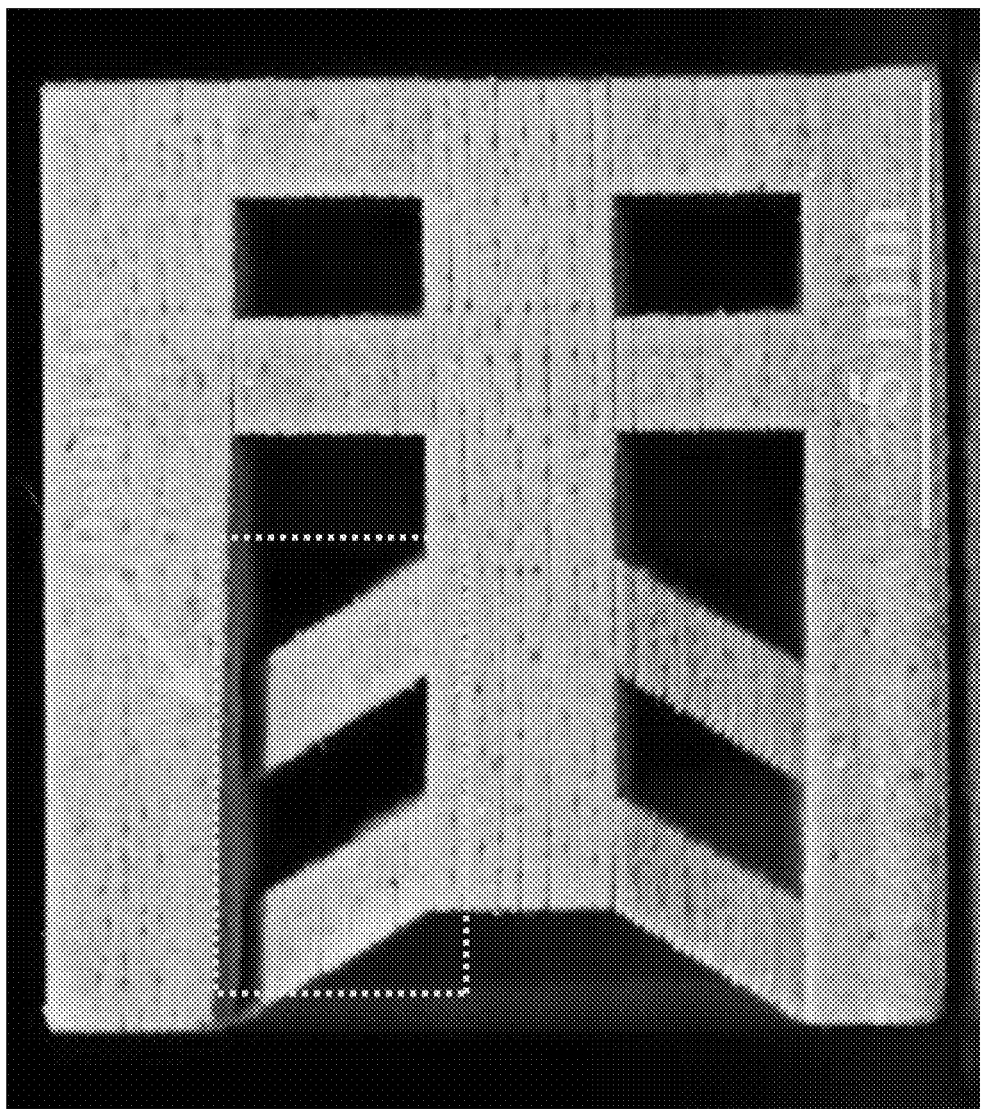
FIG. 3A shows a pre-sintered Greenland Anorthosite Regolith DLP 3D printed complex cube according to an embodiment of the subject invention.
Figure 3B:
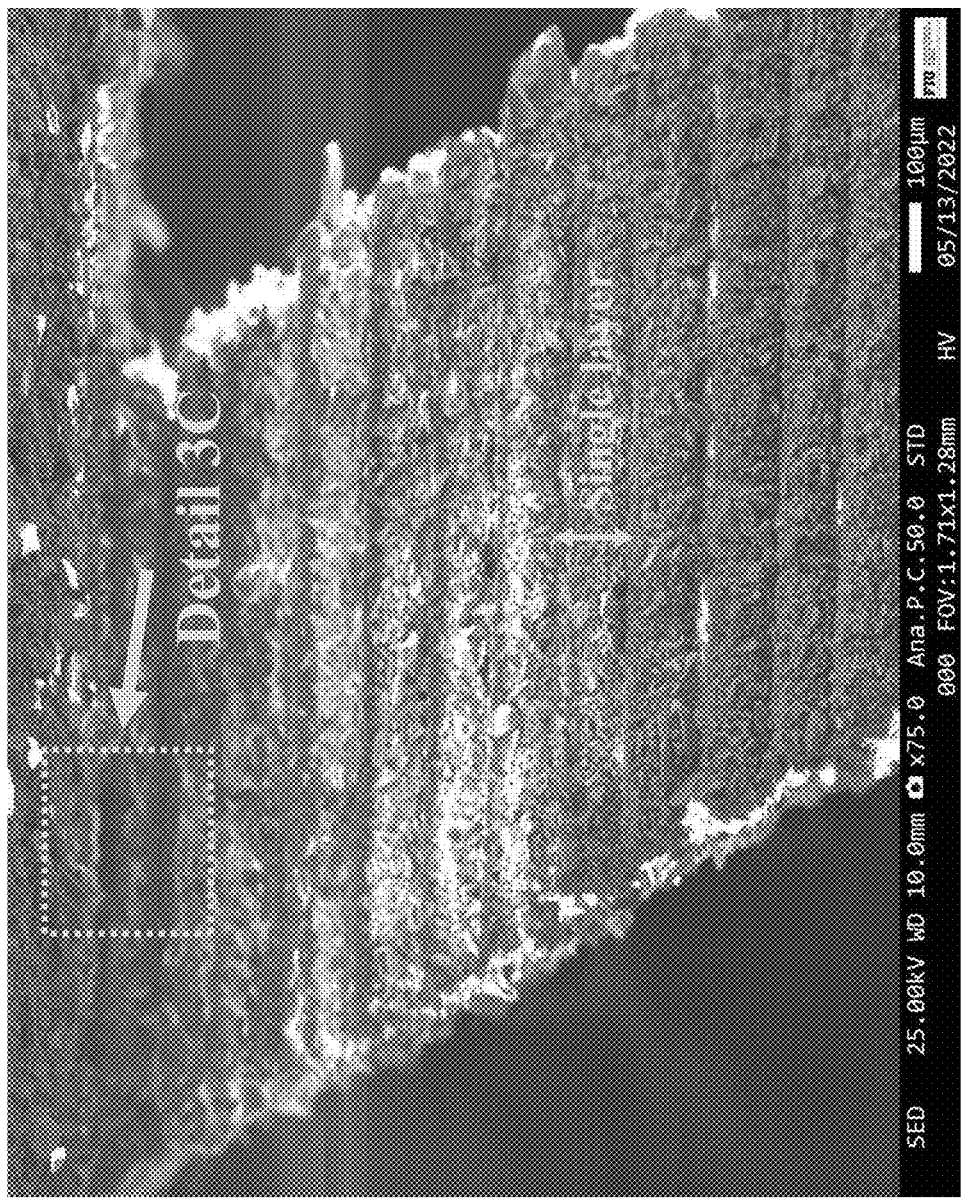
FIGS. 3B-3D show progressively detailed and higher magnification scanning electron microscopy (SEM) photographs of a pre-sintered Greenland Anorthosite Regolith DLP 3D printed complex cube according to an embodiment of the subject invention.
Figure 3C:
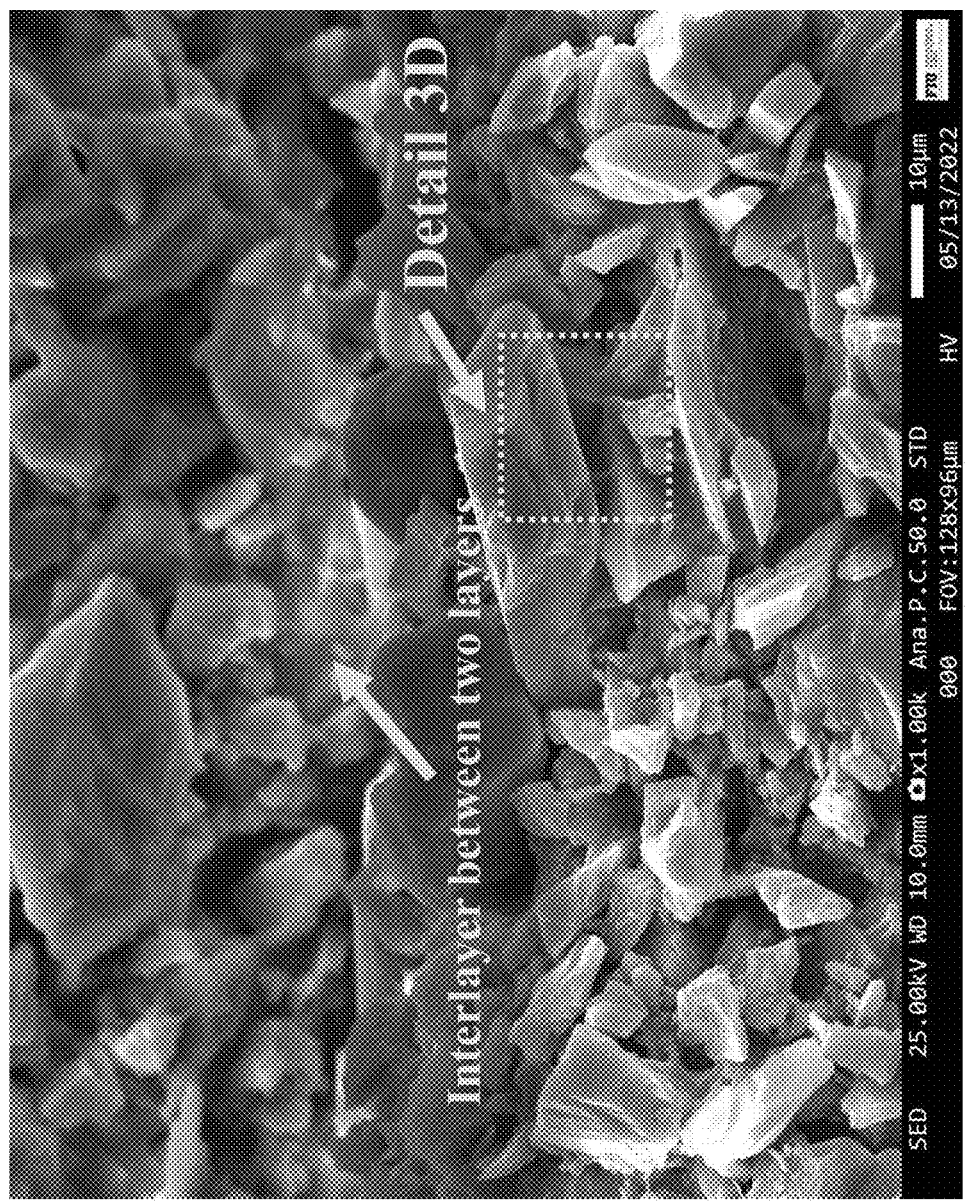

FIG. 3A shows a pre-sintered Greenland Anorthosite Regolith DLP 3D printed complex cube according to an embodiment of the subject invention.

Figures 3C, 3D:
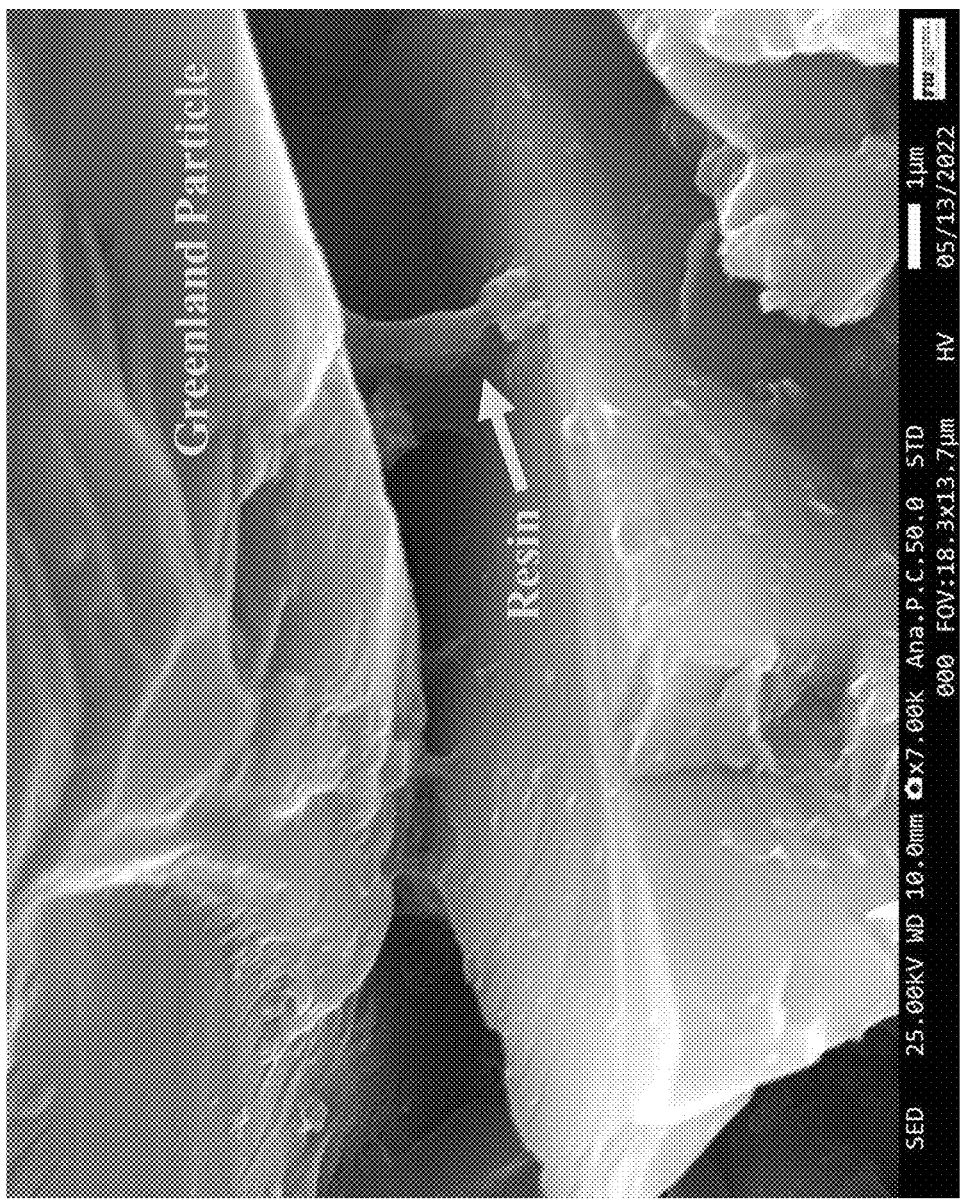

FIGS. 3B-3D show progressively detailed and higher magnification scanning electron microscopy (SEM) photographs of a pre-sintered Greenland Anorthosite Regolith DLP 3D printed complex cube according to an embodiment of the subject invention. In FIG. 3D, resin can be seen bonding two regolith particles together.

Figure 4A:
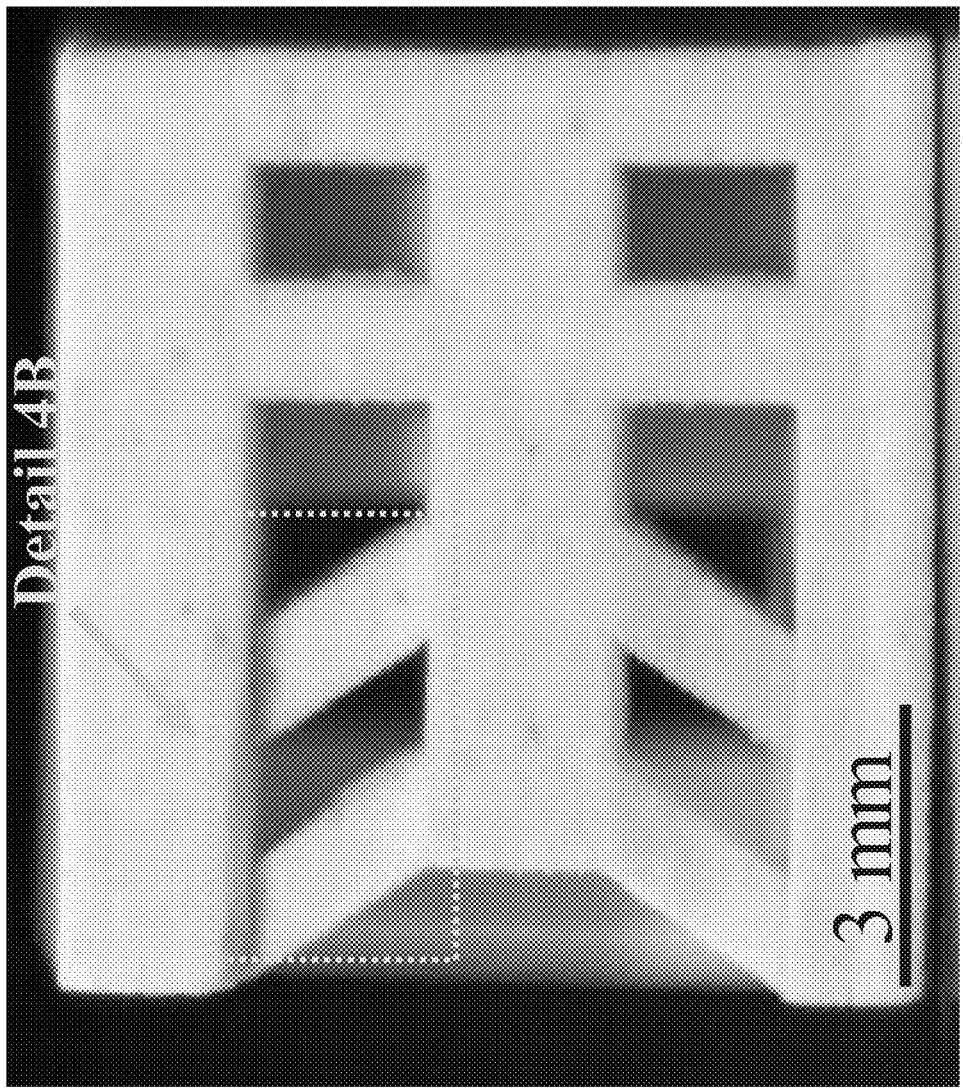
FIG. 4A shows a post-sintered Greenland Anorthosite Regolith DLP 3D printed complex cube according to an embodiment of the subject invention.
Figure 4B:
FIGS. 4B-4E show progressively detailed and higher magnification scanning electron microscopy (SEM) photographs of a post-sintered Greenland Anorthosite Regolith DLP 3D printed complex cube according to an embodiment of the subject invention.
Figure 4C:
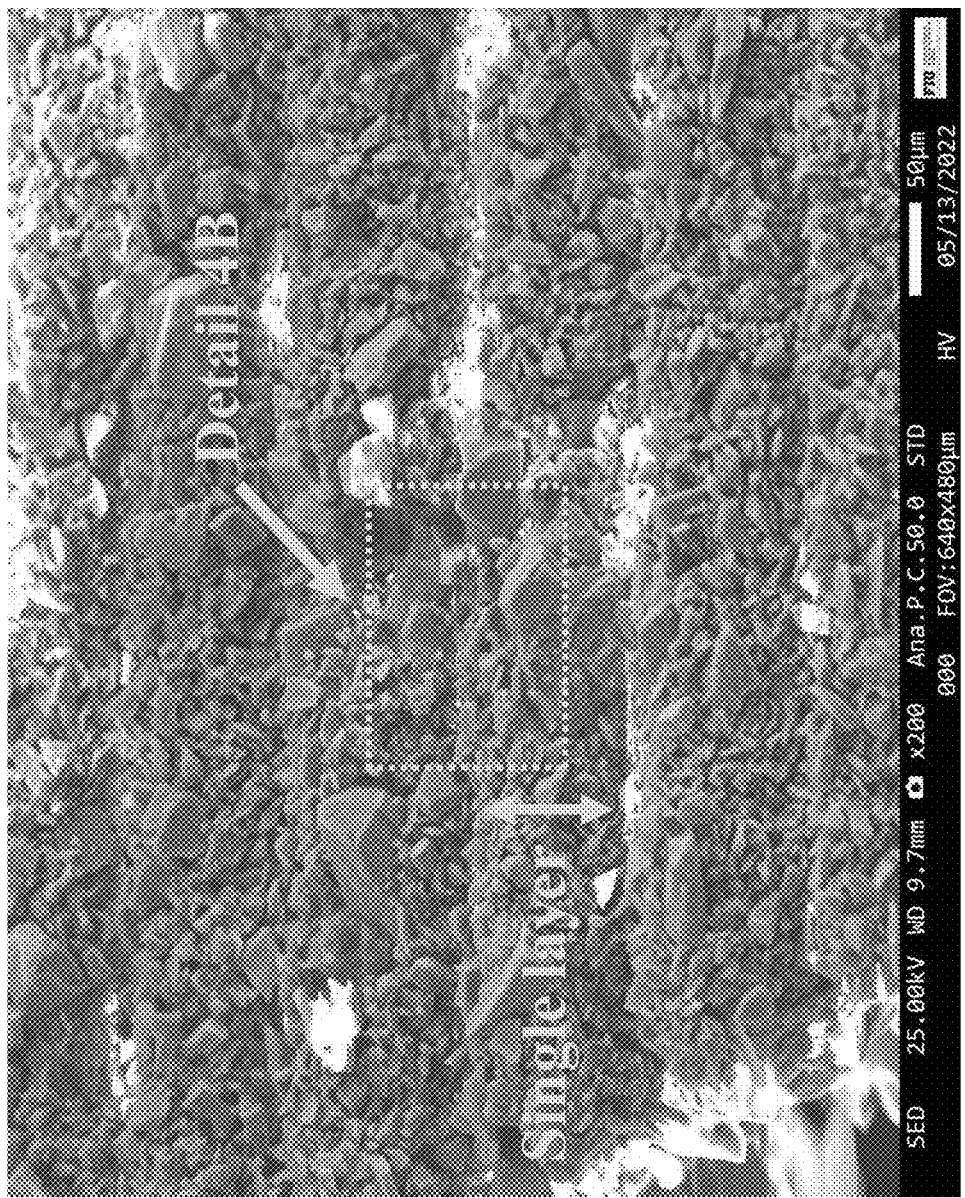

FIG. 4A shows a post-sintered Greenland Anorthosite Regolith DLP 3D printed complex cube according to an embodiment of the subject invention.

Figures 4C, 4D:
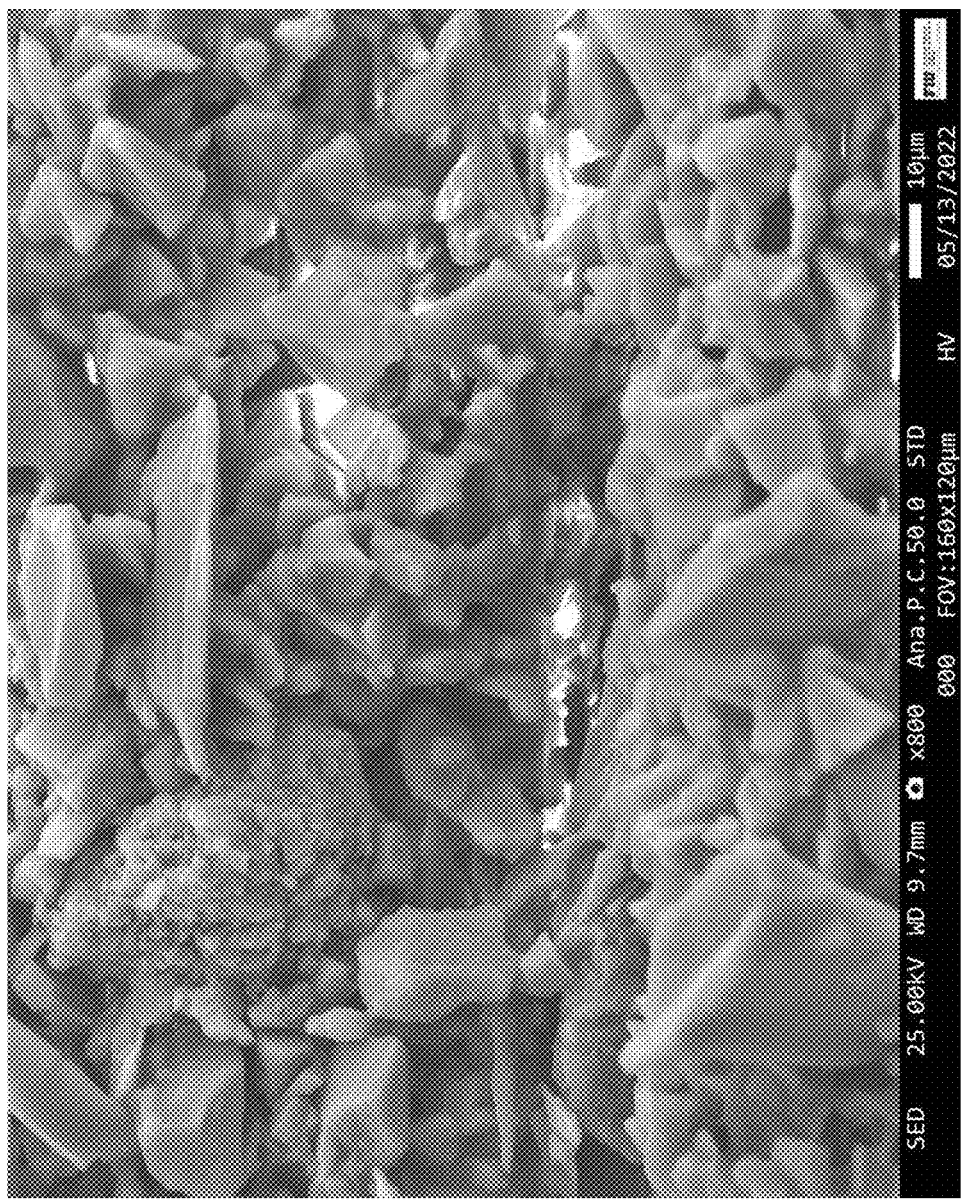
Figure 4E:
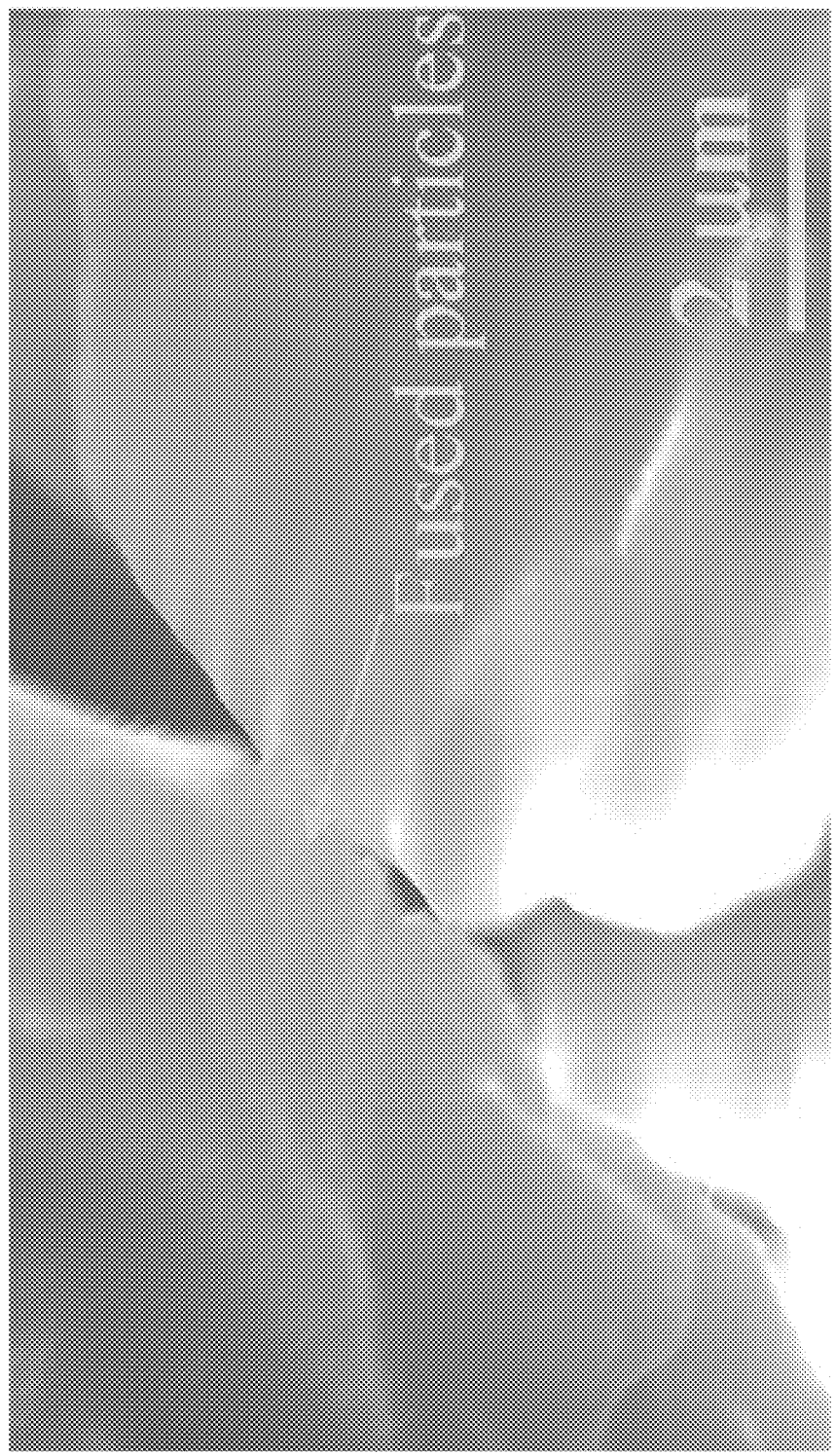

FIGS. 4B-4E show progressively detailed and higher magnification scanning electron microscopy (SEM) photographs of a post-sintered Greenland Anorthosite Regolith DLP 3D printed complex cube according to an embodiment of the subject invention. In FIGS. 4D and 4E, it can be seen that there is no resin bonding the regolith particles together. In FIG. 4E, two regolith particles can be seen fused together. As the printed part is sintered, the resin is vaporized and removed. During this process, the regolith particles fuse.

FIG. 5A shows three different non-sintered Greenland Anorthosite Regolith DLP 3D printed complex cube parts, each respectively according to an embodiment of the subject invention. Each respective part has a complex geometry that is 10 mm×10 mm×10 mm.

Figure 5B:
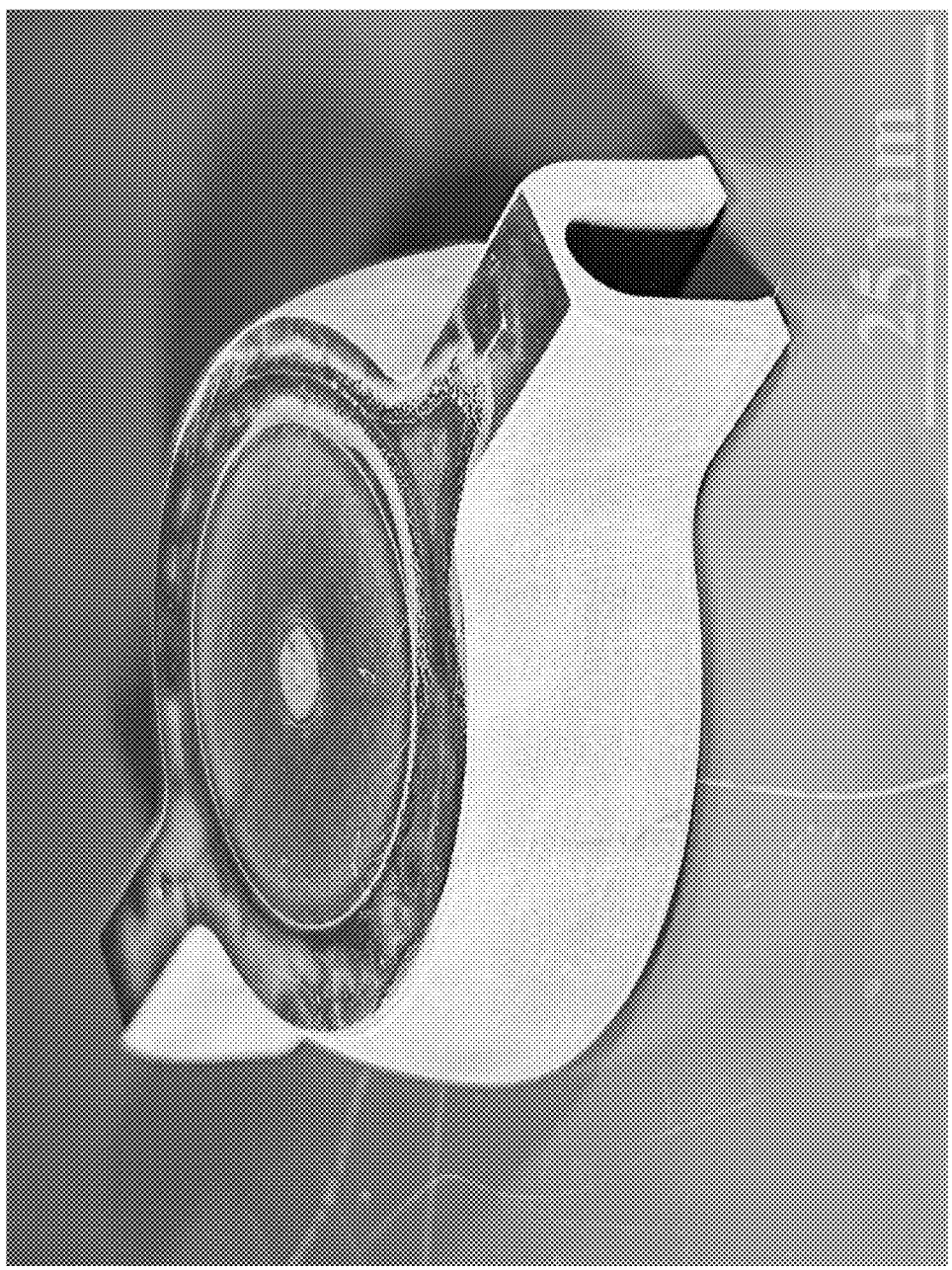
FIG. 5B shows a scale model Lunar igloo designed to house extraterrestrial colonists according to an embodiment of the subject invention. The scale model is around 49 mm long and around 27 mm wide

FIG. 5B shows a scale model Lunar igloo designed to house extraterrestrial colonists according to an embodiment of the subject invention.

Figure 5C:
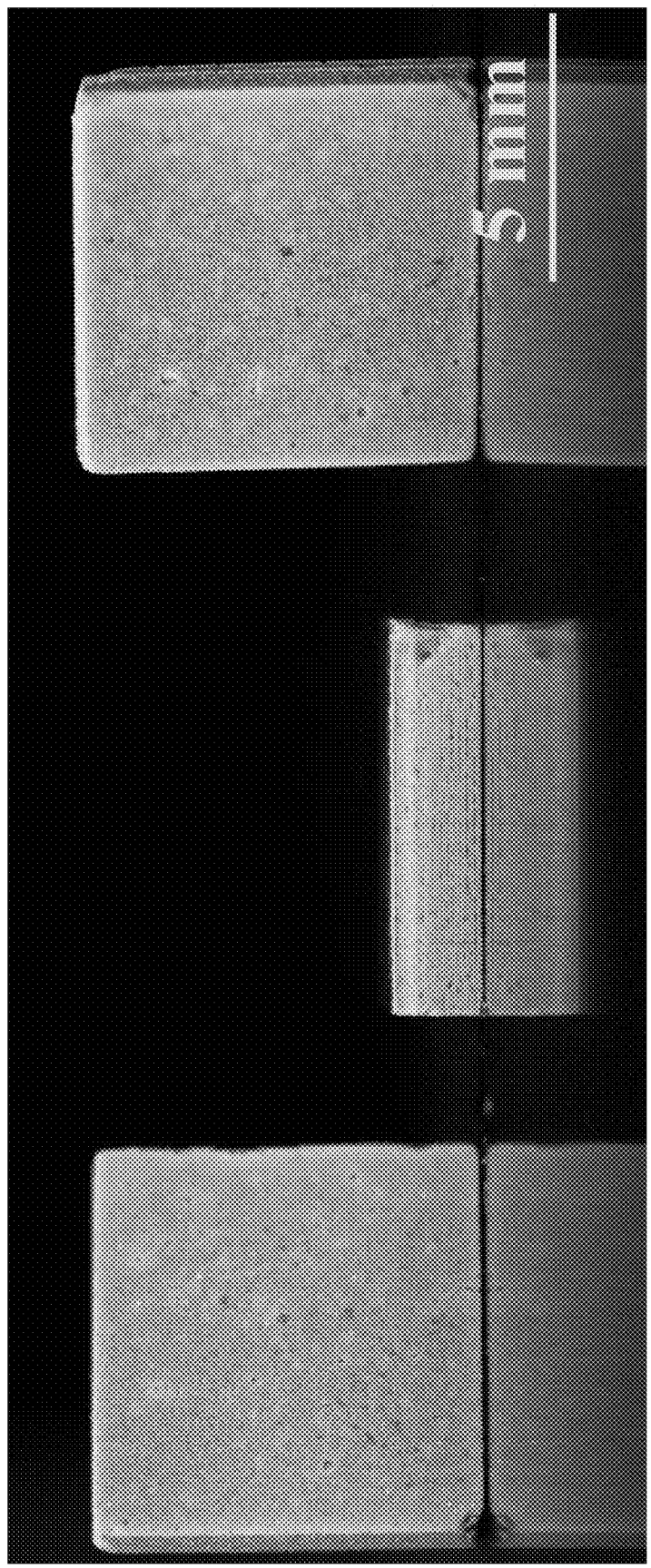
FIG. 5C shows three solid rectangles, each respectively according to an embodiment of the subject invention and each respectively used in testing the material physical and thermal properties according to an embodiment of the subject invention.

FIG. 5C shows three solid rectangles, each respectively according to an embodiment of the subject invention and each respectively used in testing the material physical and thermal properties according to an embodiment of the subject invention.

Figure 5D:
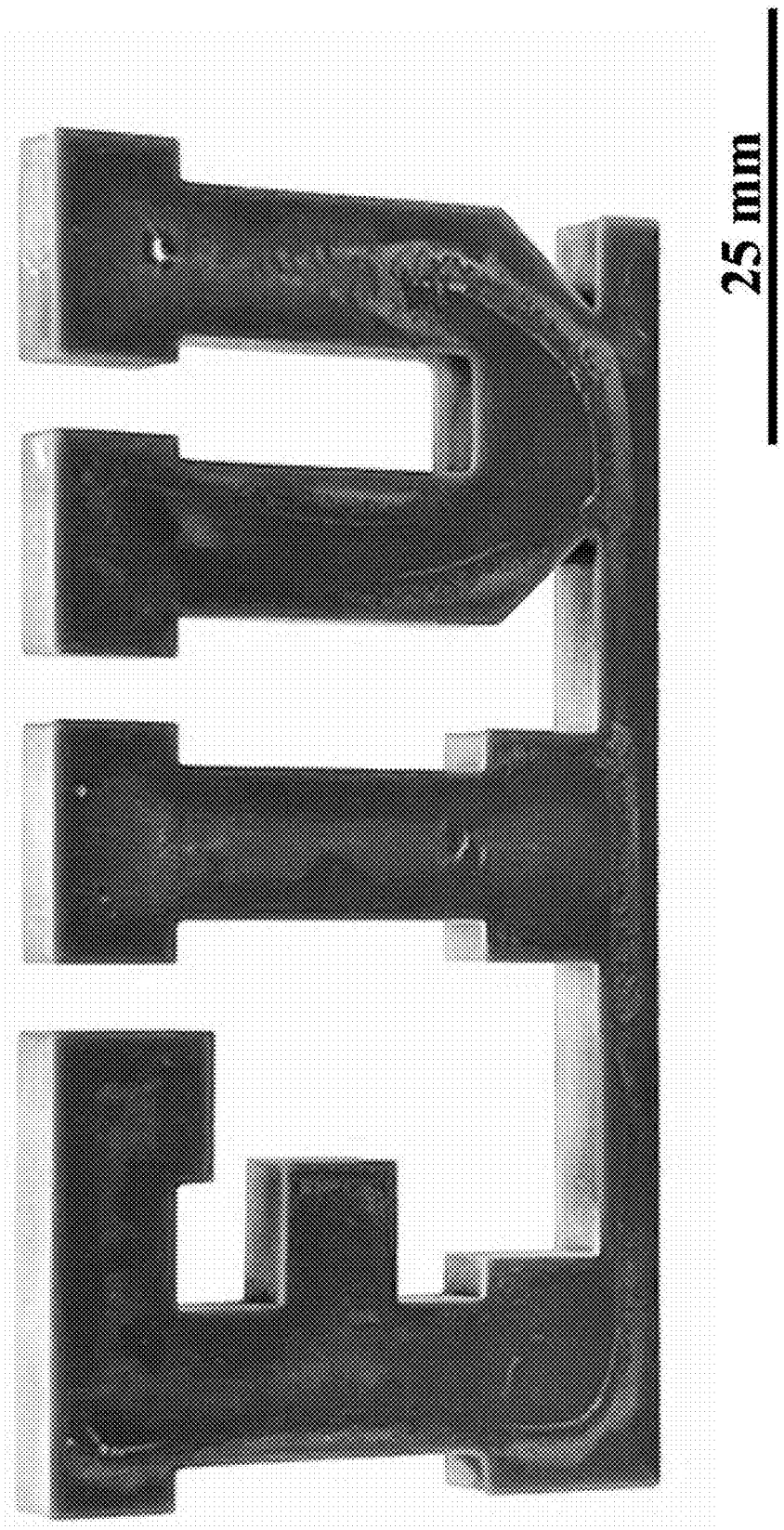
FIG. 5D shows a scale model with thick block lettering including numerous 90° angles and intricate shapes successfully printed according to an embodiment of the subject invention.

FIG. 5D shows a scale model with thick block lettering including numerous 90° angles and intricate shapes successfully printed according to an embodiment of the subject invention.

Figure 6A:
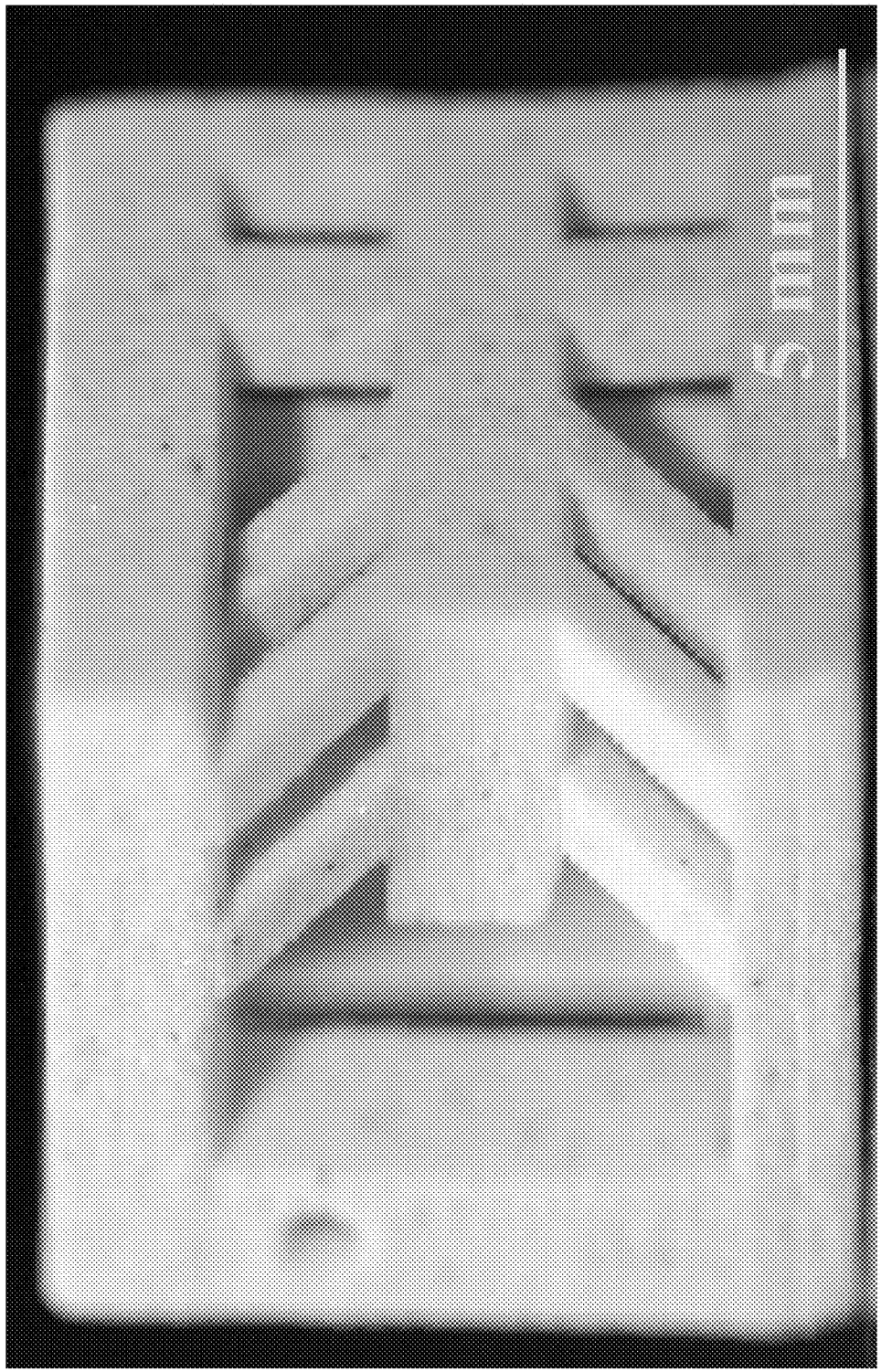
FIGS. 6A-6G show sintered parts that are printed in Greenland Anorthosite Regolith, each respectively according to an embodiment of the subject invention. The parts shown in FIGS. 6A and 6B each respectively have a complex geometry with less than 6% shrinkage on the x and y-axis. The part shown in FIG. 6C is a scale model Lunar igloo. The part shown in FIG. 6D is a solid rectangle. The part shown in FIG. 6E is a non-sintered complex cube. The part shown in FIG. 6F is a sintered complex cube. The parts shown in FIG. 6G are each, respectively, a different alternative embodiment of a sintered complex cube.
Figure 6B:
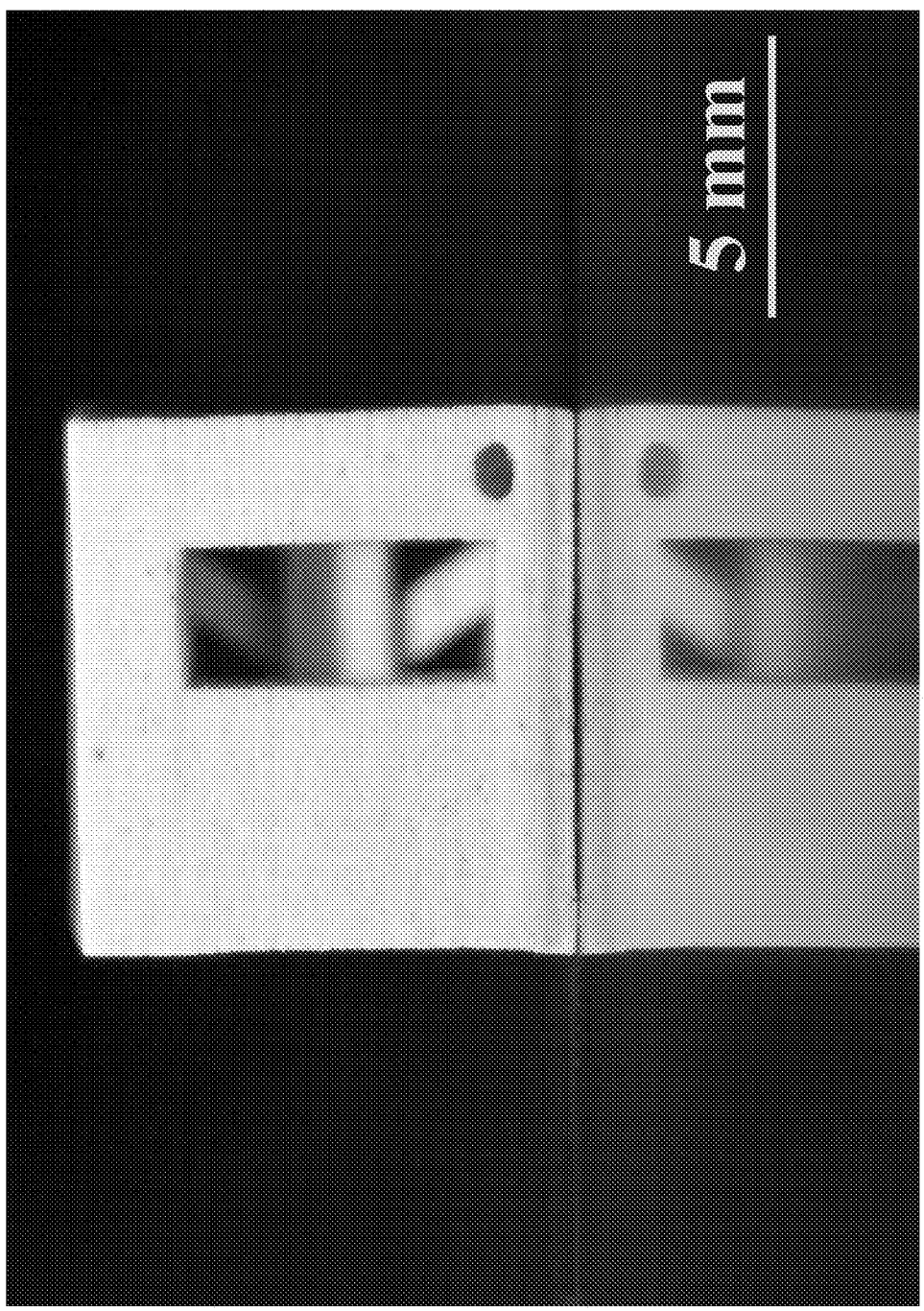
Figure 6C:
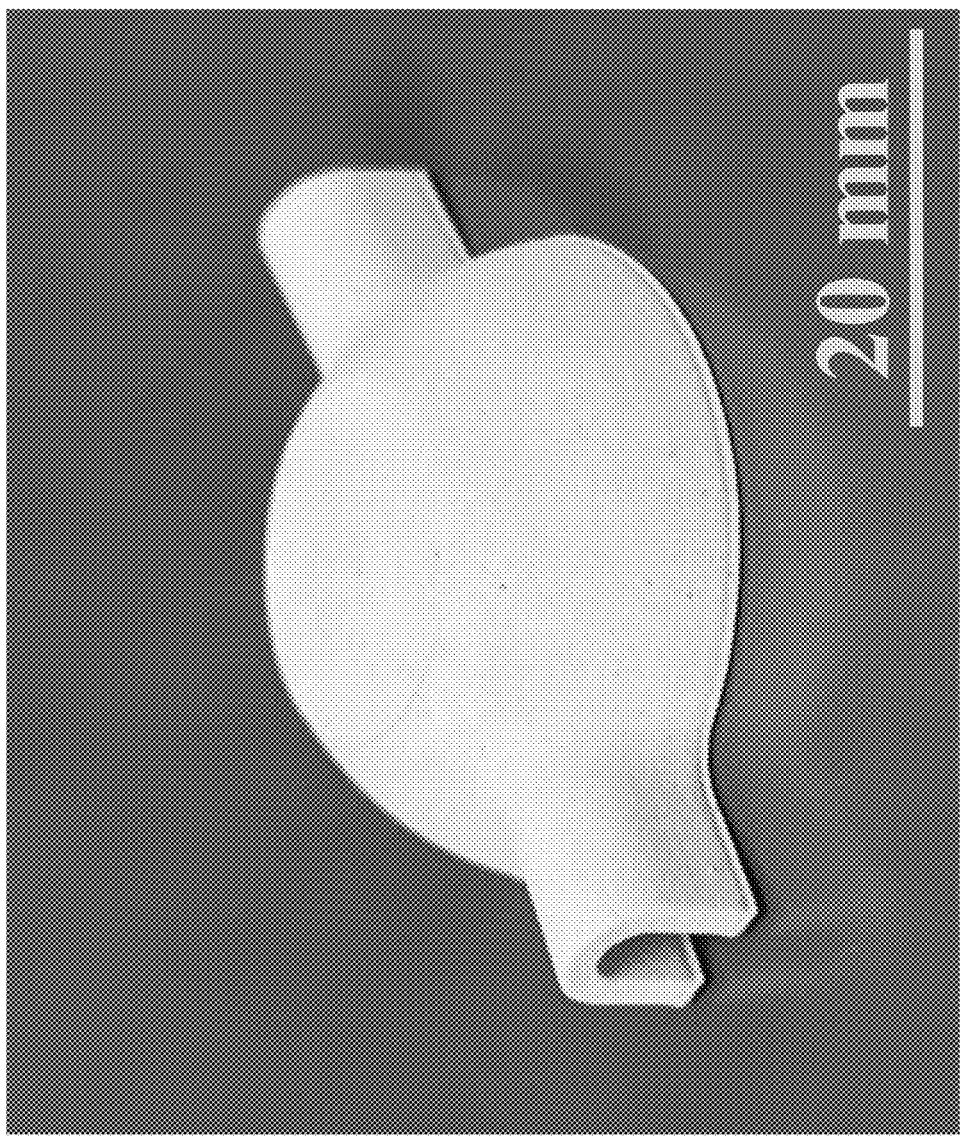
Figure 6D:
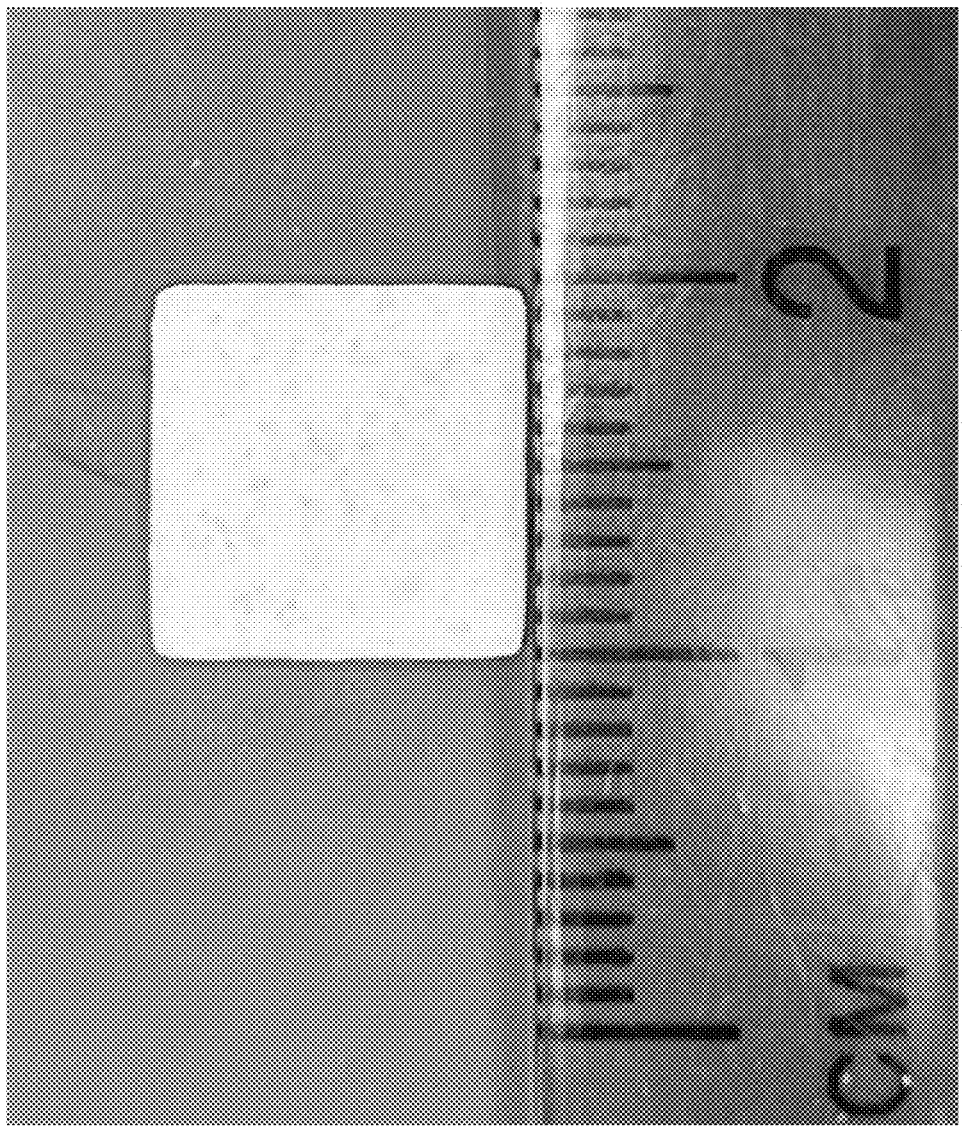
Figure 6E:
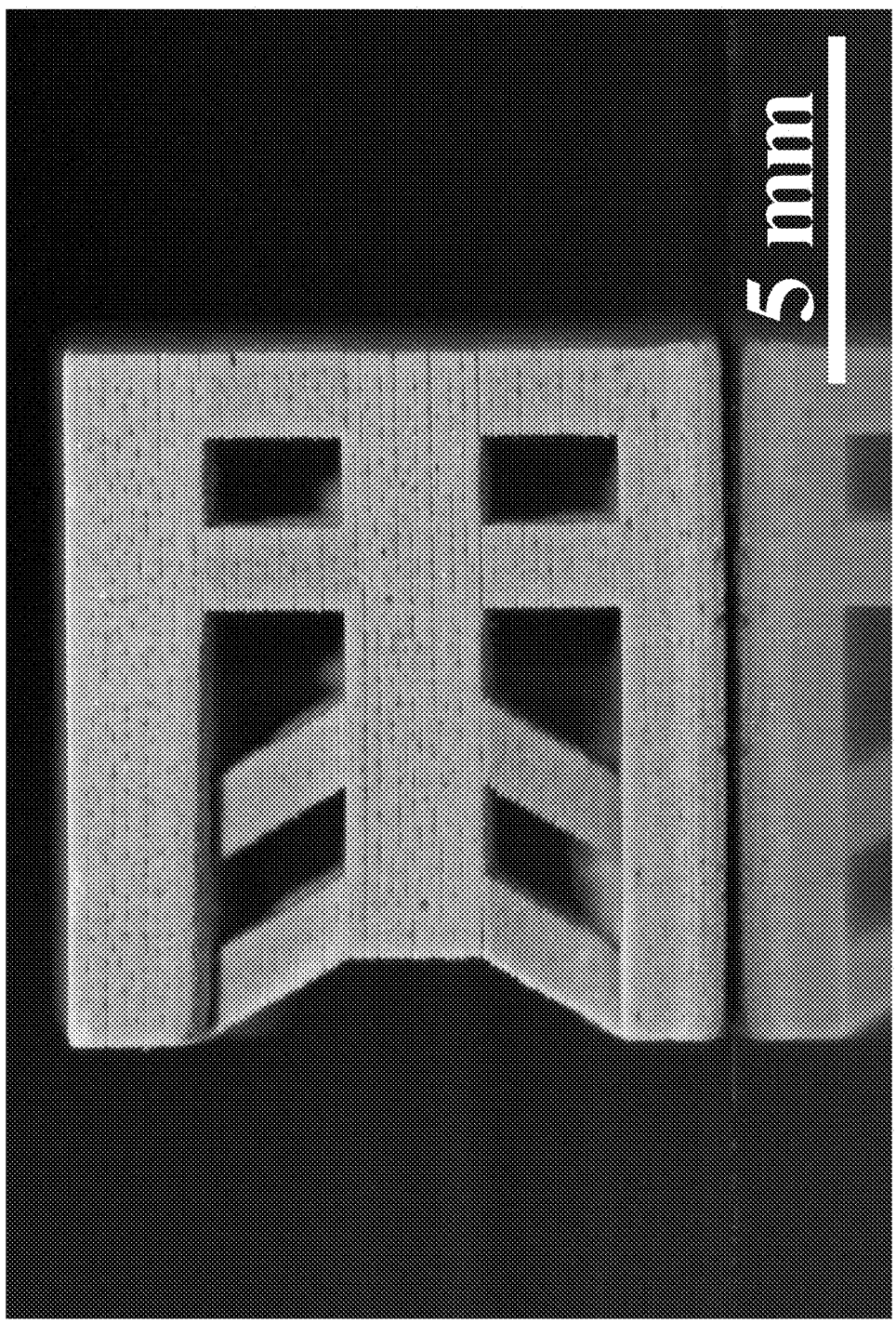
Figure 6F:
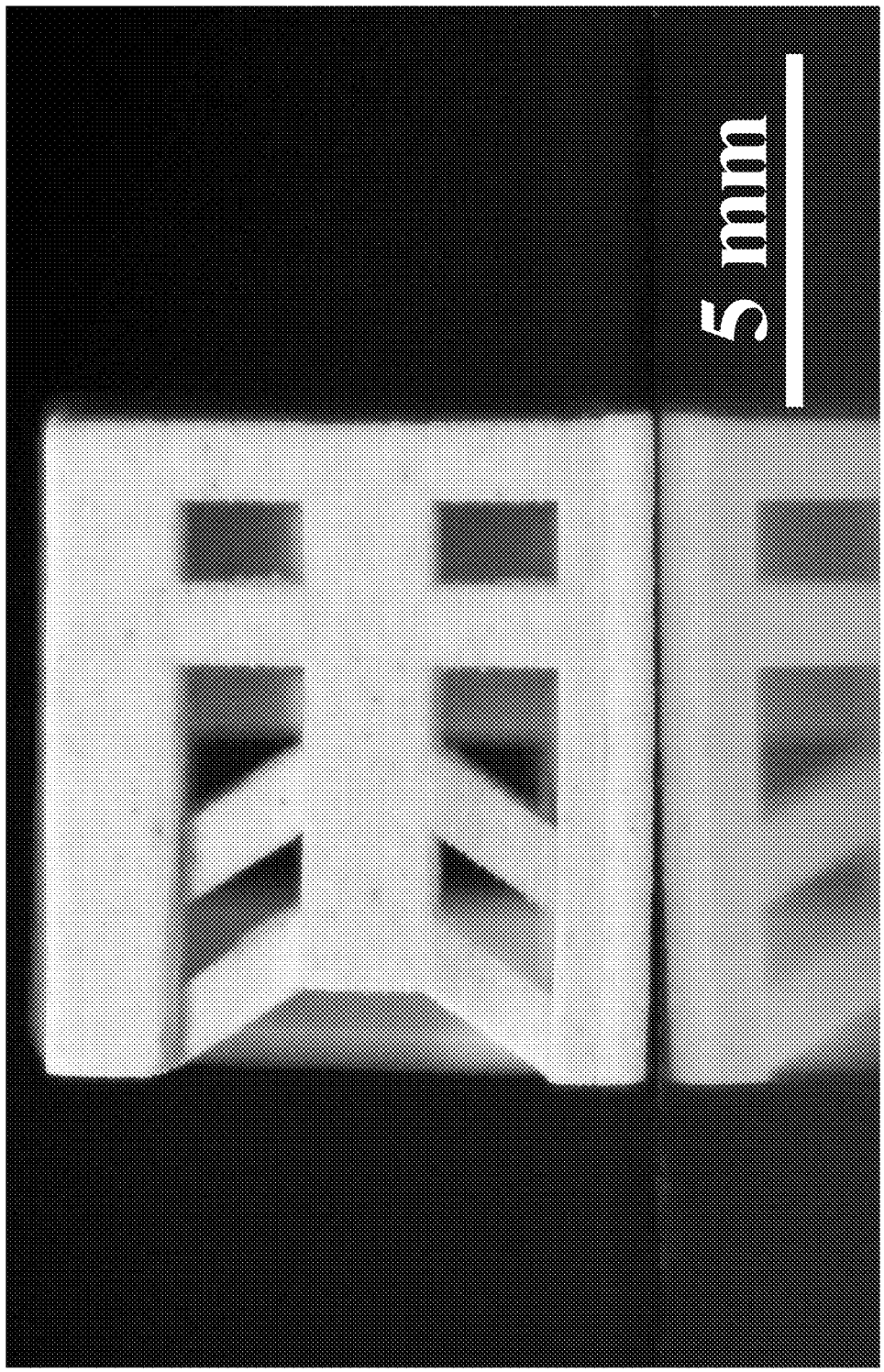
Figure 6G:
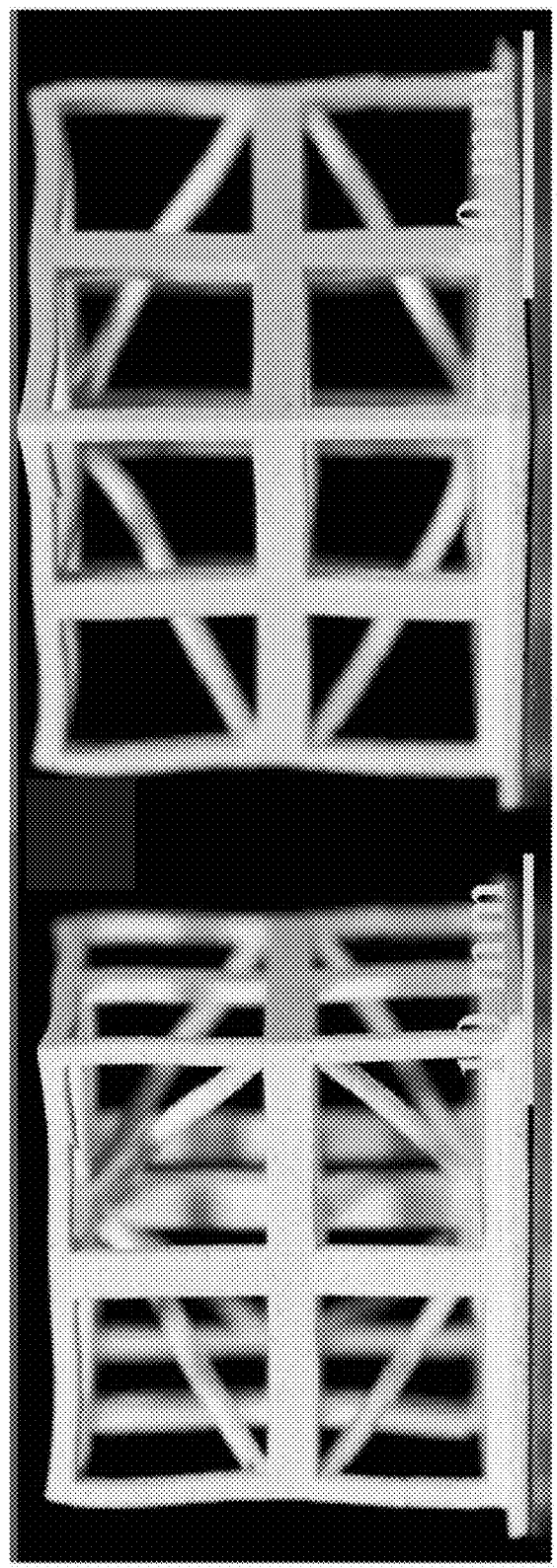

FIGS. 6A-6G show sintered parts that are printed in Greenland Anorthosite Regolith, each respectively according to an embodiment of the subject invention. The parts shown in FIGS. 6A and 6B each respectively have a complex geometry with less than 6% shrinkage on the x and y-axis. The part shown in FIG. 6C is a scale model Lunar igloo. The part shown in FIG. 6D is a solid rectangle. The part shown in FIG. 6E is a non-sintered complex cube. The part shown in FIG. 6F is a sintered complex cube. The parts shown in FIG. 6G are each, respectively, a different alternative embodiment of a sintered complex cube.

Figure 7:
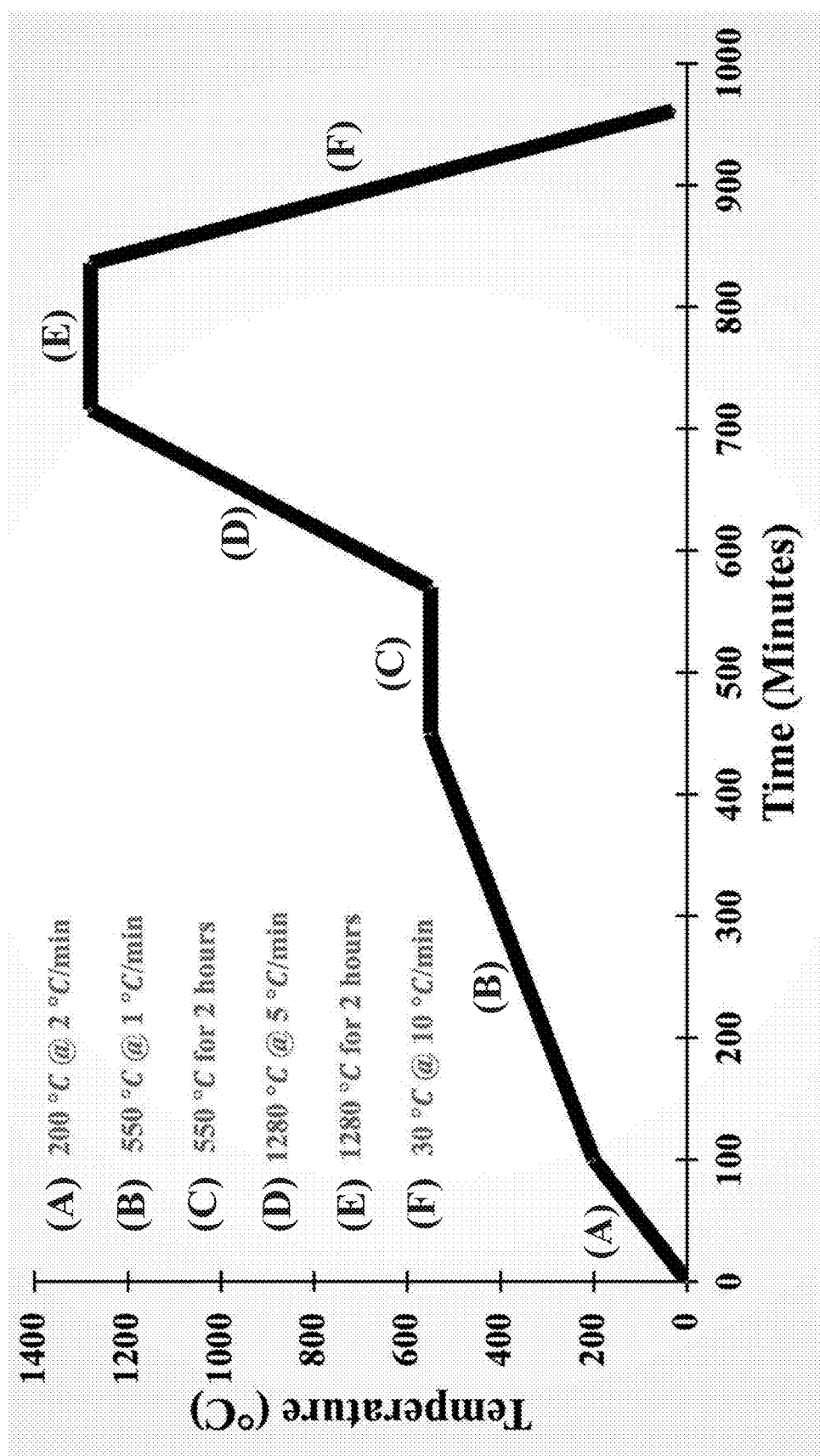
FIG. 7 is a chart showing the sintering parameters over time for certain DLP 3D printed parts in an ambient air box furnace according to an embodiment of the subject invention.

FIG. 7 is a chart showing the sintering parameters over time for certain DLP 3D printed parts in an ambient air box furnace according to an embodiment of the subject invention.

Figure 8:
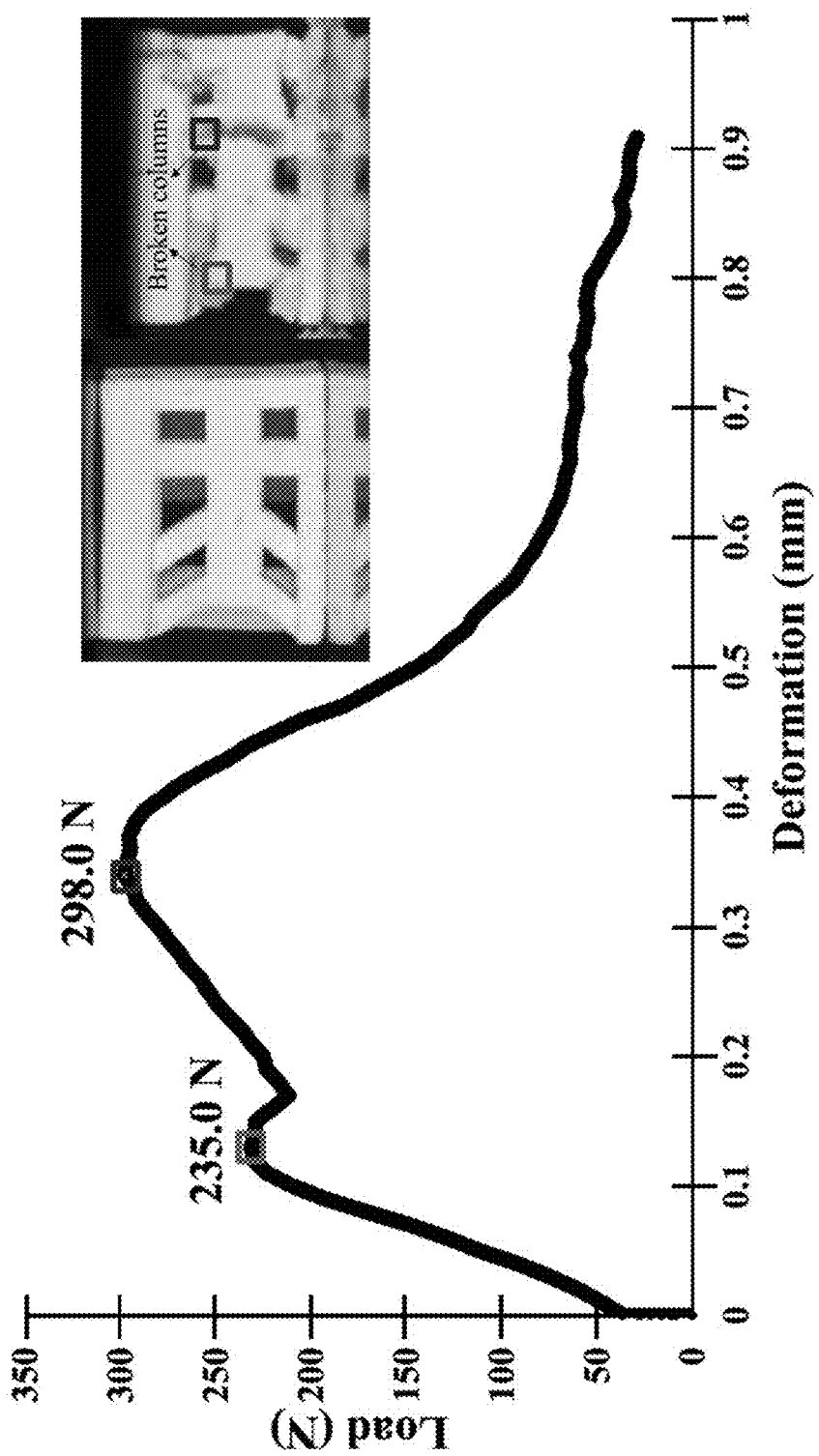
FIG. 8 shows data from compression testing sintered samples according to an embodiment of the subject invention. The maximum load to failure was 298 N. The minimum load was 288 N. The average load was 294.3 N with a standard deviation of 5.5 N across a total of 3 samples tested during this compression experiment.

FIG. 8 shows data from compression testing sintered samples according to an embodiment of the subject invention. The maximum load to failure was 298 N. The minimum load was 288 N. The average load was 294.3 N with a standard deviation of 5.5 N.

Figure 9:
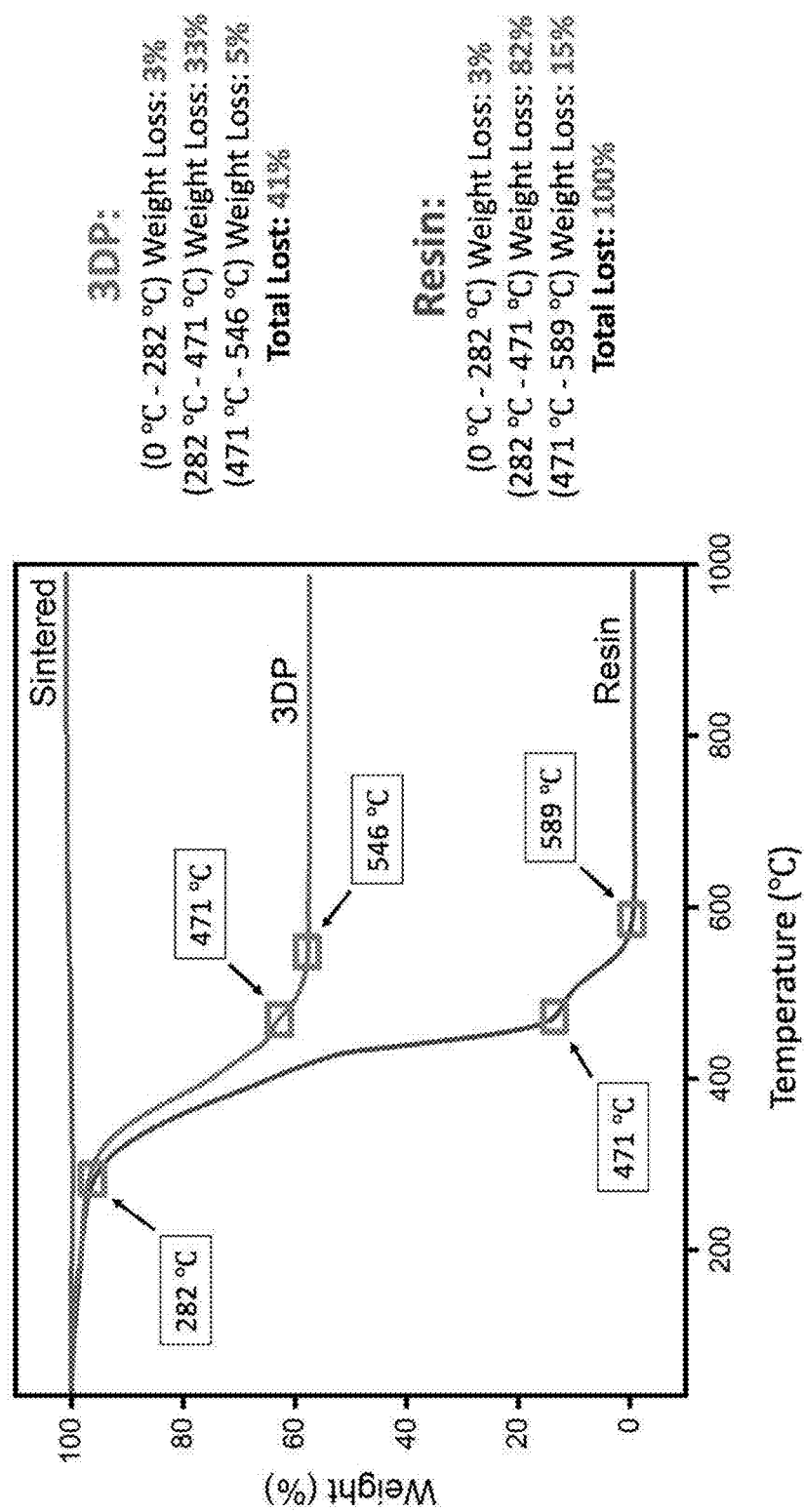
FIG. 9 shows thermogravimetric analysis (TGA) results for sintered, non-sintered, and resin-only samples according to certain embodiments of the subject invention. The sintered sample had an approximately 0% weight loss. The non-sintered sample had an approximately 41% weight loss. The resin sample had an approximately 100% weight loss. This shows that during sintering all the resin that was used in the printing process is removed from the print and all (alternatively, essentially all, most, or the majority of material) that is left is the fused regolith.

FIG. 9 shows thermogravimetric analysis (TGA) results for sintered, non-sintered, and resin-only samples according to certain embodiments of the subject invention. The sintered sample had an approximately 0% weight loss. The non-sintered sample had an approximately 41% weight loss. The resin sample had an approximately 100% weight loss. This shows that during sintering all the resin that was used in the printing process is removed from the print and all (alternatively, essentially all, most, or the majority of material) that is left is the fused regolith.

FIG. 10 shows the respective heating rates of certain sintered and non-sintered samples according to embodiments of the subject invention. The sintered sample conducts heat at a faster rate of 6.4° C./s, while the non-sintered sample conducts heat at a slower rate of 4.7° C./s until both samples start to trend towards equilibrium.

FIG. 11 shows the respective cooling rates of sintered and non-sintered samples according to embodiments of the subject invention. The sintered sample cools down at a faster rate of −0.96° C./s, while the non-sintered sample cools down at a slower rate of −0.76° C./s until both samples start to trend towards equilibrium.

FIG. 12 shows the thermal diffusivity and thermal conductivity of a sintered sample according to an embodiment of the subject invention. The test is conducted from room temperature to 600° C. Thermal diffusivity is 0.3 mm$^2$/s at room temperature. The thermal diffusivity peaked at approximately 125° C. with a value of around 0.31 mm$^2$/s. The thermal diffusivity reached a minimum at approximately 400° C. with a value of around 0.26 mm$^2$/s. At room temperature, the thermal conductivity is 0.83 W/m/k. The thermal conductivity peaked at approximately 125° C. with a value of around 0.86 W/m/k. The thermal conductivity reached a minimum at approximately 400° C. with a value of around 0.72 W/m/k.

FIG. 13 shows the coefficient of thermal expansion (CTE) test results for a sintered sample according to an embodiment of the subject invention. The experiment was conducted from room temperature to 1000° C. The final CTE value was approximately 12.5×10$^{-6}$.

FIGS. 14A-14D show the phase, microstructure, atomic composition, and particle size distribution, respectively, of the as-received Greenland Anorthosite regolith powder (e.g., as used in Example 1) according to an embodiment of the subject invention.

Figure 15:
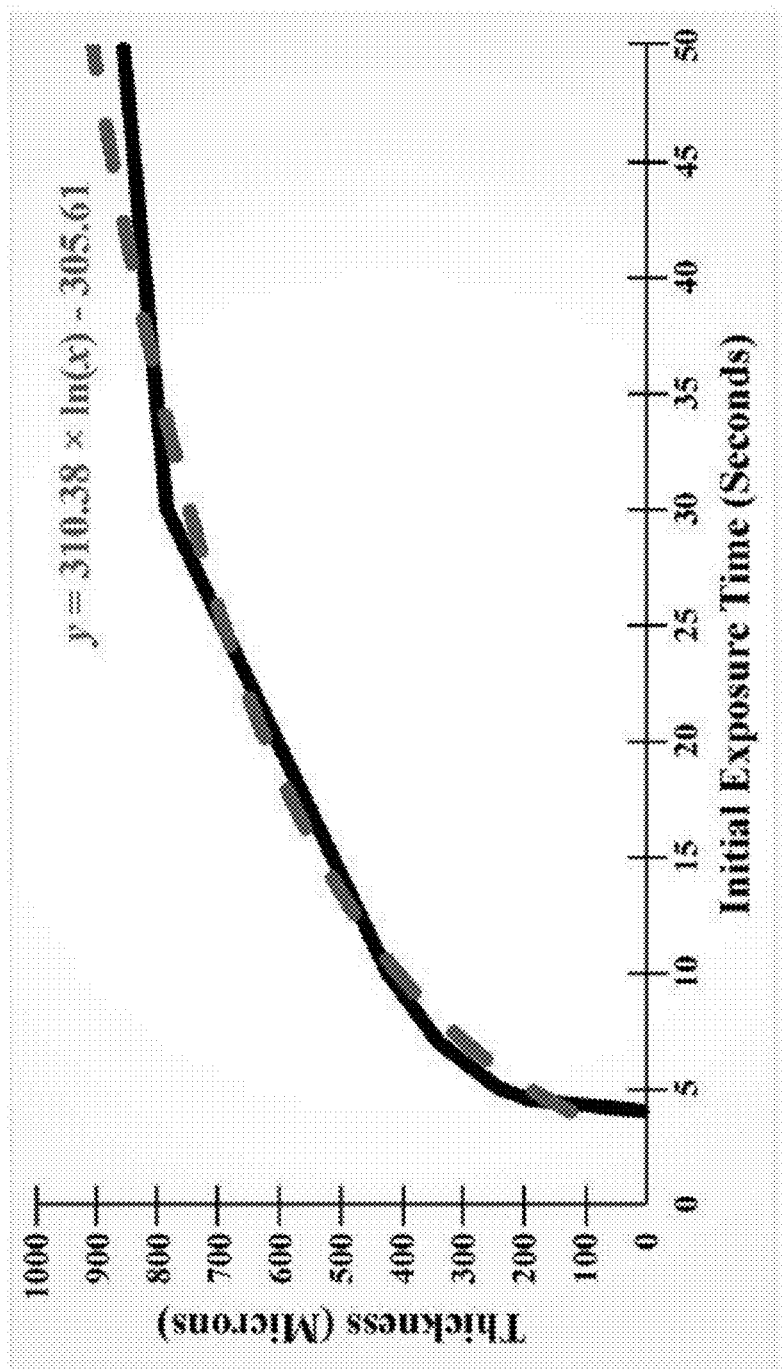
FIG. 15 shows a fitted plot to derive a mathematical equation that describes the relationship between a change in exposure time and printed thickness for 50 wt % lunar regolith with 50 wt % photo-curable polymeric resin according to an embodiment of the subject invention. This data was used to support a parameter development, which was used in a 60 wt % lunar regolith with 40 wt % photo-curable polymeric resin printing process according to an embodiment of the subject invention.

FIG. 15 shows a fitted plot to derive a mathematical equation that describes the relationship between a change in exposure time and printed thickness for 50 wt % lunar regolith with 50 wt % photo-curable polymeric resin according to an embodiment of the subject invention. This data was used to support a parameter development, which was used in a 60 wt % lunar regolith with 40 wt % photo-curable polymeric resin printing process according to an embodiment of the subject invention.

Figure 16:
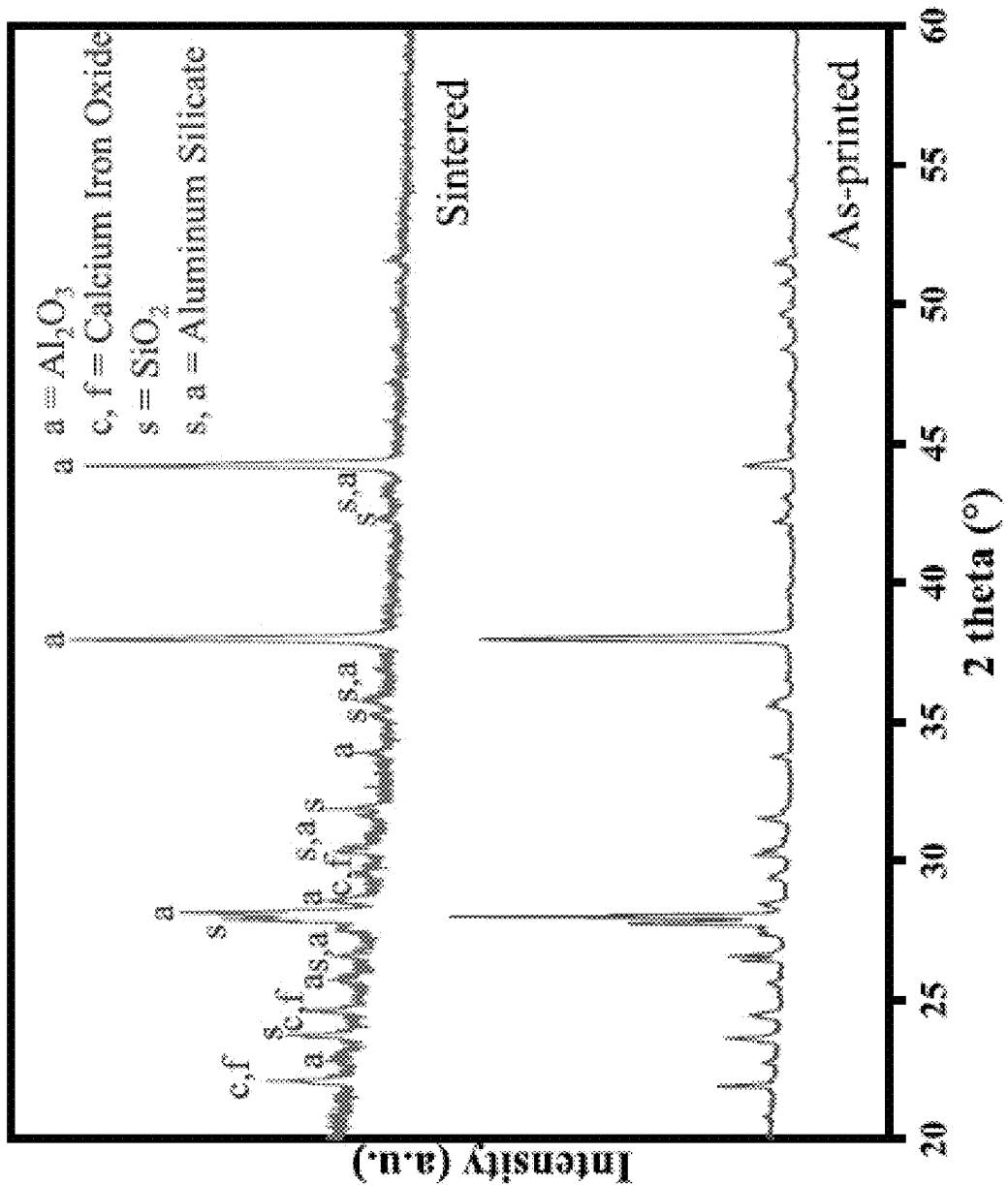
FIG. 16 shows a comparison of the respective XRD pattern of the resin, 3DP cube, and the post sintering 3DP cube according to an embodiment of the subject invention.

FIG. 16 shows a comparison of the respective XRD pattern of the resin, 3DP cube, and the post sintering 3DP cube according to an embodiment of the subject invention.

FIGS. 17A-17B shows a comparison of SEM images eliciting complete removal of the resin post-sintering of lunar regolith according to an embodiment of the subject invention.

FIG. 18A-18E show a (a) CAD model of complex cube constructed layer by layer to achieve a more accurate model and simulation according to an embodiment of the subject invention. Crack-propagation observed along the columns recorded during the (b) experimental compression test and (c) Simulated compression test of a complex cube by ANSYS showing stresses in Pa. (d) Static structural simulation of a single layer from a complex cube, showing stresses in Pa. (e) Static structural simulation of layer-to-layer interaction from a complex cube, showing stresses in Pa. The simulations (c, d, e) are showcased at a true deformation scale.

Embodiments of the subject invention will have a significant impact on the space exploration industry. Embodiments provide compositions, systems, and methods advantageously adapted to create parts, tools, and habitats with locally available Lunar materials. For a human Lunar colony to be viable, certain technical requirements must be met. One goal for a Lunar research base is to be relatively self-sustaining to reduce the danger if for whatever reason certain resupply or support missions are delayed, canceled, or failed. It is advantageous at least for reasons of cost, availability, and timing that colonists have enhanced ability to make their own tools and shelter working more with what is available on the Lunar surface.

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method for making a part, the method comprising:
providing a slurry comprising Greenland Anorthosite Lunar Regolith (GALR) in an amount between about 46 wt. % and about 60 wt. %, and at least about 40 wt. % of a photocurable thermosetting polymer; and
processing the slurry through an additive manufacturing (AM) system using Digital Light Processing (DLP) and a recipe to print and cure the slurry simultaneously layer by layer to produce the part.

2. The method of claim 1, the recipe comprising a basic exposure time and an initial exposure time, each respectively, between about 4.5 seconds and about 6 seconds.

3. The method of claim 2, the recipe comprising an initial exposed layers setting of 10 layers.

4. The method of claim 3, the recipe comprising an initial layer waiting time of about 50 seconds and a layer waiting time between about 25 seconds and about 50 seconds.

5. The method of claim 1, the recipe comprising a brightness intensity of UV light of about 200 W/mm$^2$.

6. The method of claim 5, the recipe comprising a preheat temperature of about 25° C., and a maximum temperature of about 25° C.

7. The method of claim 6, the recipe comprising a preheat setting turned on and a heated tray setting turned on.

8. The method of claim 7, the recipe comprising a motor moving distance of about 18 mm and a tilting motor speed of about 1 mm/sec.

9. The method of claim 8, the method comprising placing the part into an ultrasonication machine so that the part can be cleaned of uncured resin, then placing the part under a UV source for a time effective to cure the part.

10. The method of claim 9, the method comprising sintering the part at about 550° C. for at least about 2 hours, and at about 1280° C. for at least about 2 hours.

11. A sintered, additive manufactured (SAM) part having improved material properties, the SAM part comprising:
a photocured solid structure formed from a slurry comprising Greenland Anorthosite Lunar Regolith (GALR) in an amount between about 46 wt. % and about 60 wt. %, and at least about 40 wt. % of a photocurable thermosetting polymer.

12. The SAM part of claim 11, comprising a multiplicity of layers within the photocured solid structure.

13. The SAM part of claim 12, the multiplicity of layers each respectively bonded to at least one adjacent layer by photocuring through a Digital Light Processing (DLP) system, sintering, or both.

14. The SAM part of claim 13, the multiplicity of layers defining a first plane parallel to at least one layer of the multiplicity of layers, a y-axis orthogonal to an x-axis, both the y-axis and the x-axis within the first plane, and a z-axis orthogonal to the first plane; and the SAM part having a shrinkage measurable along each of the x-axis, the y-axis, and the z-axis, respectively, from a manufacturing intermediate state before sintering to a final state after sintering.

15. The SAM part of claim 14, having a shrinkage less than about 20% in each of the x-axis, the y-axis, and the z-axis, respectively.

16. The SAM part of claim 15, having a shrinkage less than about 16% in each of the x-axis, the y-axis, and the z-axis, respectively.

17. The SAM part of claim 16, having a shrinkage less than about 14% in each of the x-axis, the y-axis, and the z-axis, respectively.

18. The SAM part of claim 17, having a shrinkage less than about 6% in any two of the x-axis, the y-axis, and the z-axis, respectively.

19. A method for making a part, the method comprising:
providing a slurry comprising Greenland Anorthosite Lunar Regolith (GALR) in an amount between about 46 wt. % and about 60 wt. %, and at least about 40 wt. % of a photocurable thermosetting polymer;
processing the slurry through an additive manufacturing (AM) system using Digital Light Processing (DLP) and a recipe to print and cure the slurry simultaneously layer by layer to produce the part;
the recipe comprising:
  a) a basic exposure time and an initial exposure time, each respectively, between about 4.5 seconds and about 6 seconds;
  b) an initial exposed layers setting of 10 layers;
  c) an initial layer waiting time of about 50 seconds and a layer waiting time between about 25 seconds and about 50 seconds;
  d) a brightness intensity of UV light of about 200 W/mm$^2$;
  e) a preheat temperature of about 25° C., and a maximum temperature of about 25° C.;
  f) a preheat setting turned on and a heated tray setting turned on; and
  g) a motor moving distance of about 18 mm and a tilting motor speed of about 1 mm/sec;
placing the part into an ultrasonication machine so that the part can be cleaned of uncured resin;
placing the part under a UV source for a time effective to cure the part; and
sintering the part at about 550° C. for at least about 2 hours, and at about 1280° C. for at least about 2 hours.

20. The method of claim 19, configured and adapted to produce one or more parts from an initial slurry comprising Greenland Anorthosite Lunar Regolith (GALR) in an amount of about 60 wt. %, and about 40 wt. % of a photocurable thermosetting polymer;
the one or more parts exhibiting a measurable shrinkage less than about 6% in any two orthogonal measurement axis directions.

* * * * *